United States Patent
Ouchi et al.

(10) Patent No.: US 8,953,695 B2
(45) Date of Patent: Feb. 10, 2015

(54) TRANSMITTER, TRANSMISSION METHOD, RECEIVER, RECEPTION METHOD, PROGRAM, AND INTEGRATED CIRCUIT

(75) Inventors: Mikihiro Ouchi, Osaka (JP); Noritaka Iguchi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 99 days.

(21) Appl. No.: 13/519,453

(22) PCT Filed: Dec. 22, 2010

(86) PCT No.: PCT/JP2010/007458
§ 371 (c)(1),
(2), (4) Date: Jun. 27, 2012

(87) PCT Pub. No.: WO2011/086647
PCT Pub. Date: Jul. 21, 2011

(65) Prior Publication Data
US 2012/0288029 A1 Nov. 15, 2012

(30) Foreign Application Priority Data
Jan. 13, 2010 (JP) .................. 2010-004656

(51) Int. Cl.
*H04L 27/00* (2006.01)
*H04L 25/03* (2006.01)
(Continued)

(52) U.S. Cl.
CPC ........ *H04L 25/03866* (2013.01); *H04L 1/0057* (2013.01); *H04L 1/0071* (2013.01);
(Continued)

(58) Field of Classification Search
USPC .................. 375/259, 295, 316; 370/252, 464
See application file for complete search history.

(56) References Cited

U.S. PATENT DOCUMENTS

| 5,867,763 A | 2/1999 | Dean et al. |
| 2007/0064588 A1 | 3/2007 | Kisoda et al. |

(Continued)

FOREIGN PATENT DOCUMENTS

| CN | 1759552 | 4/2006 |
| JP | 2008-258759 | 10/2008 |

(Continued)

OTHER PUBLICATIONS

"Digital Video Broadcasting (DVB); Frame structure channel coding and modulation for a second generation digital transmission system for cable systems (DVB-C2)", European Standard (Telecommunications series), European Telecommunications Standards Institute (ETSI), Jan. 1, 2010.*
Supplementary European Search Report issued Oct. 24, 2012 in European Application No. 10 84 3006.

(Continued)

*Primary Examiner* — Leila Malek
(74) *Attorney, Agent, or Firm* — Wenderoth, Lind & Ponack, L.L.P.

(57) ABSTRACT

A transmitter 100 includes an L1 signaling data coder 111. In the L1 signaling data coder 111, an L1 signaling data generator 1021 converts transmission parameters into L1-pre signaling data and L1-post signaling data and outputs the L1-pre signaling data and the L1-post signaling data, an energy dispersion unit 121 performs energy dispersion on the L1-pre signaling data and the L1-post signaling data in order, and an L1 error correction coder 1022 performs error correction coding, based on BCH coding and LDPC coding, on the energy-dispersed L1-pre signaling data. This allows for randomization of a large bias in mapping data of the L1-pre signaling data and the L1-post signaling data, thus solving the problem of concentration of power in a specific sample within P2 symbols.

4 Claims, 38 Drawing Sheets

(51) Int. Cl.
*H04L 1/00* (2006.01)
*H04L 27/26* (2006.01)

(52) U.S. Cl.
CPC ......... *H04L27/2615* (2013.01); *H04L 27/2613* (2013.01); *H04L 27/2626* (2013.01); *H04L 27/2647* (2013.01)
USPC ........... 375/259; 375/295; 375/316; 370/252; 370/464

(56) References Cited

U.S. PATENT DOCUMENTS

| | | | |
|---|---|---|---|
| 2009/0103649 A1* | 4/2009 | Vare et al. | 375/295 |
| 2009/0103651 A1 | 4/2009 | Lahtonen et al. | |
| 2011/0249772 A1 | 10/2011 | Kimura et al. | |
| 2011/0305300 A1* | 12/2011 | Ko | 375/298 |
| 2012/0039247 A1* | 2/2012 | Wajcer et al. | 370/316 |

FOREIGN PATENT DOCUMENTS

| | | |
|---|---|---|
| RU | 2 187 905 | 8/2002 |
| RU | 2 369 917 | 10/2009 |
| WO | 2005/050875 | 6/2005 |
| WO | 2006/048203 | 5/2006 |
| WO | 2008/149510 | 12/2008 |
| WO | 2009/050552 | 4/2009 |

OTHER PUBLICATIONS

Digital Video Broadcasting (DVB); Frame structure channel coding and modulation for a second generation digital transmission system for cable systems (DVB-C2), Final Draft ETSI EN 302 769 V1.1.1 (Jan. 2010).

International Search Report issued Feb. 1, 2011 in International (PCT) Application No. PCT/JP2010/007458.

Digital Video Broadcasting (DVB); Frame structure channel coding and modulation for a second generation digital terrestrial television broadcasting system (DVB-T2), ETSI EN 302 755 V1.1.1, Sep. 2009, chapters 4, 7, Fig. 2(d), 24 <URL:http://www.etsi.org/deliver/etsi_en/302700_302799/302755/01.01.01_60/en_302755v010101p.pdf>.

Digital Video Broadcasting (DVB); Frame structure channel coding and modulation for a second generation digital terrestrial television broadcasting system (DVB-T2), ETSI EN 302 755 V1.1.1 (Sep. 2009).

Digital Video Broadcasting (DVB); Implementation guidelines for a second generation digital terrestrial television broadcasting system (DVB-T2); DVB Document A 133, Dec. 2009.

Russian Office Action issued Nov. 21, 2013 in corresponding Russian Application No. RU 2012129347 along with English translation.

Russian Decision on Grant Patent for Invention issued Jun. 19, 2014 in Russian Application No. 2012129347/07(045994) (with English language translation).

Chinese Office Action issued Jul. 2, 2014 in Chinese Application No. 201080061280.7 (with partial English language translation).

* cited by examiner

Transmitter 100

FIG. 5

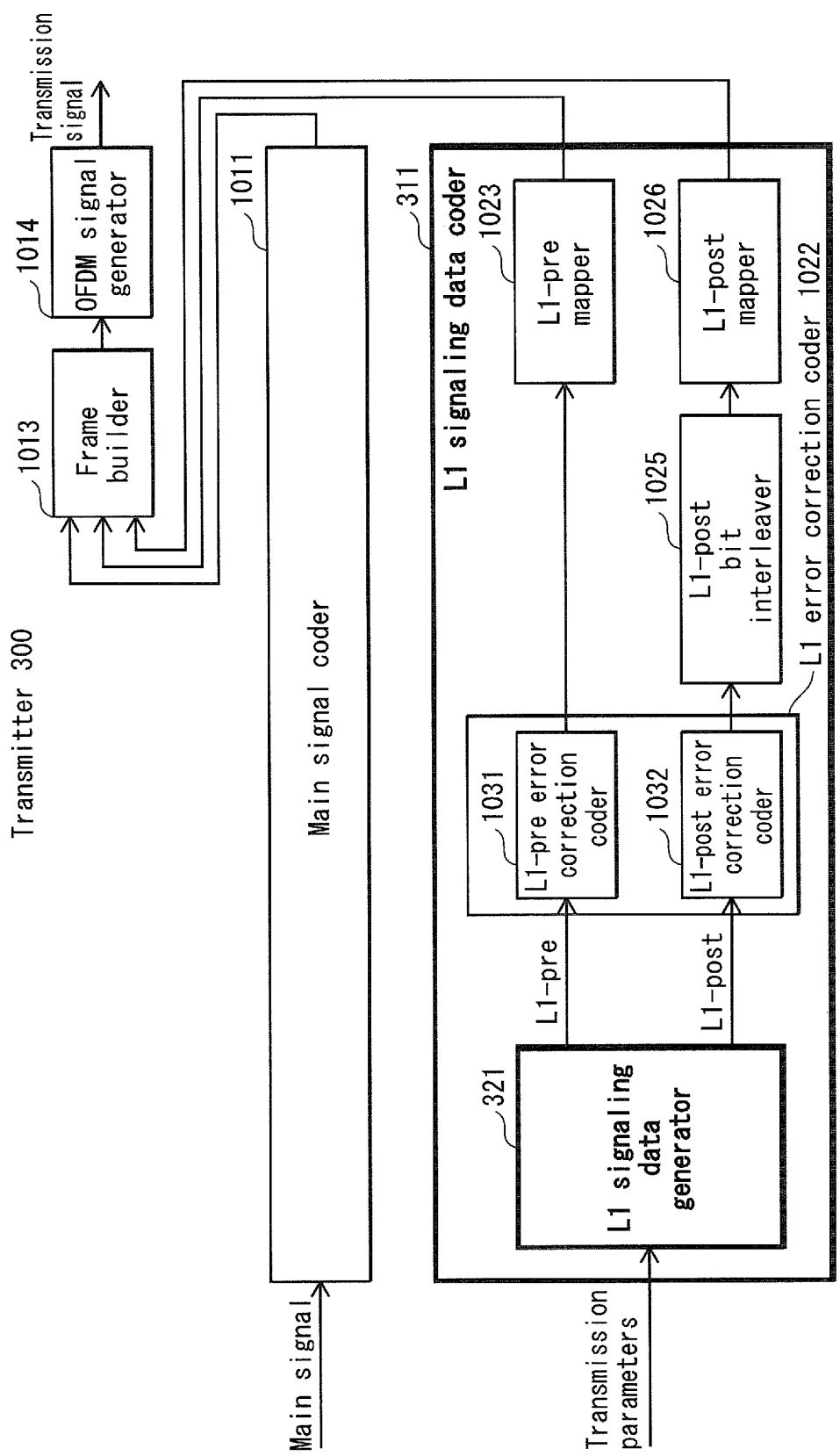

FIG. 7

| Overall | Transmission parameters | L1 signaling data |
|---|---|---|
| PLP | Multiple | – |
| FFT SIZE | 32K | – |
| GI | 1/128 | S2=1010 |
| Data Symbols | 19 | 0000001001 |
| SISO/MISO | SISO | S1=000 |
| PAPR | None | 0000 |
| Null packet deletion | None | – |
| Frames per superframe | 2 | 00000010 |
| Band width | 8MHz | – |
| Extended Carrier Mode | Yes | 1 |
| Pilot Pattern | PP7 | 0110 |
| L1 Modulation | 64QAM | 0011 |
| L1 Code rate | 1/2 | 00 |
| L1 FEC Type | 16200 | 00 |
| Sub Slices per Frame | 3 | 000000000000011 |
| FEF | None | – |
| L1 Repetition | No | 0 |
| L1 Post Extension | No | 0 |
| Number of PLPs | 255 | 11111111 |
| Number of RFs | 1 | 001 |
| Number of AUXs | 0 | 0000 |

| PLP 0 | Transmission parameters | L1 signaling data |
|---|---|---|
| PLP_ID | Same as PLP index | 00000000 |
| Type | 2 | 010 |
| Payload Type | TS | 00011 |
| Modulation | 256QAM | 011 |
| Rate | 5/6 | 101 |
| FEC Type | 16200 | 00 |
| Rotated QAM | Yes | 1 |
| FEC blocks per interleaving frame | 1 | 0000000001 |
| Max FEC blocks per interleaving frame | 1 | 0000000001 |
| T1 blocks per frame (N_TI) | 3 | 00000011 |
| T2 frames per Interleaving Frame (P_I) | 1 | – |
| Frame Interval (I_JUMP) | 1 | 00000001 |
| Type of time-interleaving | 0 | 0 |
| Time Interleaving Length | 3 | – |
| Input stage | – | – |
| Mode | HEM | – |
| ISSY | No | – |
| Null packet deletion | No | – |
| In Band Signalling | Yes | 1 |
| Number of other PLPs in-band signalling | 0 | – |
| PLP 2,4,...,254 | | |
| PLP_ID | Same as PLP index | 00000010-11111110 |
| Others | Same as PLP0 | |

| PLP 1 | Transmission parameters | L1 signaling data |
|---|---|---|
| PLP_ID | Same as PLP index | 00000001 |
| Type | 2 | 101 |
| Payload Type | TS | 11100 |
| Modulation | 256QAM | 100 |
| Rate | 5/6 | 010 |
| FEC Type | 16200 | 11 |
| Rotated QAM | Yes | 0 |
| FEC blocks per interleaving frame | 1 | 1111111110 |
| Max FEC blocks per interleaving frame | 1 | 1111111110 |
| T1 blocks per frame (N_TI) | 3 | 11111100 |
| T2 frames per Interleaving Frame (P_I) | 1 | – |
| Frame Interval (I_JUMP) | 1 | 11111110 |
| Type of time-interleaving | 0 | 1 |
| Time Interleaving Length | 3 | – |
| Input stage | – | – |
| Mode | HEM | – |
| ISSY | No | – |
| Null packet deletion | No | – |
| In Band Signalling | Yes | 1 |
| Number of other PLPs in-band signalling | 0 | – |
| PLP 3,5,...,253 | | |
| PLP_ID | Same as PLP index | 00000011-11111101 |
| Others | Same as PLP1 | |

FIG. 11A
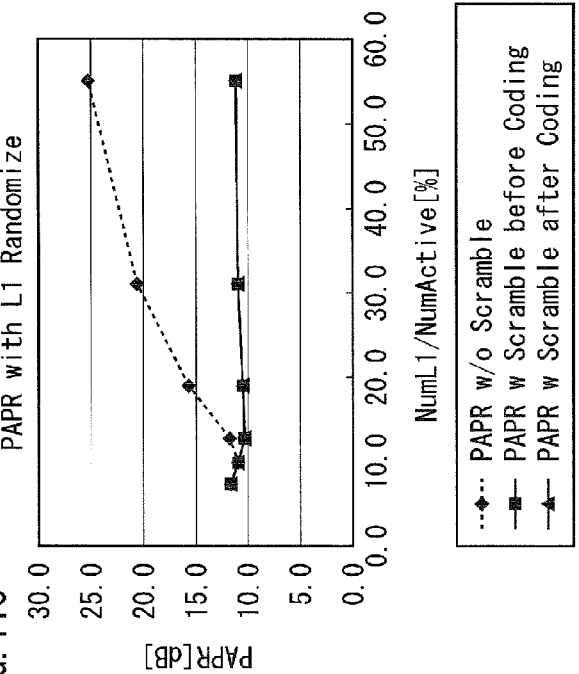
| Number of PLP | 1 | 15 | 31 | 63 | 127 | 255 |
|---|---|---|---|---|---|---|
| NumL1/NumActiveCarrier[%] | 7.5 | 10.0 | 12.9 | 19.1 | 31.1 | 55.1 |
| NumL1PreCells | 1840 | 1840 | 1840 | 1840 | 1840 | 1840 |
| NumL1PostCells | 250 | 954 | 1758 | 3488 | 6828 | 13490 |
| NumActiveCarrier | 27841 | 27841 | 27841 | 27841 | 27841 | 27841 |
| NumP2Symbols | 1 | 1 | 1 | 1 | 1 | 1 |
| PAPR w/o Scramble | 11.6 | 10.9 | 11.8 | 15.7 | 20.6 | 25.3 |
| PAPR w Scramble before Coding | 11.6 | 10.9 | 10.3 | 10.6 | 11.1 | 11.4 |
| PAPR w Scramble after Coding | 11.6 | 10.9 | 10.3 | 10.6 | 11.1 | 11.4 |
FIG. 11B
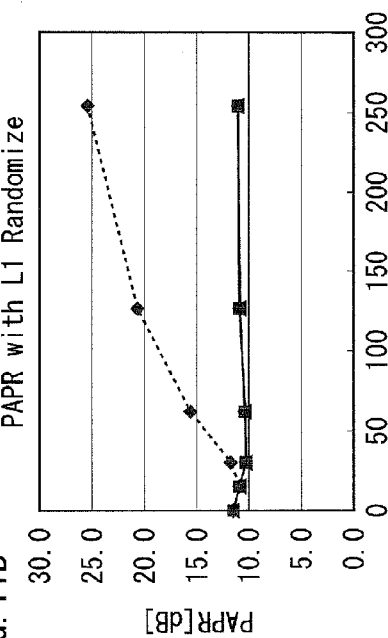
FIG. 11C

FIG. 18

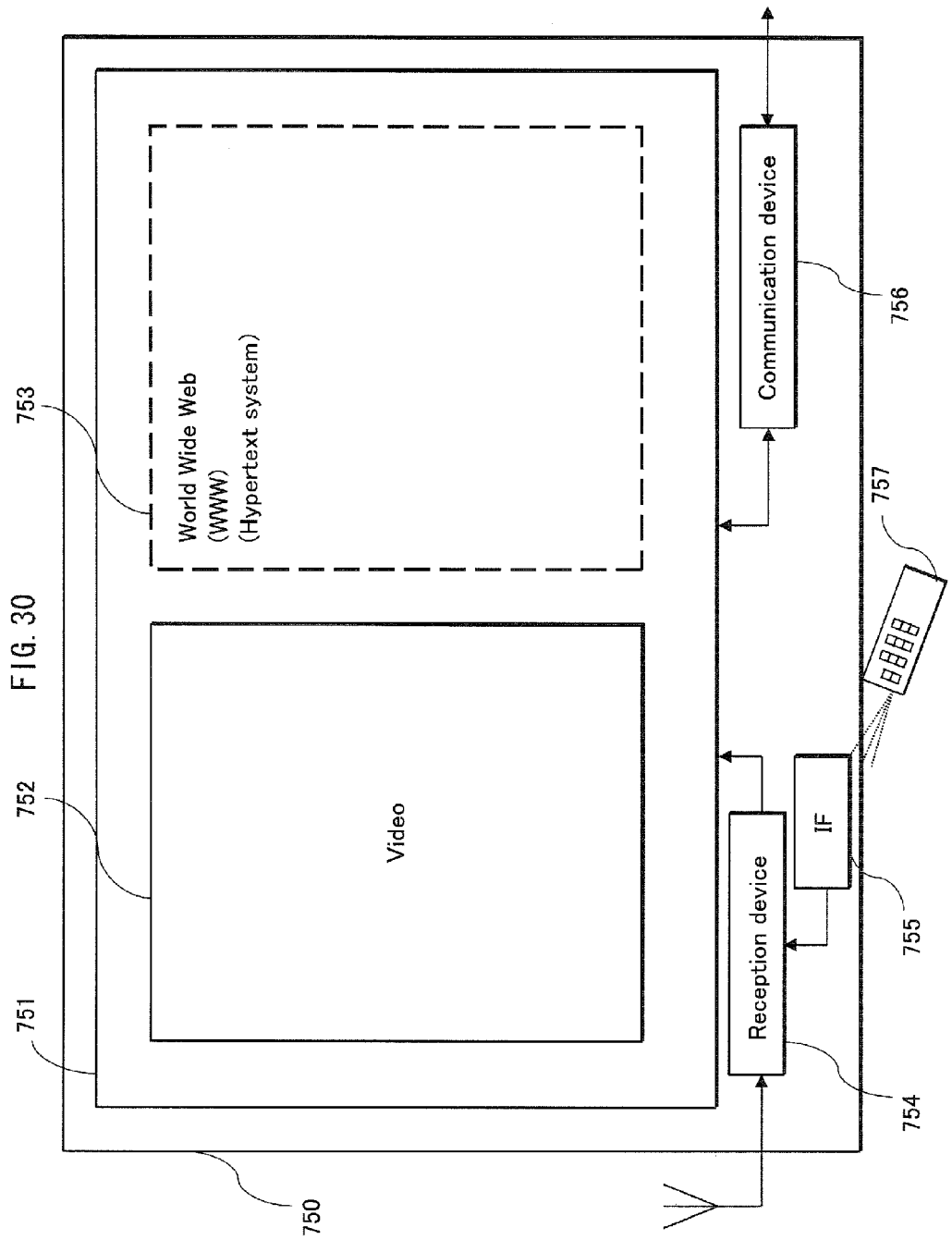

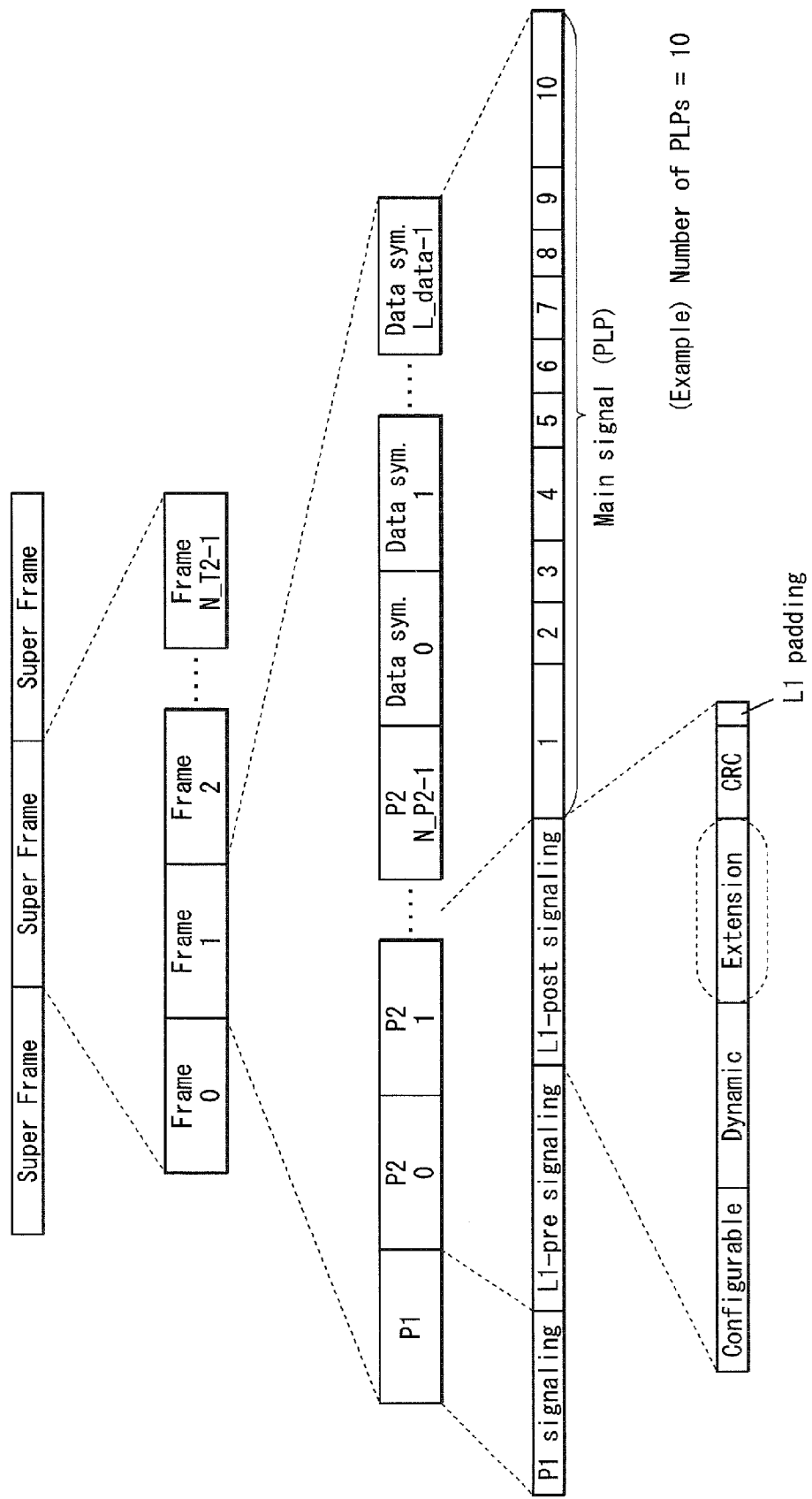
FIG. 31- PRIOR ART

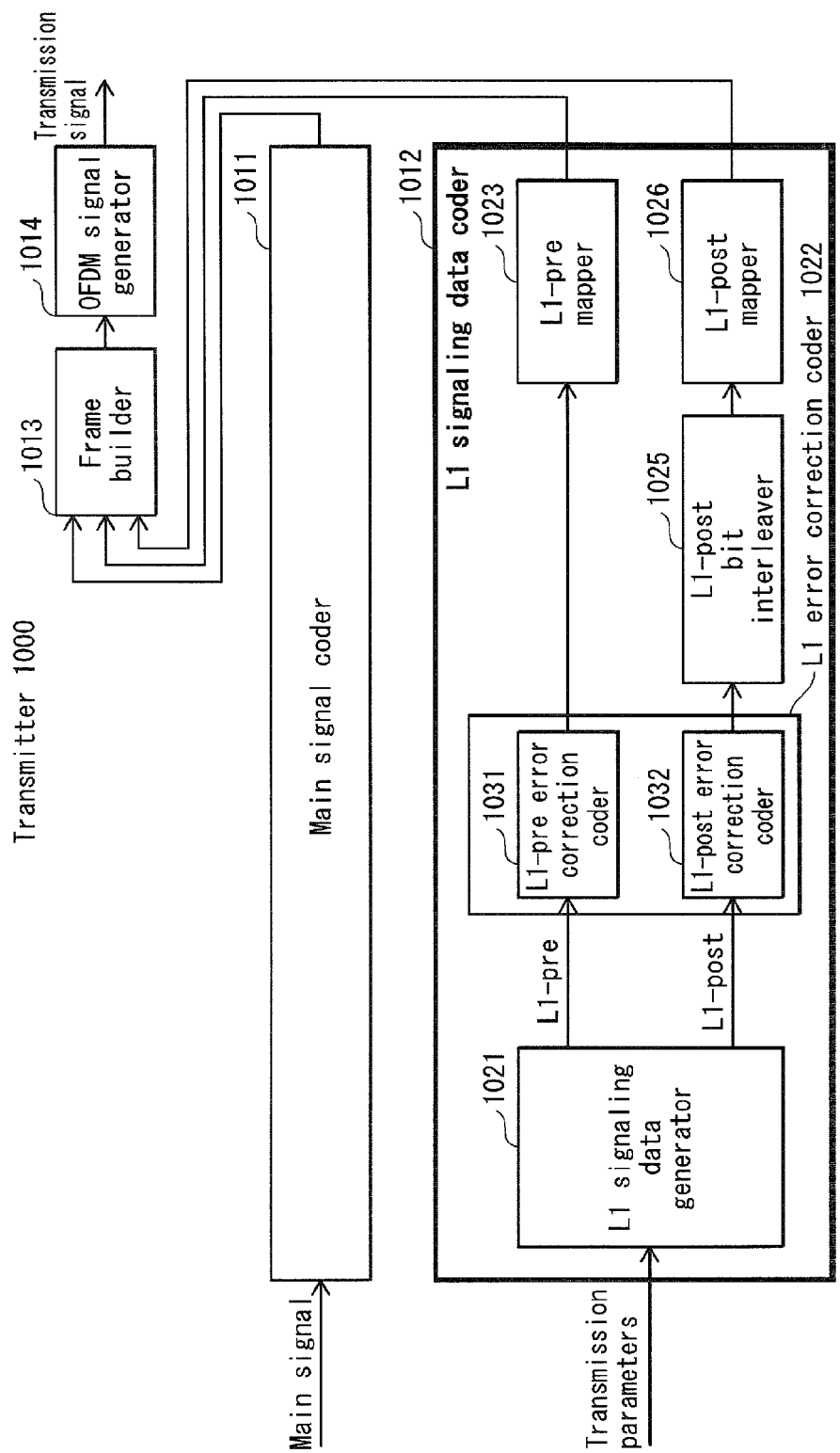
FIG. 32 - PRIOR ART

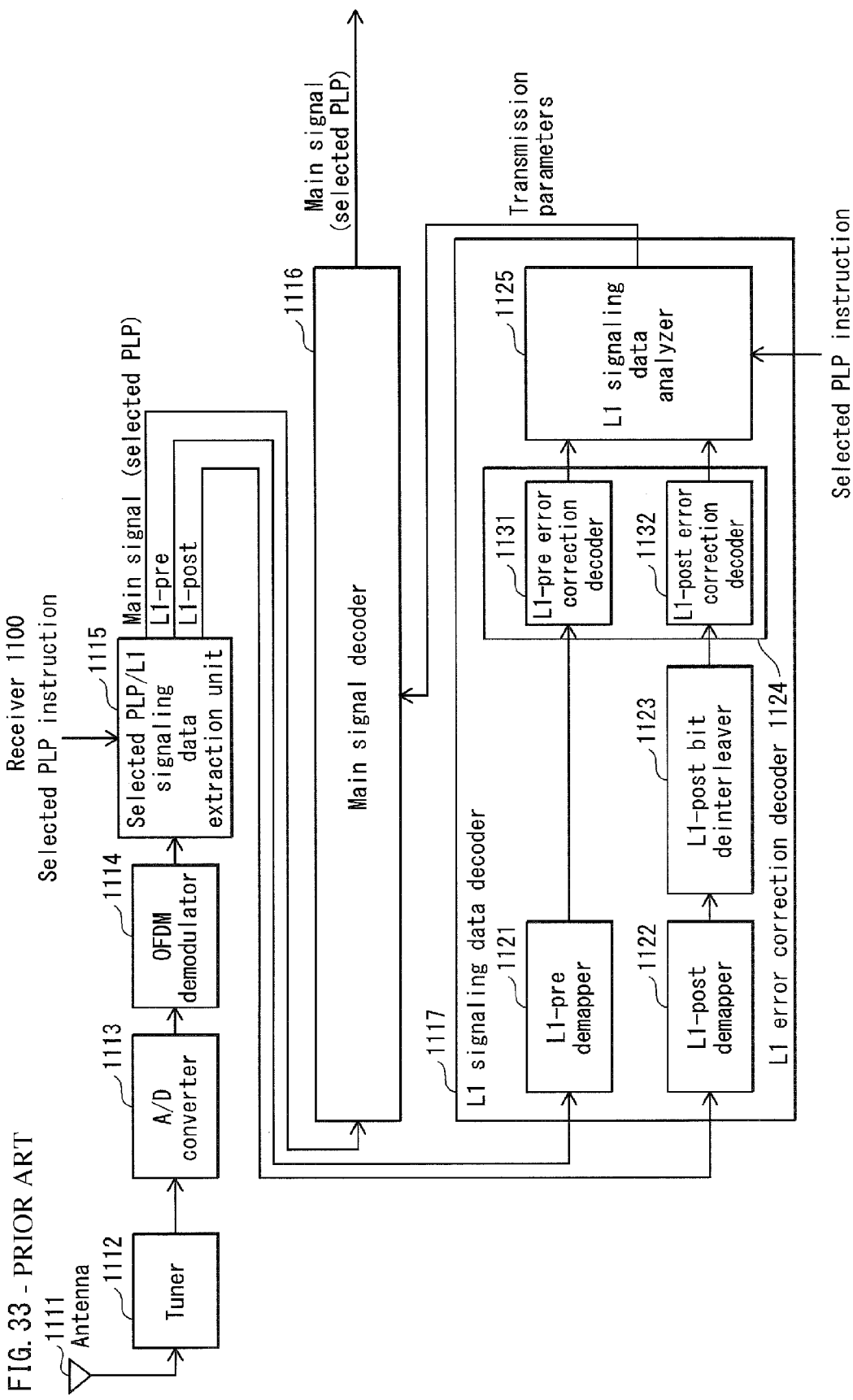
FIG. 33 - PRIOR ART

FIG. 34

| Overall | Transmission parameters |
|---|---|
| PLP | Multiple |
| FFTSIZE | 32K |
| GI | 1/128 |
| Data Symbols | 19 |
| SISO/MISO | SISO |
| PAPR | None |
| Null packet deletion | None |
| Frames per superframe | 2 |
| Band width | 8MHz |
| Extended Carrier Mode | Yes |
| Pilot Pattern | PP7 |
| L1 Modulation | 64QAM |
| L1 Code rate | 1/2 |
| L1 FEC Type | 16200 |
| Sub Slices per Frame | 3 |
| FEF | None |
| L1 Repetition | No |
| L1 Post Extension | No |
| Number of PLPs | 255 |
| Number of RFs | 1 |
| Number of AUXs | 0 |

| PLP 0 | Transmission parameters |
|---|---|
| PLP_ID | Same as PLP index |
| Type | 2 |
| Payload Type | TS |
| Modulation | 256QAM |
| Rate | 5/6 |
| FEC Type | 16200 |
| Rotated QAM | Yes |
| FEC blocks per interleaving frame | 1 |
| Max FEC blocks per interleaving frame | 1 |
| T1 blocks per frame (N_TI) | 3 |
| T2 frames per Interleaving Frame(P_I) | 1 |
| Frame Interval (I_JUMP) | 1 |
| Type of time-interleaving | 0 |
| Time Interleaving Length | 3 |
| Input stage | |
| Mode | HEM |
| ISSY | No |
| Null packet deletion | No |
| In Band Signalling | Yes |
| Number of other PLPs in-band signalling | 0 |
| PLP 1-254 | |
| PLP_ID | Same as PLP index |
| Others | Same as PLP0 |

FIG. 37

| Overall | Transmission parameters | L1 signaling data |
|---|---|---|
| PLP | Multiple | — |
| FFTSIZE | 32K | — |
| GI | 1/128 | S2=1010 |
| Data Symbols | 19 | 00000010011 |
| SISO/MISO | SISO | S1=000 |
| PAPR | None | 0000 |
| Null packet deletion | None | — |
| Frames per superframe | 2 | 00000010 |
| Band width | 8MHz | — |
| Extended Carrier Mode | Yes | 1 |
| Pilot Pattern | PP7 | 0110 |
| L1 Modulation | 64QAM | 0011 |
| L1 Code rate | 1/2 | 00 |
| L1 FEC Type | 16200 | 00 |
| Sub Slices per Frame | 3 | 000000000000011 |
| FEF | None | — |
| L1 Repetition | No | 0 |
| L1 Post Extension | No | 0 |
| Number of PLPs | 255 | 11111111 |
| Number of RFs | 1 | 001 |
| Number of AUXs | 0 | 0000 |

| PLP 0 | Transmission parameters | L1 signaling data |
|---|---|---|
| PLP_ID | Same as PLP index | 00000000 |
| Type | 2 | 010 |
| Payload Type | TS | 00011 |
| Modulation | 256QAM | 011 |
| Rate | 5/6 | 101 |
| FEC Type | 16200 | 00 |
| Rotated QAM | Yes | 1 |
| FEC blocks per interleaving frame | 1 | 0000000001 |
| Max FEC blocks per interleaving frame | 1 | 0000000001 |
| T1 blocks per frame (N_TI) | 3 | 00000011 |
| T2 frames per Interleaving Frame (P_I) | 1 | — |
| Frame Interval (I_JUMP) | 1 | 00000001 |
| Type of time-interleaving | 0 | 0 |
| Time Interleaving Length | 3 | — |
| Input stage | — | — |
| Mode | HEM | — |
| ISSY | No | — |
| Null packet deletion | No | 1 |
| In Band Signalling | Yes | — |
| Number of other PLPs in-band signalling | 0 | — |
| PLP 1-254 | | |
| PLP_ID | Same as PLP index | 00000001-11111110 |
| Others | Same as PLP0 | |

FIG. 38

| Overall | Transmission parameters | L1 signaling data |
|---|---|---|
| PLP | Single | — |
| FFTSIZE | 32K | — |
| GI | 1/128 | S2=1010 |
| Data Symbols | 59 | 000000111011 |
| SISO/MISO | SISO | S1=000 |
| PAPR | None | 0000 |
| Null packet deletion | None | — |
| Frames per superframe | 2 | 00000010 |
| Band width | 8MHz | — |
| Extended Carrier Mode | Yes | 1 |
| Pilot Pattern | PP7 | 0110 |
| L1 Modulation | 64QAM | 0011 |
| L1 Code rate | 1/2 | 00 |
| L1 FEC Type | 16200 | 00 |
| Sub Slices per Frame | 1 | 000000000000001 |
| FEF | None | — |
| L1 Repetition | No | 0 |
| L1 Post Extension | No | 0 |
| Number of PLPs | 1 | 00000001 |
| Number of RFs | 1 | 001 |
| Number of AUXs | 0 | 0000 |

| PLP 0 | Transmission parameters | L1 signaling data |
|---|---|---|
| PLP_ID | Same as PLP index | 00000000 |
| Type | 1 | 001 |
| Payload Type | TS | 00011 |
| Modulation | 256QAM | 011 |
| Rate | 2/3 | 010 |
| FEC Type | 64800 | 01 |
| Rotated QAM | Yes | 1 |
| FEC blocks per interleaving frame | 202 | 0011001010 |
| Max FEC blocks per interleaving frame | 202 | 0011001010 |
| T1 blocks per frame (N_TI) | 3 | 00000011 |
| T2 frames per Interleaving Frame(P_I) | 1 | — |
| Frame Interval (I_JUMP) | 1 | 00000001 |
| Type of time-interleaving | 0 | 0 |
| Time Interleaving Length | 3 | — |
| Input stage | | |
| Mode | HEM | |
| ISSY | No | |
| Null packet deletion | No | |
| In Band Signalling | No | 0 |
| Number of other PLPs in-band signalling | 0 | — |

TRANSMITTER, TRANSMISSION METHOD, RECEIVER, RECEPTION METHOD, PROGRAM, AND INTEGRATED CIRCUIT

TECHNICAL FIELD

The present invention relates to technology for reducing the Peak to Average Power Ratio (PAPR) caused by Layer-1 (L1) signaling data that indicates transmission parameters of a main signal.

BACKGROUND ART

DVB-T (Digital Video Broadcasting-Terrestrial) is a transmission standard for terrestrial digital television broadcasting in Europe. The digitalization of television broadcasts has become widespread, not only in Europe, but in other countries as well. To yield more efficient use of frequencies, DVB-T2 standardization was started in 2006 for second generation terrestrial digital television broadcasting. Like the DVB-T, DVB-T2 adopts OFDM (Orthogonal Frequency Division Multiplexing).

FIG. 31 shows the transmission frame structure in DVB-T2. DVB-T2 utilizes a concept called the PLP (Physical Layer Pipe). One characteristic of DVB-T2 is that transmission parameters, such as the modulation method, coding ratio, and the like may be set independently for each PLP. The number of PLPs is at least 1 and at most 255. The example in FIG. 31 shows the case of 10 PLPs.

The following describes the transmission frame structure.

Super Frame=$N\_T2$ frames ($N\_T2$=2–255)

Frame=$P1$ symbol+$P2$ symbols+data symbols $P1$ symbol=1 symbol $P2$ symbols=$N\_P2$ symbols ($N\_P2$ is unique based on FFT size)

Data symbols=$L\_data$ symbols ($L\_data$ is variable, having an upper limit and a lower limit)

A P1 symbol is transmitted with an FFT size of 1 k and GI (GUARD INTERVAL)=½. The P1 symbol transmits seven bits of information, S1 and S2, with information on the FFT size and the like of subsequent P2 symbols and data symbols. The earlier portion of P2 symbols include L1 signaling data, and the remaining later portion includes main signal data. The data symbols include a continuation of the main signal data.

The L1 signaling data transmitted in P2 symbols is composed of L1-pre signaling data, which mainly transmits information shared by all of the PLPs, and L1-post signaling data, which mainly transmits information on each PLP. Note that details on the L1 signaling data, L1-pre signaling data, and L1-post signaling data transmitted in P2 symbols is listed in Non-Patent Literature 1.

FIG. 32 shows the structure of a transmitter 1000 conforming to DVB-T2 (see Non-Patent Literature 1: DVB-T2 transmission standards). The transmitter 1000 is provided with a main signal coder 1011, an L1 signaling data coder 1012, a frame builder 1013, and an OFDM signal generator 1014.

For each PLP of a main signal that is to be transmitted, the main signal coder 1011 performs error correction coding based on BCH coding and LDPC coding, performs interleaving, performs mapping onto I/Q coordinates, and outputs the mapping data for each PLP. Note that I represents the in-phase component, whereas Q represents the quadrature component.

The L1 signaling data coder 1012 performs error correction coding on the L1-pre signaling data and the L1-post signaling data, performs interleaving, performs mapping onto I/Q coordinates, and outputs the mapping data for the L1-pre signaling data and the L1-post signaling data.

The frame builder 1013 generates and outputs the transmission frame structure according to the DVB-T2 standard as shown in FIG. 31 using the mapping data for each PLP output by the main signal coder 1011 and the mapping data for the L1-pre signaling data and the L1-post signaling data output by the L1 signaling data coder 1012.

To the transmission frame structure according to the DVB-T2 standard as output by the frame builder 1013, the OFDM signal generator 1014 adds a pilot signal, performs an IFFT (Inverse Fast Fourier Transform), inserts a GI, and inserts a P1 symbol, outputting a transmission signal according to DVB-T2.

The following provides details on the L1 signaling data coder 1012. As shown in FIG. 32, the L1 signaling data coder 1012 is provided with an L1 signaling data generator 1021, an L1 error correction coder 1022, an L1-pre mapper 1023, an L1-post bit interleaver 1025, and an L1-post mapper 1026. The L1 error correction coder 1022 is provided with an L1-pre error correction coder 1031 and an L1-post error correction coder 1032.

In the L1 signaling data coder 1012, the L1 signaling data generator 1021 generates L1 signaling data from transmission parameters, i.e. transforms transmission parameters into L1 signaling data (L1-pre signaling data and L1-post signaling data) and outputs the L1 signaling data. The L1-pre error correction coder 1031 performs error correction coding, based on BCH coding and LDPC coding, on the L1-pre signaling data. The L1-pre mapper 1023 maps the error correction coded L1-pre signaling data to I/Q coordinates, outputting mapping data for the L1-pre signaling data.

On the other hand, the L1-post error correction coder 1032 performs error correction coding, based on BCH coding and LDPC coding, on the L1-post signaling data. The L1-post bit interleaver 1025 interleaves the error correction coded L1-post signaling data in units of bits. The L1-post mapper 1026 maps the L1-post signaling data, which has been error correction coded and interleaved in units of bits, to I/Q coordinates, outputting mapping data for the L1-post signaling data.

FIG. 33 shows the structure of a receiver 1100 conforming to DVB-T2 (see Non-Patent Literature 2: DVB-T2 implementation guidelines). The receiver 1100 is provided with an antenna 1111, a tuner 1112, an A/D converter 1113, an OFDM demodulator 1114, a selected PLP/L1 signaling data extraction unit 1115, a main signal decoder 1116, and an L1 signaling data decoder 1117.

The antenna 1111 receives radio waves. The tuner 1112 selectively receives an OFDM signal of a desired channel and down-converts the signal to a predetermined band. The A/D converter 1113 converts the signal output by the tuner 1112 from analog to digital. The OFDM demodulator 1114 performs OFDM demodulation on the signal output by the A/D converter 1113 and outputs mapping data in I/Q coordinates.

The selected PLP/L1 signaling data extraction unit 1115 extracts the L1-pre signaling data and the L1-post signaling data from the OFDM demodulated signal (mapping data in I/Q coordinates), outputting the extracted information. Following a selected PLP instruction, the selected PLP/L1 signaling data extraction unit 1115 also extracts the PLP (main signal) selected by the user. Note that the selected PLP/L1 signaling data extraction unit 1115 extracts the PLP (main signal) selected by the user after processing by the L1 signaling data decoder 1117, using the transmission parameters output by the L1 signaling data decoder 1117.

The L1 signaling data decoder 1117 demaps the extracted L1-pre signaling data and L1-post signaling data from I/Q coordinates and deinterleaves these data that were interleaved at the transmitting end. The L1 signaling data decoder 1117 then performs error correction decoding based on LDPC decoding and BCH decoding, analyzes the decoded (reproduced) L1 signaling data, and outputs transmission parameters.

Based on the transmission parameters output by the L1 signaling data decoder 1117, the main signal decoder 1116 demaps the extracted PLP (main signal) from I/Q coordinates and deinterleaves the PLP that was interleaved at the transmitting end. The main signal decoder 1116 then performs error correction decoding based on LDPC decoding and BCH decoding and outputs the decoded (reproduced) main signal.

The following provides details on the L1 signaling data decoder 1117. As shown in FIG. 33, the L1 signaling data decoder 1117 is provided with an L1-pre demapper 1121, an L1-post demapper 1122, an L1-post bit deinterleaver 1123, an L1 error correction decoder 1124, and an L1 signaling data analyzer 1125. The L1 error correction decoder 1124 is provided with an L1-pre error correction decoder 1131 and an L1-post error correction decoder 1132.

In the L1 signaling data decoder 1117, the L1-pre demapper 1121 demaps the extracted L1-pre signaling data from I/Q coordinates. The L1-pre error correction decoder 1131 performs error correction decoding of the demapped L1-pre signaling data based on LDPC decoding and BCH decoding.

On the other hand, the L1-post demapper 1122 demaps the extracted L1-post signaling data from I/Q coordinates. The L1-post bit deinterleaver 1123 deinterleaves the demapped L1-post signaling data that was interleaved at the transmitting end in units of bits. The L1-post error correction decoder 1132 performs error correction decoding of the bit-deinterleaved L1-post signaling data based on LDPC decoding and BCH decoding.

The L1 signaling data analyzer 1125 analyzes the decoded (reproduced) L1-pre signaling data and the L1-post signaling data and outputs the transmission parameters. Note that among the L1-post signaling data, the L1 signaling data analyzer 1125 follows a selected PLP instruction to extract and analyze the transmission parameters for the PLP selected by the user.

CITATION LIST

Non-Patent Literature

Non-Patent Literature 1: EN 302 755 V1.1.1: Frame structure channel coding and modulation for a second generation digital terrestrial television broadcasting system (DVB-T2)

Non-Patent Literature 2: DVB BlueBook A133: Implementation guidelines for a second generation digital terrestrial television broadcasting system (DVB-T2)

SUMMARY OF INVENTION

Technical Problem

Preparations for the start of service under the DVB-T2 standard have advanced the furthest in the UK. The main target is HDTV (High Definition Tele-Vision) service for stationary reception, and the number of PLPs is expected to be one.

As described above, the maximum number of PLPs that can be transmitted with DVB-T2 is 255. Multiple PLPs are appropriate for a mobile service that transmits content with a low bit rate as the main signal. Currently, in the context of DVB, DVB-NGH (Next Generation Handheld) is being examined. DVB-NGH is a second generation mobile standard for terrestrial digital television broadcasting. If DVB-NGH uses the PLP structure of DVB-T2, the number of PLPs is expected to increase, since DVB-NGH is a mobile standard. The inventors examined the case of when the number of PLPs is large, an issue that up until now has not been considered highly important within the DVB-T2 standard.

FIG. 34 is an example of transmission parameters when the number of PLPs is 255. The largest difference from when the number of PLPs is one, as in the main use case in the DVB-T2 standard, is that the proportion of the P2 symbols occupied by L1 signaling data increases, whereas the proportion occupied by the PLP (main signal) decreases.

In other words, when the number of PLPs is one, the number of bits in the L1 signaling data is small, and the P2 symbols are almost entirely occupied by the main signal. As a result, the properties of the P2 symbols are nearly identical to the properties of the data symbols.

By contrast, when the number of PLPs is 255, the number of bits in the L1 signaling data increases, and the P2 symbols are almost entirely occupied by the L1 signaling data. This may result in different properties for the P2 symbols and the data symbols. The inventors focused on this point, analyzing the properties of the P2 symbols and the data symbols when the number of PLPs is 255, as shown in FIG. 34.

FIGS. 35A and 35B are the results of analysis of the power of P2 symbols and data symbols in a DVB-T2 transmission signal (a signal in the time domain after an IFFT) output by the transmitter 1000 of FIG. 32. In both FIGS. 35A and 35B, the horizontal axis represents the symbol number within a frame. Symbol 0 is a P2 symbol, and symbols 1 and higher are data symbols.

The vertical axis in FIG. 35A represents the average power of each symbol. As FIG. 35A shows, the P2 symbol has nearly 10% higher power than the data symbols. The vertical axis in FIG. 35B represents the peak power of the entire sample included in each symbol. As FIG. 35B shows, the P2 symbol has dozens of times greater power than the data symbols.

Next, the inventors focused analysis on the peak power of the P2 symbols. FIG. 36 shows the power in each sample within the P2 symbol. As is clear, power is concentrated in the sample in the beginning of the P2 symbol. To investigate the reason, the inventors analyzed the L1-pre signaling data and the L1-post signaling data for the transmission parameters in FIG. 34. FIG. 37 shows the results of analysis.

As FIG. 37 shows, the number of bits that are 0's is overwhelmingly larger than the number of bit that are 1's in the L1-pre signaling data and the L1-post signaling data. In part, the parameters N_TI and I_JUMP related to time interleaving are eight bits, but since the value of these parameters is small, the only bits near the least significant bit are 1's, and the number of bits that are 0's is large. Since the N_TI and I_JUMP are independent parameters for each PLP, these parameters are one of the main reasons for the increase in the proportion of bits that are 0's. As N_TI and I_JUMP are parameters related to time interleaving, it is quite possible for these parameters to have small values.

FIG. 38 shows the candidate transmission parameters for the DVB-T2 service in the UK (number of PLPs: 1) and the results of analysis of the L1-pre signaling data and L1-post signaling data. In this case as well, the number of bits that are 0's in the L1-pre signaling data and the L1-post signaling data is larger than the number of bits that are 1's. Since the number of PLPs is one, however, the proportion of the L1 signaling data in the P2 symbols is small. Furthermore, the L1-post bit interleaver 1025 interleaves the L1-post signaling data, which mainly transmits information on each PLP, in units of bits. These two phenomena prevent a bias in the mapping data for the L1-pre signaling data and the L1-post signaling data.

On the other hand, if the number of PLPs is large, the proportion of the P2 symbols occupied by the L1 signaling data is large. Therefore, even when the L1-post bit interleaver 1025 performs interleaving in units of bits, a large bias remained in the mapping data for the L1-pre signaling data and the L1-post signaling data. This is the reason for the concentration of power in a specific sample within the P2 symbols.

As described above, the inventors discovered the problem that when the number of PLPs is large, the power becomes concentrated in a specific sample within the P2 symbols. For such a transmission signal, the influence of clipping by the receiver on the P2 symbols becomes prominent. This results in reduced receiving performance of the L1-pre signaling data and the L1-post signaling data and may make reception impossible. If the L1-pre signaling data and the L1-post signaling data are not receivable, the transmission parameters of the PLP (main signal) cannot be acquired. This leads to the major problem of an inability to decode the main signal.

In order to prevent this problem, the influence of clipping by the receiver needs to be avoided. It is therefore necessary to greatly increase the dynamic range of the receiver, i.e. to greatly increase the number of bits that can be signal processed. Such a modification leads to the problems of increased calculation load and increased cost of the receiver.

The present invention has been conceived in light of the above problems, and it is one object thereof to provide a transmitter, a transmission method, and a program that can suppress the bias in mapping data of the L1 signaling data and can avoid the concentration of power within a specific sample of symbols (for example, P2 symbols). Furthermore, it is another object of the present invention to provide a receiver, a reception method, a program, and an integrated circuit that can avoid the influence of clipping without requiring an increase in dynamic range, while suppressing an increased calculation load and increased cost.

Solution to Problem

In order to solve the above problems, a transmitter according to an aspect of the present invention comprises: an L1 (Layer-1) signaling data generator configured to generate, from transmission parameters of a main signal, L1 signaling data storing the transmission parameters; an energy dispersion and error correction coding unit configured to perform energy dispersion on at least a portion of the L1 signaling data output by the L1 signaling data generator and to perform error correction coding on the L1 signaling data; and a mapper configured to perform mapping on the energy-dispersed, error correction coded L1 signaling data output by the energy dispersion and error correction coding unit.

Advantageous Effects of Invention

With the above structure, a bias in the mapping data of the L1 signaling data is randomized by energy dispersion of at least a portion of the L1 signaling data, thus avoiding concentration of power in a specific sample within symbols (for example, P2 symbols).

BRIEF DESCRIPTION OF DRAWINGS

FIG. 5 shows the structure of a receiver 250 in Embodiment 2.

FIG. 6 shows the structure of a transmitter 300 in Embodiment 3.

FIG. 7 shows L1-pre signaling data and L1-post signaling data in Embodiment 3.

FIGS. 11A, 11B, and 11C show the improvement when adopting Embodiments 1 and 2.

FIG. 18 shows the structure of a receiver 350A in Embodiment 7.

FIG. 30 is a structural diagram of a video display/audio output device.

FIG. 31 shows the transmission frame structure in the DVB-T2 standard.

FIG. 32 shows the structure of a conventional transmitter for the DVB-T2 standard.

FIG. 33 shows the structure of a conventional receiver for the DVB-T2 standard.

FIG. 34 shows an example of transmission parameters when the number of PLPs is 255.

FIG. 37 shows the results of analysis of the L1-pre signaling data and the L1-post signaling data for the transmission parameters in FIG. 34.

FIG. 38 shows the candidate transmission parameters for DVB-T2 service in the UK (number of PLPs: 1) and the results of analysis of the L1-pre signaling data and L1-post signaling data.

DESCRIPTION OF EMBODIMENTS

Figure 1:
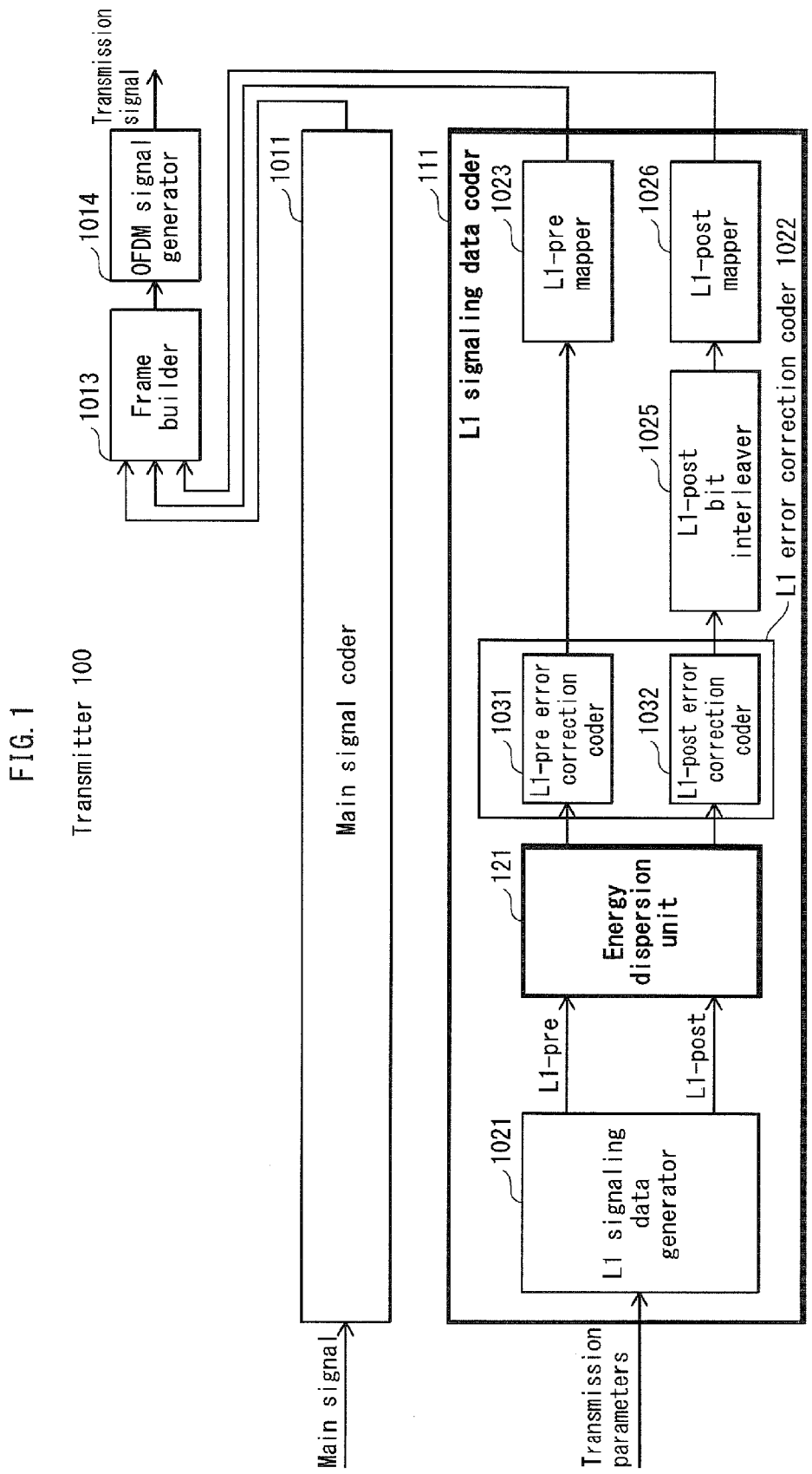
FIG. 1 shows the structure of a transmitter 100 in Embodiment 1.

A first transmitter according to an aspect of the present invention comprises: an L1 (Layer-1) signaling data generator configured to generate, from transmission parameters of a main signal, L1 signaling data storing the transmission parameters; an energy dispersion and error correction coding unit configured to perform energy dispersion on at least a portion of the L1 signaling data output by the L1 signaling data generator and to perform error correction coding on the L1 signaling data; and a mapper configured to perform mapping on the energy-dispersed, error correction coded L1 signaling data output by the energy dispersion and error correction coding unit.

A first transmission method according to an aspect of the present invention comprises the steps of: (a) generating, from transmission parameters of a main signal, L1 (Layer-1) signaling data storing the transmission parameters; (b) performing energy dispersion on at least a portion of the L1 signaling data generated in step (a) and performing error correction coding on the L1 signaling data; and (c) performing mapping on the L1 signaling data that is energy-dispersed and error correction coded in step (b).

A first transmitting side program according to an aspect of the present invention causes a transmitter to perform the steps of: (a) generating, from transmission parameters of a main signal, L1 (Layer-1) signaling data storing the transmission parameters; (b) performing energy dispersion on at least a portion of the L1 signaling data generated in step (a) and performing error correction coding on the L1 signaling data; and (c) performing mapping on the L1 signaling data that is energy-dispersed and error correction coded in step (b).

The first transmitter, the first transmission method, and the first transmitting side program each perform energy dispersion on at least a portion of the L1 signaling data. This allows for randomization of a bias in mapping data of the L1 signaling data and avoidance of the concentration of power within a specific sample of symbols (for example, P2 symbols).

A second transmitter according to an aspect of the present invention is the first transmitter, wherein the main signal is transmitted in PLPs (Physical Layer Pipes), transmission parameters of each PLP being set independently, and the energy dispersion and error correction coding unit only performs the energy dispersion when a total number of the PLPs exceeds a predetermined number.

The second transmitter does not perform energy dispersion at the transmitting end for a broadcast service in which the number of PLPs does not exceed a predetermined number. This has the advantage of allowing for reception by a conventional receiver.

A third transmitter according to an aspect of the present invention is the second transmitter, wherein the L1 signaling data is divided into L1-pre signaling data and L1-post signaling data, the L1-post signaling data storing the total number of the PLPs, the L1 signaling data generator stores, in the L1-pre signaling data, energy dispersion information indicating whether energy dispersion has been performed, and the energy dispersion and error correction coding unit performs the energy dispersion on the L1-post signaling data.

Without using special information outside of the L1 signaling data, the third transmitter can indicate, to the receiving end, whether or not energy dispersion has been performed.

A fourth transmitter according to an aspect of the present invention is the first transmitter, wherein the L1 signaling data is divided into L1-pre signaling data and L1-post signaling data, and the energy dispersion and error correction coding unit performs the energy dispersion using a PRBS (Pseudo Random Binary Sequence) and initializes the PRBS at a start of the L1-pre signaling data.

A fifth transmitter according to an aspect of the present invention is the fourth transmitter, wherein the energy dispersion and error correction coding unit also initializes the PRBS at a start of the L1-post signaling data.

A sixth transmitter according to an aspect of the present invention is the fifth transmitter, wherein the L1-post signaling data is formed by a plurality of error correction code blocks, and the energy dispersion and error correction coding unit also initializes the PRBS at a start of each error correction code block in the L1-post signaling data.

A seventh transmitter according to an aspect of the present invention is the first transmitter, wherein the energy dispersion and error correction coding unit includes: an energy dispersion unit configured to perform the energy dispersion on the L1 signaling data output by the L1 signaling data generator; and an error correction coding unit configured to perform the error correction coding on the energy-dispersed L1 signaling data output by the energy dispersion unit.

An eighth transmitter according to an aspect of the present invention is the first transmitter, wherein the energy dispersion and error correction coding unit includes: an error correction coding unit configured to perform the error correction coding on the L1 signaling data output by the L1 signaling data generator; and an energy dispersion unit configured to perform the energy dispersion on the error correction coded L1 signaling data output by the error correction coding unit.

A ninth transmitter according to an aspect of the present invention comprises: an L1 (Layer-1) signaling data generator configured to generate, from transmission parameters of a main signal, L1 signaling data storing the transmission parameters; an error correction coding unit configured to perform error correction coding on the L1 signaling data output by the L1 signaling data generator; and a mapper configured to perform mapping on the error correction coded L1 signaling data output by the error correction coding unit, wherein the L1 signaling data generator inverts a bit pattern of a portion of the L1 signaling data when generating the L1 signaling data.

A second transmission method according to an aspect of the present invention comprises the steps of: (a) generating, from transmission parameters of a main signal, L1 (Layer-1) signaling data storing the transmission parameters; (b) performing error correction coding on the L1 signaling data generated in step (a); and (c) performing mapping on the L1 signaling data that is error correction coded in the step (b), wherein a bit pattern of a portion of the L1 signaling data is inverted when the L1 signaling data is generated in step (a).

The ninth transmitter and the second transmission method invert the bit pattern of a portion of the L1 signaling data. This allows for randomization of a bias in mapping data of the L1 signaling data and avoidance of the concentration of power within a specific sample of symbols (for example, P2 symbols).

A tenth transmitter according to an aspect of the present invention is the ninth transmitter, wherein the main signal is transmitted in PLPs (Physical Layer Pipes), transmission parameters of each PLP being set independently, and the L1 signaling data generator inverts the bit pattern only when a total number of the PLPs exceeds a predetermined number.

The tenth transmitter does not invert the bit pattern of a portion of the L1 signaling data at the transmitting end for a broadcast service in which the number of PLPs does not exceed a predetermined number. This has the advantage of allowing for reception by a conventional receiver.

An eleventh transmitter according to an aspect of the present invention is the ninth transmitter, wherein the main signal is transmitted in PLPs (Physical Layer Pipes), transmission parameters of each PLP being set independently, the L1 signaling data is divided into L1-pre signaling data and L1-post signaling data, and the portion of the L1 signaling data is a portion of the L1-post signaling data pertaining to a portion of the PLPs and excluding a PLP_ID.

A twelfth transmitter according to an aspect of the present invention is the eleventh transmitter, wherein the portion of the PLPs is composed of all PLPs having an odd ID number or all PLPs having an even ID number.

A thirteenth transmitter according to an aspect of the present invention comprises: an L1 (Layer-1) signaling data generator configured to generate, from transmission parameters of a main signal, L1 signaling data storing the transmission parameters; an error correction coding unit configured to perform error correction coding on the L1 signaling data output by the L1 signaling data generator; and a mapper configured to perform mapping on the error correction coded L1 signaling data output by the error correction coding unit, wherein the L1 signaling data generator switches on use of an extension field and assigns each bit of the extension field a value of 1 or of 0 so as to decrease a difference between a total number of 0 bits and a total number of 1 bits of the L1 signaling data.

A third transmission method according to an aspect of the present invention comprises the steps of: (a) generating, from transmission parameters of a main signal, L1 (Layer-1) signaling data storing the transmission parameters; (b) performing error correction coding on the L1 signaling data generated in step (a); and (c) performing mapping on the L1 signaling data that is error correction coded in the step (b), wherein in step (a), use of an extension field is switched on, and each bit of the extension field is assigned a value of 1 or of 0 so as to decrease a difference between a total number of 0 bits and a total number of 1 bits of the L1 signaling data.

The thirteenth transmitter and the third transmission method assign each bit of the extension field a value of 1 or of 0 so as to decrease the difference between the total number of 0 bits and the total number of 1 bits of the extension field of the L1 signaling data. This allows for randomization of a bias in mapping data of the L1 signaling data and avoidance of the concentration of power within a specific sample of symbols (for example, P2 symbols). Furthermore, this achieves the advantage of allowing for reception by a conventional receiver that ignores the extension field.

A fourteenth transmitter according to an aspect of the present invention is the thirteenth transmitter, wherein the main signal is transmitted in PLPs (Physical Layer Pipes), transmission parameters of each PLP being set independently, and the L1 signaling data generator switches on use of the extension field only when a total number of the PLPs exceeds a predetermined number.

The fourteenth transmitter switches off use of the extension field in the case of a transmission service in which the number of PLPs does not exceed the predetermined number. The fourteenth transmitter can therefore avoid an increase in transmission quantity.

A fifteenth transmitter according to an aspect of the present invention is the thirteenth transmitter, wherein the L1 signaling data is divided into L1-pre signaling data and L1-post signaling data, and the extension field is an L1-post extension field in the L1-post signaling data.

The fifteenth transmitter allows for direct use of the structure of the L1-post signaling data in the DVB-T2 format.

A first receiver according to an aspect of the present invention is for receiving L1 (Layer-1) signaling data storing transmission parameters of a main signal, energy dispersion having been performed on at least a portion of the L1 signaling data, and error correction coding having been performed on the entire L1 signaling data, the receiver comprising: an error correction decoding and reverse energy dispersion unit configured to reproduce the L1 signaling data by performing error correction decoding on a received signal and performing reverse energy dispersion on at least a portion of the received signal; and an L1 signaling data analyzer configured to analyze the reproduced L1 signaling data output by the error correction decoding and reverse energy dispersion unit and to output transmission parameters.

A first reception method according to an aspect of the present invention is for receiving L1 (Layer-1) signaling data storing transmission parameters of a main signal, energy dispersion having been performed on at least a portion of the L1 signaling data, and error correction coding having been performed on the entire L1 signaling data, the reception method comprising the steps of: (a) reproducing the L1 signaling data by performing error correction decoding on a received signal and performing reverse energy dispersion on at least a portion of the received signal; and (b) analyzing the L1 signaling data reproduced in step (a) and outputting transmission parameters.

A first receiving side program according to an aspect of the present invention is used in a receiver for receiving L1 (Layer-1) signaling data storing transmission parameters of a main signal, energy dispersion having been performed on at least a portion of the L1 signaling data, and error correction coding having been performed on the entire L1 signaling data, the program causing the receiver to perform the steps of: (a) reproducing the L1 signaling data by performing error correction decoding on a received signal and performing reverse energy dispersion on at least a portion of the received signal; and (b) analyzing the L1 signaling data reproduced in step (a) and outputting transmission parameters.

A first receiving side integrated circuit according to an aspect of the present invention is for receiving input of L1 (Layer-1) signaling data storing transmission parameters of a main signal, energy dispersion having been performed on at least a portion of the L1 signaling data, and error correction coding having been performed on the entire L1 signaling data, the integrated circuit comprising: an error correction decoding and reverse energy dispersion circuit configured to reproduce the L1 signaling data by performing error correction decoding on a received signal and performing reverse energy dispersion on at least a portion of the received signal; and an L1 signaling data analysis circuit configured to analyze the reproduced L1 signaling data output by the error correction decoding and reverse energy dispersion circuit and to output transmission parameters.

The first receiver, the first reception method, the first receiving side program, and the first receiving side integrated circuit do not require an increase in dynamic range in order to avoid the influence of clipping, while suppressing an increased calculation load and increased cost.

A second receiver according to an aspect of the present invention is the first receiver, wherein the main signal is transmitted in PLPs (Physical Layer Pipes), transmission parameters of each PLP being set independently, the energy dispersion has only been performed when a total number of the PLPs exceeds a predetermined number, and the error correction decoding and reverse energy dispersion unit only performs the reverse energy dispersion when the total number of the PLPs exceeds the predetermined number.

A third receiver according to an aspect of the present invention is the second receiver, wherein the L1 signaling data is divided into L1-pre signaling data and L1-post signaling data, the L1-post signaling data storing the total number of the PLPs, energy dispersion information indicating whether energy dispersion has been performed is stored in the L1-pre signaling data, the energy dispersion has only been performed on the L1-post signaling data, and the error correction decoding and reverse energy dispersion unit performs the reverse energy dispersion on the L1-post signaling data only when the energy dispersion information indicates that the energy dispersion has been performed.

Without using special information outside of the L1 signaling data, the third receiver can receive a notification, from the transmitting end, regarding whether or not energy dispersion has been performed.

A fourth receiver according to an aspect of the present invention is the first receiver, wherein the L1 signaling data is divided into L1-pre signaling data and L1-post signaling data, and the error correction decoding and reverse energy dispersion unit performs the reverse energy dispersion using a PRBS (Pseudo Random Binary Sequence) and initializes the PRBS at a start of the L1-pre signaling data.

A fifth receiver according to an aspect of the present invention is the fourth receiver, wherein the error correction decoding and reverse energy dispersion unit also initializes the PRBS at a start of the L1-post signaling data.

A sixth receiver according to an aspect of the present invention is the fifth receiver, wherein the L1-post signaling data is formed by a plurality of error correction code blocks, and the error correction decoding and reverse energy dispersion unit also initializes the PRBS at a start of each error correction code block in the L1-post signaling data.

A seventh receiver according to an aspect of the present invention is the first receiver, wherein the error correction decoding and reverse energy dispersion unit includes: an error correction decoding unit configured to perform the error correction decoding on the energy-dispersed, error correction coded L1 signaling data; and a reverse energy dispersion unit configured to perform the reverse energy dispersion on the error correction decoded L1 signaling data output by the error correction decoding unit.

An eighth receiver according to an aspect of the present invention is the first receiver, wherein the error correction decoding and reverse energy dispersion unit includes: a reverse energy dispersion unit configured to perform the reverse energy dispersion on the energy-dispersed, error correction coded L1 signaling data; and an error correction decoding unit configured to perform the error correction decoding on the reverse energy-dispersed L1 signaling data output by the reverse energy dispersion unit.

A ninth receiver according to an aspect of the present invention is for receiving error correction coded L1 (Layer-1) signaling data storing transmission parameters of a main signal, a bit pattern of a portion of the L1 signaling data having been inverted upon generation of the L1 signaling data, the receiver comprising: an error correction decoding unit configured to perform error correction decoding on the error correction coded L1 signaling data; and an L1 signaling data analyzer configured to analyze the error correction decoded L1 signaling data output by the error correction decoding unit and to output transmission parameters, wherein the L1 signaling data analyzer analyzes the L1 signaling data using the inversion of the bit pattern of the portion of the L1 signaling data.

A second reception method according to an aspect of the present invention is for receiving L1 (Layer-1) signaling data storing transmission parameters of a main signal, energy dispersion having been performed on at least a portion of the L1 signaling data, and error correction coding having been performed on the entire L1 signaling data, the reception method comprising the steps of: (a) reproducing the L1 signaling data by performing error correction decoding on a received signal and performing reverse energy dispersion on at least a portion of the received signal; and (b) analyzing the L1 signaling data reproduced in step (a) and outputting transmission parameters.

The ninth receiver and the second reception method do not require an increase in dynamic range in order to avoid the influence of clipping, while suppressing an increased calculation load and increased cost.

A tenth receiver according to an aspect of the present invention is the ninth receiver, wherein the main signal is transmitted in PLPs (Physical Layer Pipes), transmission parameters of each PLP being set independently, the bit pattern of the portion of the L1 signaling data has been inverted only when a total number of the PLPs exceeds a predetermined number, and the L1 signaling data analyzer analyzes the L1 signaling data by determining, based on the total number of the PLPs and on the predetermined number, whether the bit pattern of the portion of the L1 signaling data for the transmission parameters has been inverted.

An eleventh receiver according to an aspect of the present invention is the ninth receiver, wherein the main signal is transmitted in PLPs (Physical Layer Pipes), transmission parameters of each PLP being set independently, the L1 signaling data is divided into L1-pre signaling data and L1-post signaling data, and a portion of the L1 signaling data is a portion of the L1-post signaling data pertaining to a portion of the PLPs and excluding a PLP_ID.

A twelfth receiver according to an aspect of the present invention is the eleventh receiver, wherein the portion of the PLPs is composed of all PLPs having an odd ID number or all PLPs having an even ID number.

A thirteenth receiver according to an aspect of the present invention is for receiving error correction coded L1 (Layer-1) signaling data storing transmission parameters of a main signal, upon generation of the L1 signaling data, use of an extension field having been switched on, and each bit of the extension field having been assigned a value of 1 or of 0 so as to decrease a difference between a total number of 0 bits and a total number of 1 bits of the L1 signaling data, the receiver comprising: an error correction decoding unit configured to perform error correction decoding on the error correction coded L1 signaling data; and an L1 signaling data analyzer configured to analyze the error correction decoded L1 signaling data output by the error correction decoding unit and to output transmission parameters.

A third reception method according to an aspect of the present invention is for receiving error correction coded L1 (Layer-1) signaling data storing transmission parameters of a main signal, upon generation of the L1 signaling data, use of an extension field having been switched on, and each bit of the extension field having been assigned a value of 1 or of 0 so as to decrease a difference between a total number of 0 bits and a total number of 1 bits of the L1 signaling data, the reception method comprising the steps of: (a) performing error correction decoding on the error correction coded L1 signaling data; and (b) analyzing the L1 signaling data that is error correction decoded in step (a) and outputting transmission parameters.

The thirteenth receiver and the third reception method do not require an increase in dynamic range in order to avoid the influence of clipping, while suppressing an increased calculation load and increased cost.

A fourteenth receiver according to an aspect of the present invention is the thirteenth receiver, wherein the main signal is transmitted in PLPs (Physical Layer Pipes), transmission parameters of each PLP being set independently, and use of the extension field has been switched on only when a total number of the PLPs exceeds a predetermined number.

The fourteenth receiver switches off use of the extension field in the case of a transmission service in which the number of PLPs does not exceed the predetermined number. The fourteenth receiver can therefore avoid an increase in transmission quantity.

A fifteenth receiver according to an aspect of the present invention is the thirteenth receiver, wherein the L1 signaling data is divided into L1-pre signaling data and L1-post signaling data, and the extension field is an L1-post extension field in the L1-post signaling data.

The fifteenth receiver allows for direct use of the structure of the L1-post signaling data in the DVB-T2 format.

The following describes embodiments of the present invention in detail with reference to the drawings.

Embodiment 1

FIG. 1 shows the structure of a transmitter 100 in Embodiment 1 of the present invention. Structural elements that are the same as a conventional transmitter bear the same reference signs, and a description thereof is omitted.

As compared to the conventional transmitter 1000 of FIG. 32, the transmitter 100 of FIG. 1 further includes an energy dispersion unit 121 in an L1 signaling data coder 111.

In the transmitter 100 of FIG. 1, the energy dispersion unit 121 performs energy dispersion in order on the L1-pre signaling data and the L1-post signaling data generated by the L1 signaling data generator 1021. The L1-pre error correction coder 1031 performs error correction coding, based on BCH coding and LDPC coding, on the energy-dispersed L1-pre signaling data. The L1-post error correction coder 1032 performs error correction coding, based on BCH coding and LDPC coding, on the energy-dispersed L1-post signaling data.

Figure 2:
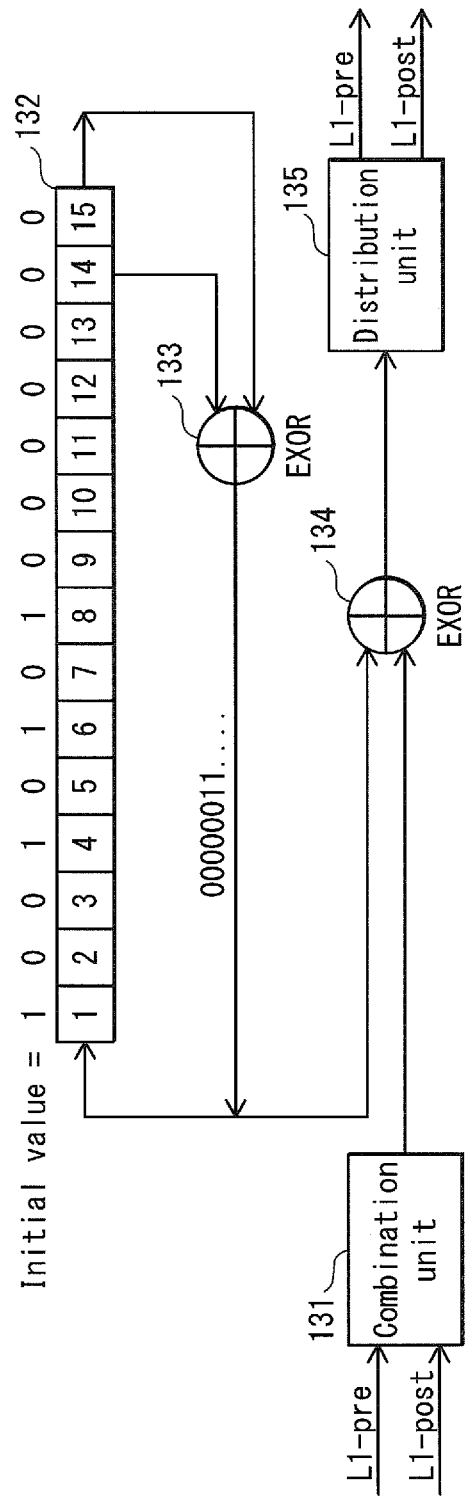
FIG. 2 shows the structure of the energy dispersion unit 121 of FIG. 1.

FIG. 2 shows the structure of the energy dispersion unit 121 of FIG. 1. The energy dispersion unit 121 uses a $15^{th}$ order PRBS (Pseudo Random Binary Sequence) as a dispersion sequence, as shown in the following expression.

$$1+X^{14}+X^{15}$$

As shown in FIG. 2, in the energy dispersion unit 121, the L1-pre signaling data and the L1-post signaling data are input into a combination unit 131 from the L1 signaling data generator 1021. The combination unit 131 outputs bits of the L1-pre signaling data in order from the first to the last bit and then outputs bits of the L1-post signaling data in order from the first to the last bit. An EXOR (EXclusive OR) circuit 133 performs an EXOR calculation on the $14^{th}$ bit and $15^{th}$ bit output from a 15-bit shift register 132. An EXOR circuit 134 performs an EXOR calculation on the output of the EXOR circuit 133 and each of (i) the bits of the L1-pre signaling data and (ii) the L1-post signaling data. A distribution unit 135 outputs the energy-dispersed L1-pre signaling data, output by the EXOR circuit 134, to the L1-pre error correction coder 1031 and outputs the energy-dispersed L1-post signaling data to the L1-post error correction coder 1032. Note that at the timing of the first bit of the L1-pre signaling data, an initial value of "100101010000000" is assigned to the 15-bit shift register 132. From the second bit to the last bit of the L1-pre signaling data, and from the first bit to the last bit of the subsequent L1-post signaling data, the 15-bit shift register 132 operates sequentially, without assignment of the initial value.

Other operations are the same as the conventional transmitter 1000 of FIG. 32.

Figure 3:
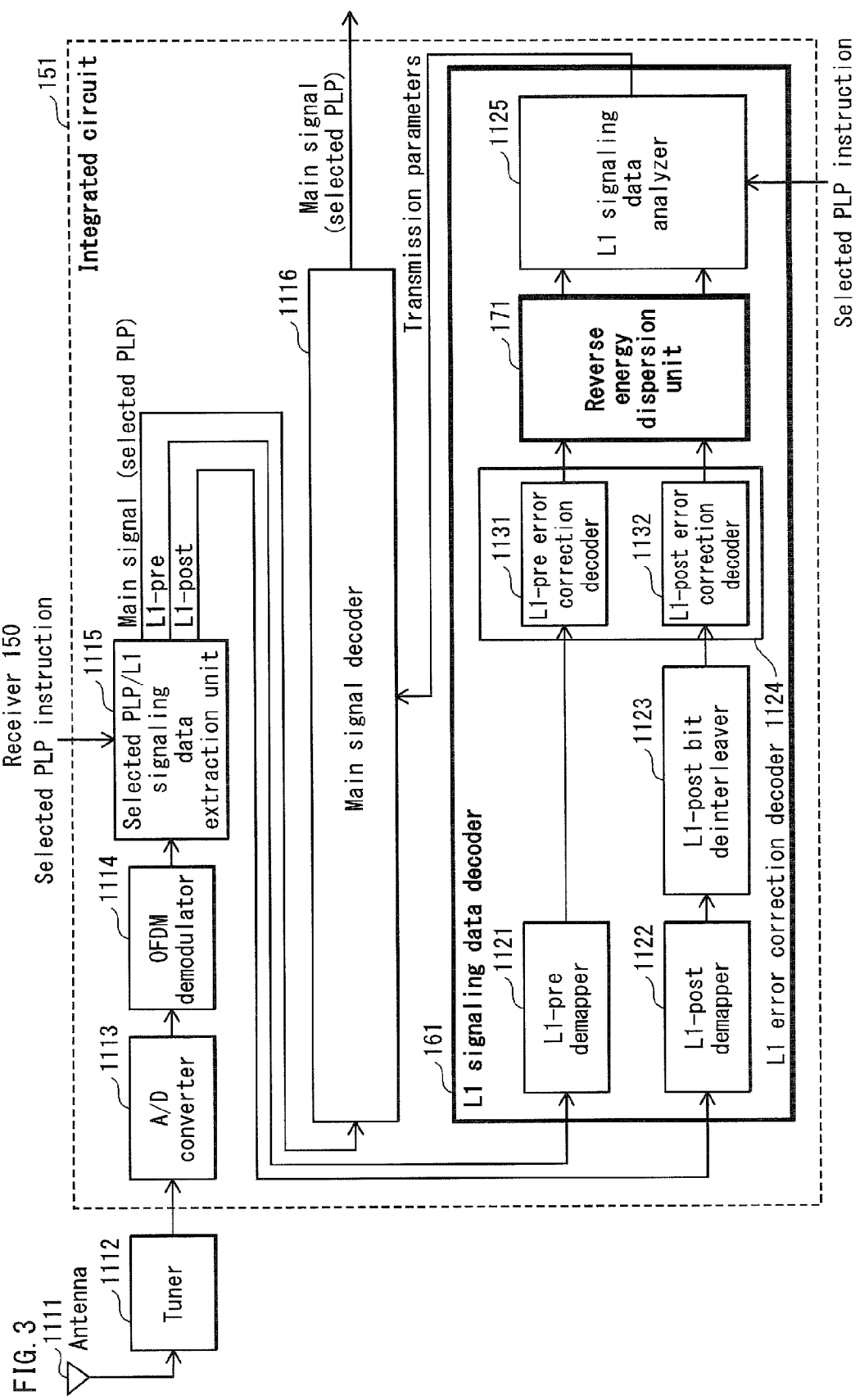
FIG. 3 shows the structure of a receiver 150 in Embodiment 1.

FIG. 3 shows the structure of a receiver 150 in Embodiment 1 of the present invention. Structural elements that are the same as a conventional receiver bear the same reference signs, and a description thereof is omitted.

As compared to the conventional receiver 1100 of FIG. 33, the receiver 150 of FIG. 3 further includes a reverse energy dispersion unit 171 in an L1 signaling data decoder 161.

In the receiver 150 of FIG. 3, the reverse energy dispersion unit 171 performs reverse energy dispersion in order on the L1-pre signaling data decoded by the L1-pre error correction decoder 1131 and the L1-post signaling data decoded by the L1-post error correction decoder 1132 to return these data to their state before the energy dispersion performed at the transmitting end by the energy dispersion unit 121. The structure of the reverse energy dispersion unit 171 is the same as the structure of the energy dispersion unit 121 in FIG. 2. The source of input for the combination unit 131 is the L1-pre error correction decoder 1131 and the L1-post error correction decoder 1132, and the destination of output from the distribution unit 135 is the L1 signaling data analyzer 1125. The L1 signaling data analyzer 1125 analyzes the L1-pre signaling data and the L1-post signaling data after reverse energy dispersion and outputs the transmission parameters.

Since the reverse energy dispersion unit 171 is a structural element that reverses the energy dispersion performed at the transmitting end by the energy dispersion unit 121, the reverse energy dispersion unit 171 uses the $15^{th}$ order PRBS in the following expression as a dispersion sequence, just as the energy dispersion unit 121 does.

$$1+X^{14}+X^{15}$$

The initial value assigned to the shift register 132 in the reverse energy dispersion unit 171 and the timing of assignment of the initial value need to match the initial value assigned to the shift register 132 in the energy dispersion unit 121 and the timing of assignment of the initial value. Therefore, in the reverse energy dispersion unit 171, an initial value of "100101010000000" is assigned to the 15-bit shift register 132 at the timing of the first bit of the L1-pre signaling data. From the second bit to the last bit of the L1-pre signaling data, and from the first bit to the last bit of the subsequent L1-post signaling data, the 15-bit shift register 132 operates sequentially, without assignment of the initial value.

Other operations are the same as the conventional receiver 1100 of FIG. 33.

Note that in the receiver 150 of FIG. 3, structural elements other than the antenna 1111 and the tuner 1112 may be provided as an integrated circuit 151.

With the above structure, even when the number of PLPs is large, a large bias in the mapping data of the L1-pre signaling data and the L1-post signaling data is randomized, thus avoiding concentration of power in specific samples within the P2 symbols. As a result, the influence of clipping in the receiver 150 can be avoided without requiring an increase in dynamic range, while suppressing an increased calculation load and increased cost of the receiver 150.

Embodiment 2

Figure 4:
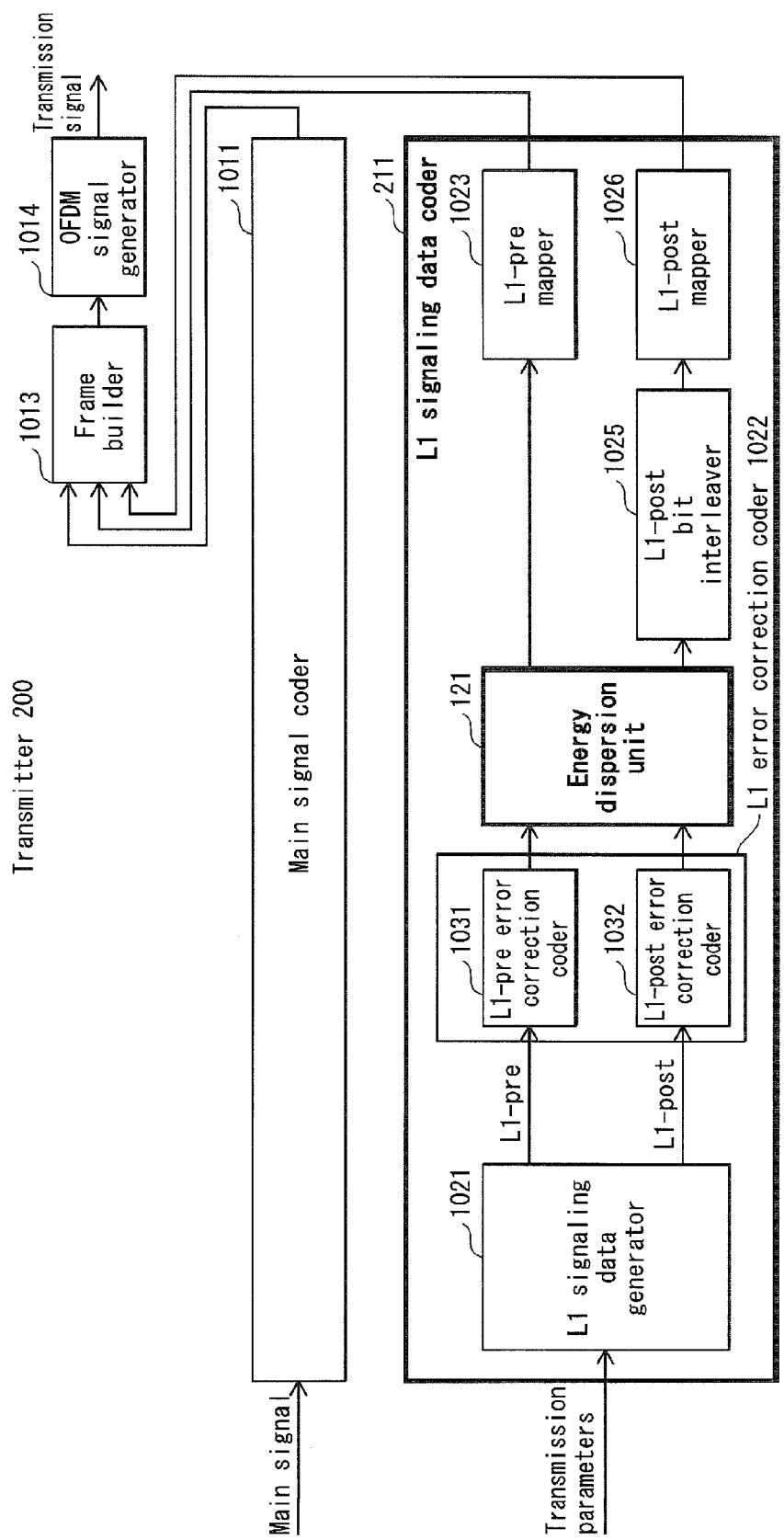
FIG. 4 shows the structure of a transmitter 200 in Embodiment 2.

FIG. 4 shows the structure of a transmitter 200 in Embodiment 2 of the present invention. Structural elements that are the same as a conventional transmitter and as the transmitter of Embodiment 1 bear the same reference signs, and a description thereof is omitted.

As compared to the conventional transmitter 1000 of FIG. 32, the transmitter 200 of FIG. 4 further includes an energy dispersion unit 121 in an L1 signaling data coder 211. The location in which the energy dispersion unit 121 is added differs, however, between Embodiment 1 and Embodiment 2.

In the transmitter 200 of FIG. 4, the energy dispersion unit 121 performs energy dispersion in order on the error correction coded L1-pre signaling data output by the L1-pre error correction coder 1031 and the error correction coded L1-post signaling data output by the L1-post error correction coder 1032. The structure of the energy dispersion unit 121 is as shown in FIG. 2. The source of input and destination of output of information differs between the energy dispersion unit 121 of Embodiment 1 and the energy dispersion unit 121 of Embodiment 2.

The L1-pre mapper 1023 maps the error correction coded, energy-dispersed L1-pre signaling data to I/Q coordinates, outputting mapping data for the L1-pre signaling data.

The L1-post bit interleaver 1025 interleaves the error correction coded, energy-dispersed L1-post signaling data in units of bits.

Other operations are the same as the conventional transmitter 1000 of FIG. 32.

Figure 5:
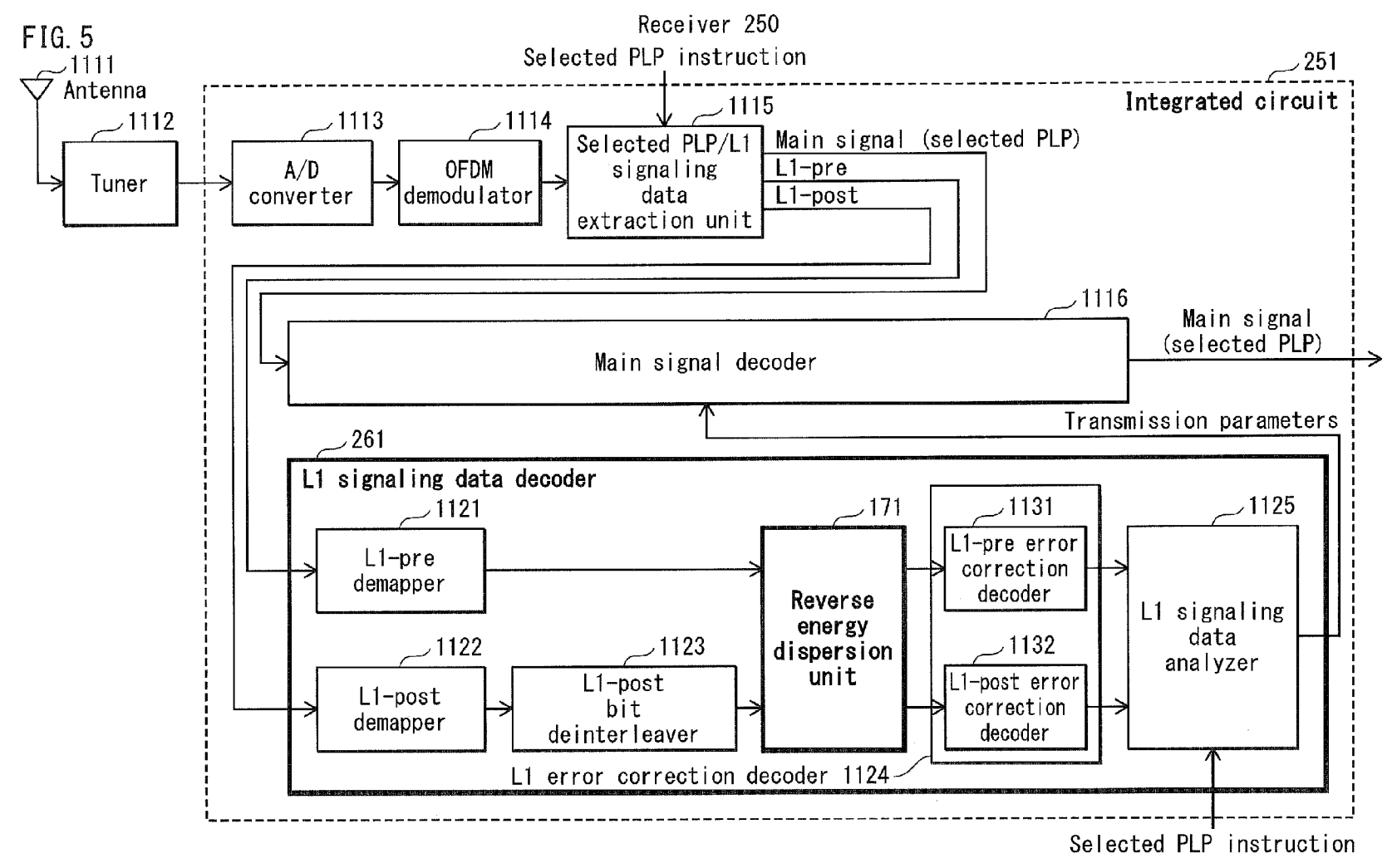

FIG. 5 shows the structure of a receiver 250 in Embodiment 2 of the present invention. Structural elements that are the same as a conventional receiver and the receiver of Embodiment 1 bear the same reference signs, and a description thereof is omitted.

As compared to the conventional receiver 1100 of FIG. 33, the receiver 250 of FIG. 5 further includes a reverse energy dispersion unit 171 in an L1 signaling data decoder 261. The location in which the reverse energy dispersion unit 171 is added differs, however, between Embodiment 1 and Embodiment 2.

In the receiver 250 of FIG. 5, the reverse energy dispersion unit 171 performs reverse energy dispersion in order on the demapped L1-pre signaling data output by the L1-pre demapper 1121 and on the demapped, bit-deinterleaved L1-post signaling data output by the L1-post bit deinterleaver 1123, thus reversing the energy dispersion performed at the transmitting end by the energy dispersion unit 121. The structure of the reverse energy dispersion unit 171 is the same as the energy dispersion unit 121 shown in FIG. 2. The source of input and destination of output of information, however, differs between the reverse energy dispersion unit 171 of Embodiment 1 and the reverse energy dispersion unit 171 of Embodiment 2.

The L1-pre error correction decoder 1131 performs error correction decoding of the L1-pre signaling data, on which reverse energy dispersion has been performed, based on LDPC decoding and BCH decoding. The L1-post error correction decoder 1132 performs error correction decoding of the L1-post signaling data, on which reverse energy dispersion has been performed, based on LDPC decoding and BCH decoding.

Other operations are the same as the conventional receiver 1100 of FIG. 33.

Note that in the receiver 250 of FIG. 5, structural elements other than the antenna 1111 and the tuner 1112 may be provided as an integrated circuit 251.

With the above structure, even when the number of PLPs is large, a large bias in the mapping data of the L1-pre signaling data and the L1-post signaling data is randomized, thus avoiding concentration of power in specific samples within the P2 symbols. As a result, the influence of clipping in the receiver 250 can be avoided without requiring an increase in dynamic range, while suppressing an increased calculation load and increased cost of the receiver 250.

In Embodiment 1, energy dispersion is only performed on information bits of error correction coding based on BCH coding and LDPC coding. By contrast, in Embodiment 2, energy dispersion is performed on information bits and on parity bits of error correction coding based on BCH coding and LDPC coding. Therefore, as compared to Embodiment 1, Embodiment 2 offers the possibility of further suppressing bias in the mapping data of the L1 signaling data.

Embodiment 3

FIG. 6 shows the structure of a transmitter 300 in Embodiment 3 of the present invention. Structural elements that are the same as a conventional transmitter bear the same reference signs, and a description thereof is omitted.

As compared to the conventional transmitter 1000 of FIG. 32, the transmitter 300 of FIG. 6 differs in the configuration of an L1 signaling data generator 321 in an L1 signaling data coder 311.

In the transmitter 300 of FIG. 6, the L1 signaling data generator 321 generates L1 signaling data from transmission parameters, i.e. transforms transmission parameters into L1 signaling data (L1-pre signaling data and L1-post signaling data) and outputs the L1 signaling data. At this point, the L1 signaling data generator 321 inverts the bit pattern in the L1-post signaling data of the L1-post signaling data portions (excluding the PLP_ID) pertaining to PLPs with an odd-numbered PLP_ID. Note that the L1 signaling data generator 321 does not invert the bit pattern of other portions of the L1-post signaling data.

The L1-pre error correction coder 1031 performs error correction coding, based on BCH coding and LDPC coding, on the L1-pre signaling data output by the L1 signaling data generator 321. On the other hand, the L1-post error correction coder 1032 performs error correction coding, based on BCH coding and LDPC coding, on the L1-post signaling data (the bit pattern of which has been inverted) output by the L1 signaling data generator 321.

FIG. 7 shows the L1-pre signaling data and the L1-post signaling data when adopting the present embodiment for the transmission parameters when the number of PLPs is 255, as shown in FIG. 34. The bit pattern inversion excludes the PLP_ID and is performed on the bits surrounded by the dotted-line in FIG. 7.

Note that instead of inverting the bit pattern in the L1-post signaling data of the L1-post signaling data portions (excluding the PLP_ID) pertaining to PLPs with an odd-numbered PLP_ID, the L1 signaling data generator 321 may invert the bit pattern in the L1-post signaling data of the L1-post signaling data portions (excluding the PLP_ID) pertaining to PLPs with an even-numbered PLP_ID.

Other operations are the same as the conventional transmitter 1000 of FIG. 32.

Figure 8:
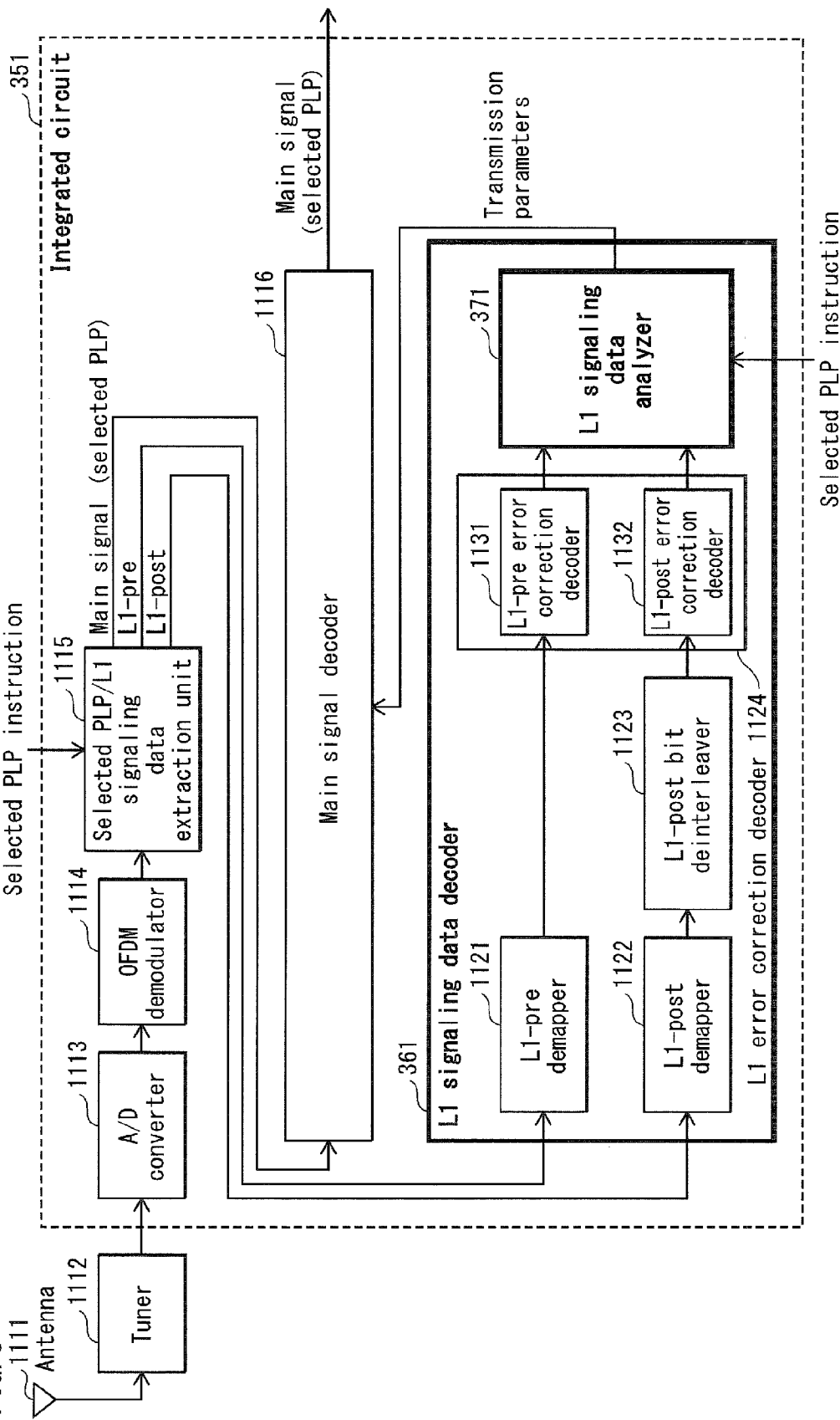
FIG. 8 shows the structure of a receiver 350 in Embodiment 3.

FIG. 8 shows the structure of a receiver 350 in Embodiment 3 of the present invention. Structural elements that are the same as a conventional receiver bear the same reference signs, and a description thereof is omitted.

As compared to the conventional receiver 1100 of FIG. 33, the receiver 350 of FIG. 8 differs in the configuration of an L1 signaling data analyzer 371 in an L1 signaling data decoder 361.

In the receiver 350 of FIG. 8, the L1 signaling data analyzer 371 analyzes the decoded L1-pre signaling data and L1-post signaling data, outputting the transmission parameters. Among the L1-post signaling data, the L1 signaling data analyzer 371 follows a selected PLP instruction to extract and analyze the transmission parameters for the PLP selected by the user. At this point, the L1 signaling data analyzer 371 determines, based on the PLP_ID, whether the bit pattern of the L1-post signaling data portion pertaining to the PLP selected by the user has been inverted. If not, the L1 signaling data analyzer 371 analyses the information as is. If, however, the bit pattern has been inverted, the L1 signaling data analyzer 371 first inverts the bit pattern, then performs analysis and outputs the transmission parameters.

Note that in Embodiment 3, since the bit pattern of PLPs whose PLP_ID is an odd number is inverted at the transmitting end, it is determined that the bit pattern has been inverted when the PLP_ID of the PLP selected by the user is odd, and that the bit pattern has not been inverted when the PLP_ID is even.

Note that when the target of inversion at the transmitting end is the bit pattern of PLPs whose PLP_ID is even, it is determined that the bit pattern has been inverted when the PLP_ID of the PLP selected by the user is even, and that the bit pattern has not been inverted when the PLP_ID is odd.

Other operations are the same as the conventional receiver 1100 of FIG. 33.

Note that in the receiver 350 of FIG. 8, structural elements other than the antenna 1111 and the tuner 1112 may be provided as an integrated circuit 351.

With the above structure, even when the number of PLPs is large, a large bias in the mapping data of the L1-pre signaling data and the L1-post signaling data is prevented, thus avoiding concentration of power in specific samples within the P2 symbols. As a result, the influence of clipping in the receiver 350 can be avoided without requiring an increase in dynamic range, while suppressing an increased calculation load and increased cost of the receiver.

Embodiment 4

Figure 9:
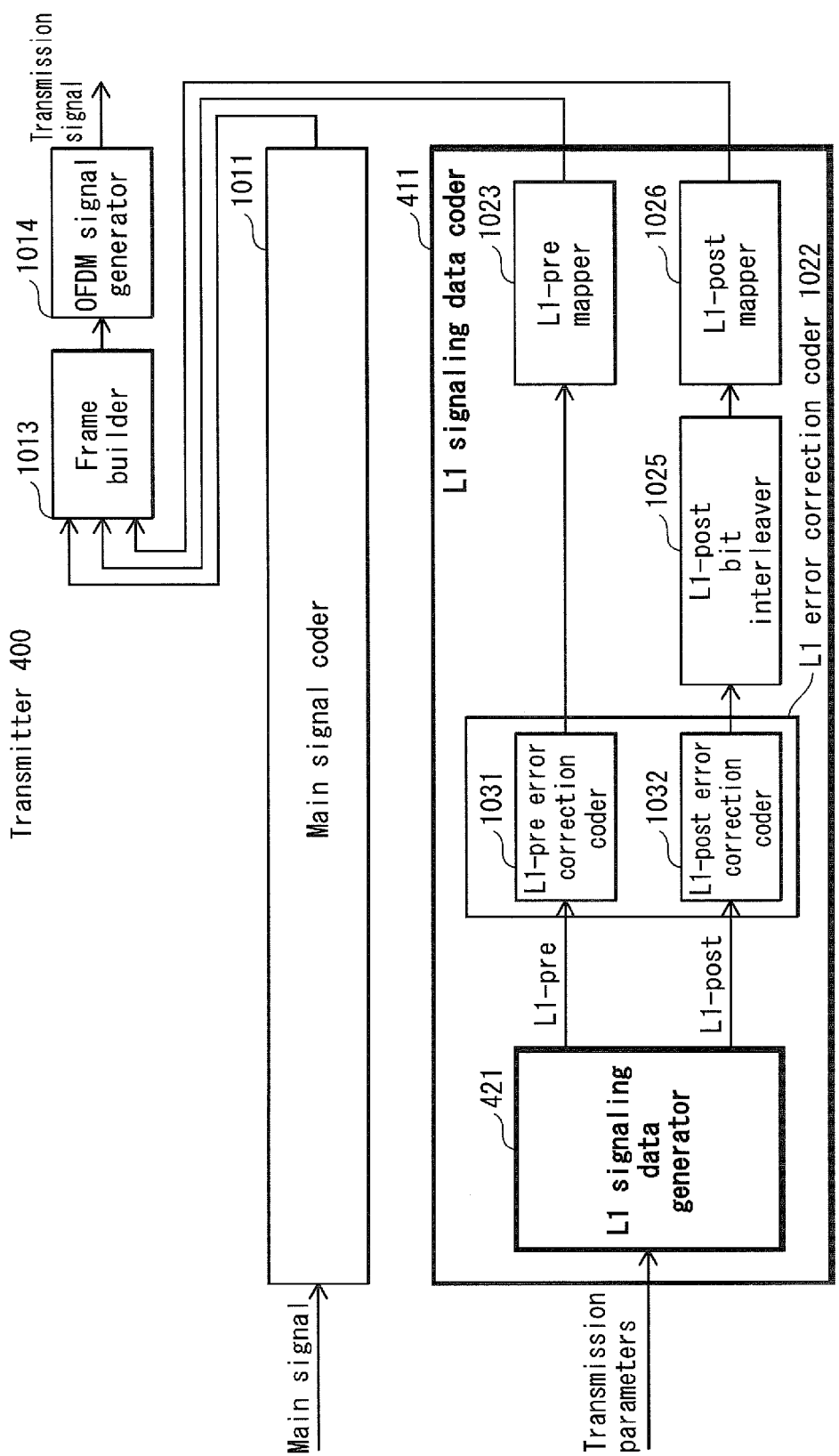
FIG. 9 shows the structure of a transmitter 400 in Embodiment 4.

FIG. 9 shows the structure of a transmitter 400 in Embodiment 4 of the present invention. Structural elements that are the same as a conventional transmitter bear the same reference signs, and a description thereof is omitted.

As compared to the conventional transmitter 1000 of FIG. 32, the transmitter 400 of FIG. 9 differs in the configuration of an L1 signaling data generator 421 in an L1 signaling data coder 411.

In the transmitter 400 of FIG. 9, the L1 signaling data generator 421 generates L1 signaling data from transmission parameters, i.e. transforms transmission parameters into L1 signaling data (L1-pre signaling data and L1-post signaling data) and outputs the L1 signaling data. At this point, the L1 signaling data generator 421 switches on use of the L1-post extension field (the portion surrounded by the dotted line in FIG. 31) in the L1-post signaling data shown in FIG. 31 and fills a predetermined number of bits of the L1-post extension field in the L1-post signaling data with 1's. One possible reference for deciding on the number of predetermined bits is the number of PLPs. For example, the number of bits per PLP to be filled with 1's may be determined. The product of this number and the number of PLPs then becomes the number of predetermined bits. The number of bits to be filled with 1's per PLP is determined, for example, to be a predetermined proportion (such as 80%) of the bits in the L1-post signaling data for one PLP. Note that the method of determining the predetermined number of bits with reference to the number of PLPs is not limited to the above method.

The L1 signaling data generator 421 may count the number of 0's and 1's in the L1-pre signaling data and the L1-post signaling data, deciding on the number of predetermined bits that would make the number of 0's and 1's even. The L1 signaling data generator 421 then fills the predetermined number of bits of the L1-post extension field of the L1-post signaling data with the value (0 or 1) that occurs less. In this case, if the number of 1's in the L1-pre signaling data or the L1-post signaling data is larger, then the predetermined number of bits are filled with 0's. Conversely, if the number of 0's in the L1-pre signaling data or the L1-post signaling data is larger, then the predetermined number of bits are filled with 1's. Note that instead of deciding on the predetermined number of bits so that the number of 0's and 1's becomes even, a predetermined number of bits may be decided on so that the difference between the number of 0's and of 1's falls within a predetermined value (for example, a value determined based on the results of simulation, or measurement in an actual device, of the difference between the number of 0's and 1's such that bias in the mapping data does not cause negative influence at the receiving end).

The L1-pre error correction coder 1031 performs error correction coding, based on BCH coding and LDPC coding, on the L1-pre signaling data output by the L1 signaling data generator 421. On the other hand, the L1-post error correction coder 1032 performs error correction coding, based on BCH coding and LDPC coding, on the L1-post signaling data (with the predetermined number of bits of the L1-post extension field having been filled) output by the L1 signaling data generator 421.

Other operations are the same as the conventional transmitter 1000 of FIG. 32.

In this context, the L1-post extension field is a field provided for future extension of the L1 signaling data. Since the L1-post extension field may be ignored at the receiving end, a receiver 450 having the same structure as the conventional receiver 1100 of FIG. 33 can decode a DVB-T2 transmission signal.

Figure 10:
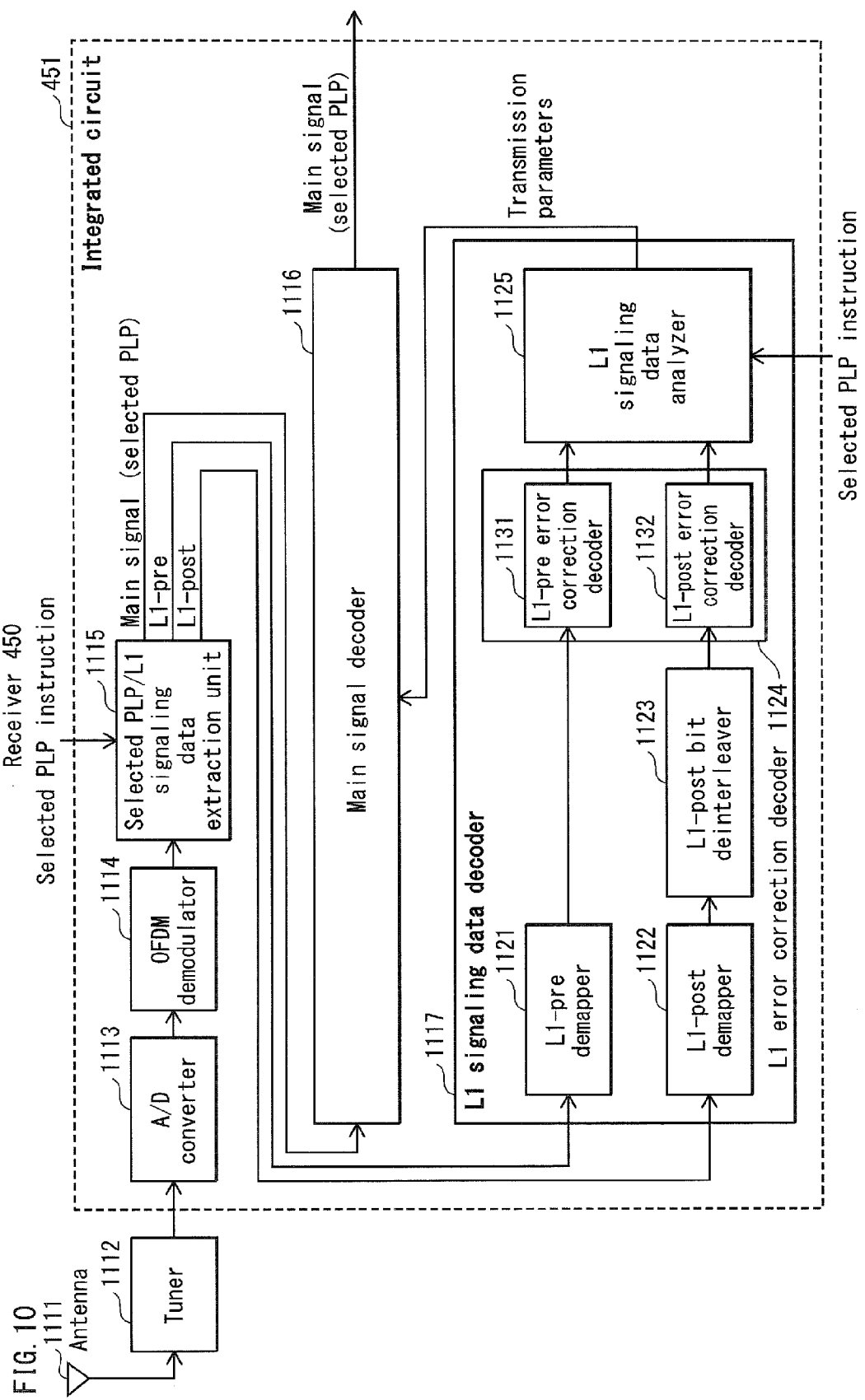
FIG. 10 shows the structure of a receiver 450 in Embodiment 4.

Note that as shown in FIG. 10, in the receiver 450, structural elements other than the antenna 1111 and the tuner 1112 may be provided as an integrated circuit 451.

With the above structure, even when the number of PLPs is large, a large bias in the mapping data of the L1-pre signaling data and the L1-post signaling data is prevented, thus avoiding concentration of power in specific samples within the P2 symbols. As a result, the influence of clipping in the receiver 450 can be avoided without requiring an increase in dynamic range, while suppressing an increased calculation load and increased cost of the receiver 450. In particular, Embodiment 4 has the advantage that a conventional receiver is useable without modification.

Considerations Regarding Embodiments 1 and 2

The inventors examined the improvement when adopting Embodiments 1 and 2 to the transmission parameters when the number of PLPs shown in FIG. 34 was 255 and to the transmission parameters when the number of PLPs was smaller than 255. FIGS. 11A through 11C show the results.

The analysis was performed on a DVB-T2 transmission signal (a signal in the time domain after an IFFT).

FIG. 11A is a table summarizing the results of analysis. For the number of PLPs between 1 and 255, the proportion of the L1 signaling data in the P2 symbols (NumL1/NumActiveCarrier) is also shown. In FIG. 11A, "NumL1PreCells" is the number of cells of L1-pre signaling data per frame. "NumL1PostCells" is the number of cells of L1-post signaling data per frame. "NumActiveCarrier" is the number of active carriers per symbol. "NumP2Symbols" is the number of P2 symbols per frame. "PAPR w/o Scramble" is the PAPR of the conventional transmitter 1000. "PAPR w Scramble before Coding" is the PAPR when adopting Embodiment 1, and "PAPR w Scramble after Coding" is the PAPR when adopting Embodiment 2.

The horizontal axis of FIG. 11B shows the number of PLPs, and the horizontal axis of FIG. 11C shows the proportion of the L1 signaling data in the P2 symbols. The vertical axis of FIGS. 11B and 11C shows the PAPR, defined as follows.

PAPR=peak power of the entire sample included in the $P2$ symbols/average power of all symbols excluding $P2$ symbols As FIGS. 11B and 11C show, the PAPR (PAPR w/o Scramble) of the conventional transmitter 1000 increases by 13.7 dB when the number of PLPs increases from one to 255. On the other hand, the PAPR (PAPR w Scramble before Coding) when adopting Embodiment 1 remains constant. The PAPR (PAPR w Scramble after Coding) when adopting Embodiment 2 also remains constant.

Based on the above, the energy dispersion of Embodiments 1 and 2 clearly provides a great improvement in the PAPR. Furthermore, it is clear that when the number of PLPs is one, or when the proportion of L1 signaling data in the P2 symbols is small and the PAPR of the P2 symbols is equivalent to the data symbols, the energy dispersion of Embodiments 1 and 2 does not exert a negative influence.

FIGS. 11B and 11C show that when the number of PLPs is 15 or 31, the PAPR is nearly the same as when the number of PLPs is one, even in the conventional example that does not adopt Embodiment 1 or 2.

Based on this fact, Embodiments 1 through 4 may, for example, be modified so that when the number of PLPs is 31 or less, operations are performed as in the conventional example, whereas when the number of PLPs exceeds 31, operations are performed as described in Embodiments 1 through 4. Note that the number of PLPs for switching between operations as in the conventional example and operations as described in Embodiments 1 through 4 is not limited to "31", as a different number may be used. For example, the number of PLPs for switching operations may be determined in accordance with the desired PAPR.

This modification is described below in detail in Embodiments 5 through 8.

Embodiment 5

Figure 12:
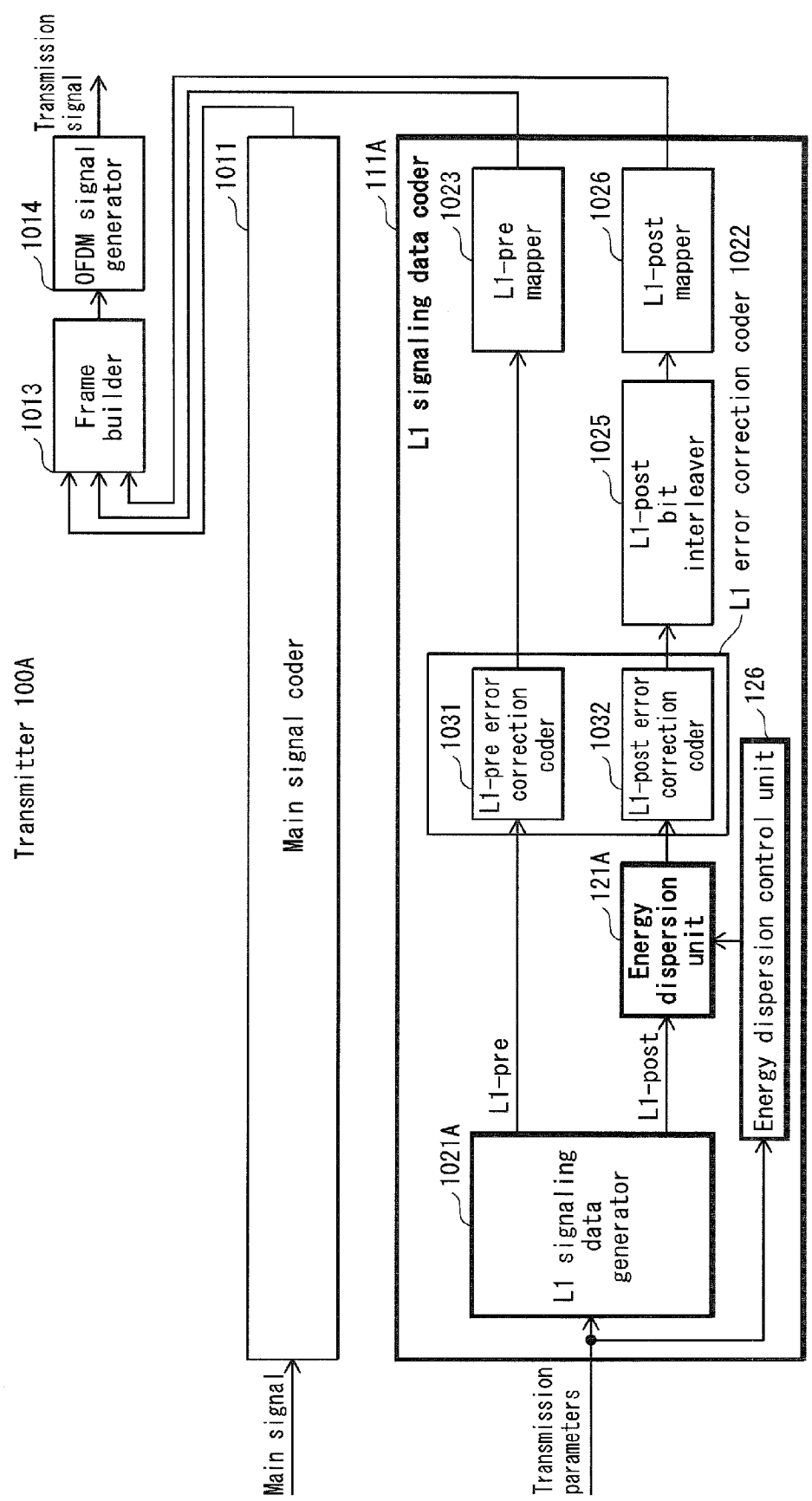
FIG. 12 shows the structure of a transmitter 100A in Embodiment 5.

FIG. 12 shows the structure of a transmitter 100A in Embodiment 5 of the present invention. Structural elements that are the same as a conventional transmitter and as the transmitter of Embodiment 1 bear the same reference signs, and a description thereof is omitted.

As compared to the transmitter 100 of FIG. 1 in Embodiment 1, the transmitter 100A of FIG. 12 differs in the configuration of an L1 signaling data generator 1021A and an energy dispersion unit 121A in an L1 signaling data generator 111A. Furthermore, an energy dispersion control unit 126 is added.

The L1 signaling data generator 1021A generates L1 signaling data from transmission parameters, i.e. transforms transmission parameters into L1 signaling data (L1-pre signaling data and L1-post signaling data) and outputs the L1 signaling data. At this point, if the number of PLPs exceeds a predetermined number, the L1 signaling data generator 1021A stores, in the L1-pre signaling data, information indicating that energy dispersion has been performed at the transmitting end. If the number of PLPs does not exceed a predetermined number, the L1 signaling data generator 1021A stores, in the L1-pre signaling data, information indicating that energy dispersion has not been performed at the transmitting end. The field in which this information is stored is, for example, a RESERVED field in the L1-pre signaling data.

The energy dispersion control unit 126 identifies the number of PLPs from the transmission parameters. When the number of PLPs exceeds the predetermined number, the energy dispersion control unit 126 turns the energy dispersion operations of the energy dispersion unit 121A ON, whereas when the number of PLPs does not exceed the predetermined number, the energy dispersion control unit 126 turns the energy dispersion operations of the energy dispersion unit 121A OFF.

When the energy dispersion operations have been turned ON by the energy dispersion control unit 126, the energy dispersion unit 121A performs energy dispersion in order on the L1-post signaling data output by the L1 signaling data generator 1021A and outputs the energy-dispersed L1-post signaling data to the L1-post error correction coder 1032. On the other hand, when the energy dispersion operations have been turned OFF by the energy dispersion control unit 126, the energy dispersion unit 121A outputs L1-post signaling data on which energy dispersion has not been performed (identical to the L1-post signaling data output by the L1 signaling data generator 1021A) to the L1-post error correction coder 1032.

Figure 13:
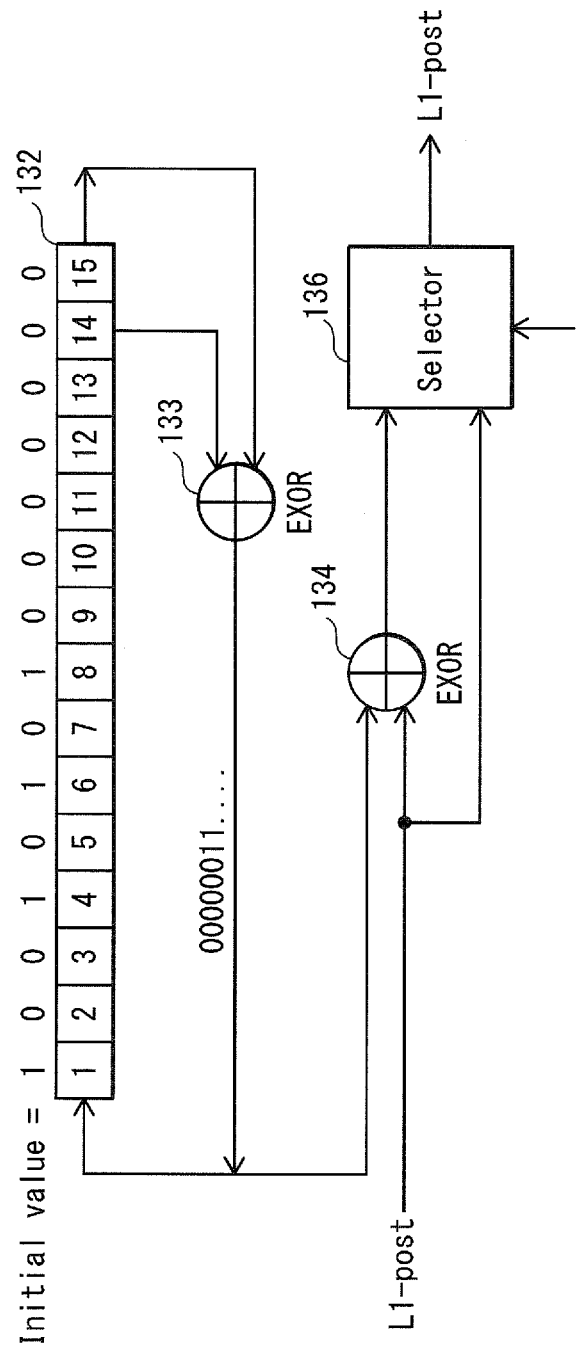
FIG. 13 shows the structure of the energy dispersion unit 121A of FIG. 12.

FIG. 13 shows the structure of the energy dispersion unit 121A of FIG. 12. The energy dispersion unit 121A uses a $15^{th}$ order PRBS as a dispersion sequence, as shown in the following expression.

$$1+X^{14}+X^{15}$$

A selector 136 in the energy dispersion unit 121A is controlled by the energy dispersion control unit 126 so that, when the energy dispersion operations are OFF (when the number of PLPs does not exceed the predetermined number), the selector 136 selects the L1-post signaling data output by the L1 signaling data generator 1021A and outputs the L1-post signaling data to the L1-post error correction coder 1032. On the other hand, the selector 136 is controlled by the energy dispersion control unit 126 so that, when the energy dispersion operations are ON (when the number of PLPs exceeds the predetermined number), the selector 136 selects the energy-dispersed L1-post signaling data output by the EXOR circuit 134 and outputs the L1-post signaling data to the L1-post error correction coder 1032. Note that at the timing of the first bit of the L1-post signaling data, an initial value of "100101010000000" is assigned to the 15-bit shift register 132. From the second bit to the last bit of the L1-post signaling data, the 15-bit shift register 132 operates sequentially, without assignment of the initial value.

In this context, it is necessary at the receiving end to determine whether or not energy dispersion was performed at the transmitting end. Therefore, the number of PLPs used as the reference for whether to perform energy dispersion is stored in the L1-post signaling data. If energy dispersion is simply performed on the L1-post signaling data, it will be impossible at the receiving end to determine whether or not to perform reverse energy dispersion. In Embodiment 5, therefore, an indication of whether energy dispersion is performed is stored in the L1-pre signaling data. The L1-pre signaling data, which stores this indication of whether energy dispersion is performed, is not energy dispersed; rather, energy dispersion is performed only on the L1-post signaling data. The same is true in Embodiment 6 below as well.

The L1-pre error correction coder 1031 performs error correction coding, based on BCH coding and LDPC coding, on the L1-pre signaling data output by the L1 signaling data generator 1021A. The L1-post error correction coder 1032 performs error correction coding, based on BCH coding and LDPC coding, on the energy-dispersed L1-post signaling data, or on the L1-post signaling data on which energy dispersion has not been performed, output by the energy dispersion unit 121A.

Other operations are the same as the conventional transmitter 1000 of FIG. 32.

Figure 14:
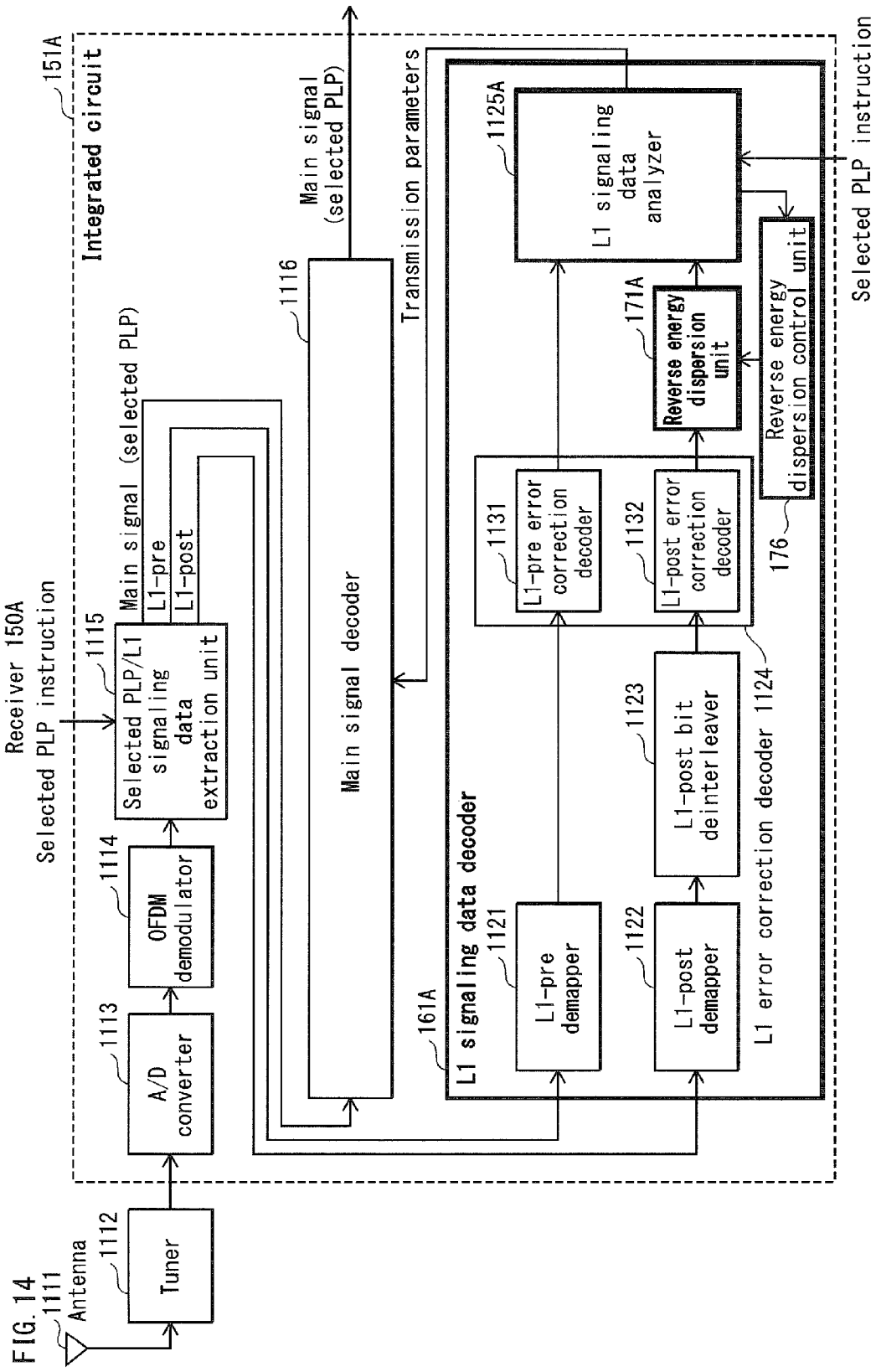
FIG. 14 shows the structure of a receiver 150A in Embodiment 5.

FIG. 14 shows the structure of a receiver 150A in Embodiment 5 of the present invention. Structural elements that are the same as a conventional receiver and the receiver of Embodiment 1 bear the same reference signs, and a description thereof is omitted.

As compared to the receiver 150 of FIG. 3 in Embodiment 1, the receiver 150A of FIG. 14 differs in the configuration of a reverse energy dispersion unit 171A and an L1 signaling data analyzer 1125A in an L1 signaling data decoder 161A. Furthermore, a reverse energy dispersion control unit 176 is added.

The L1 signaling data analyzer 1125A analyzes whether the decoded L1-pre signaling data output by the L1-pre error correction decoder 1131 has been energy dispersed at the transmitting end and outputs the results of analysis to the reverse energy dispersion control unit 176.

Based on the results of analysis from the L1 signaling data analyzer 1125A, the reverse energy dispersion control unit 176 turns reverse energy dispersion operations of the reverse energy dispersion unit 171A ON when energy dispersion has been performed at the transmitting end and turns reverse energy dispersion operations of the reverse energy dispersion unit 171A OFF when energy dispersion has not been performed at the transmitting end.

When reverse energy dispersion operations have been turned ON by the reverse energy dispersion control unit 176, the reverse energy dispersion unit 171A performs reverse energy dispersion in order on the decoded L1-post signaling data output by the L1-post error correction decoder 1132, outputting the reverse energy-dispersed L1-post signaling data to the L1 signaling data analyzer 1125A. On the other hand, when reverse energy dispersion operations have been turned OFF by the reverse energy dispersion control unit 176, the reverse energy dispersion unit 171A outputs the L1-post signaling data on which reverse energy dispersion has not been performed (identical to the decoded L1-post signaling data output by the L1-post error correction decoder 1132) to the L1 signaling data analyzer 1125A. The structure of the reverse energy dispersion unit 171A is the same as that of the energy dispersion unit 121A shown in FIG. 13. The source of input is the L1-post error correction decoder 1132, and the destination of output is the L1 signaling data analyzer 1125A. A selector 136 in the reverse energy dispersion unit 171A is controlled by the reverse energy dispersion control unit 176 so that, when the reverse energy dispersion operations are OFF (when the number of PLPs does not exceed the predetermined number), the selector 136 selects the L1-post signaling data output by the L1-post error correction decoder 1132 and outputs the L1-post signaling data to the L1 signaling data analyzer 1125A. On the other hand, the selector 136 is controlled by the reverse energy dispersion control unit 176 so that, when the energy dispersion operations are ON (when the number of PLPs exceeds the predetermined number), the selector 136 selects the energy dispersed L1-post signaling data output by the EXOR circuit 134 and outputs the L1-post signaling data to the L1 signaling data analyzer 1125A. The L1 signaling data analyzer 1125A analyzes the L1-pre signaling data and the L1-post signaling data and outputs the transmission parameters.

Since the reverse energy dispersion unit 171A is a structural element that reverses the energy dispersion performed at the transmitting end by the energy dispersion unit 121A, the reverse energy dispersion unit 171A uses the $15^{th}$ order PRBS in the following expression as a dispersion sequence, just as the energy dispersion unit 121A does.

$$1+X^{14}+X^{15}$$

The initial value assigned to the shift register 132 in the reverse energy dispersion unit 171A and the timing of assignment of the initial value need to match the initial value assigned to the shift register 132 in the energy dispersion unit 121A and the timing of assignment of the initial value. Therefore, in the reverse energy dispersion unit 171A, an initial value of "100101010000000" is assigned to the 15-bit shift register 132 at the timing of the first bit of the L1-post signaling data. From the second bit to the last bit of the L1-post signaling data, the 15-bit shift register 132 operates sequentially, without assignment of the initial value.

Other operations are the same as the conventional receiver 1100 of FIG. 33.

Note that in the receiver 150A of FIG. 14, structural elements other than the antenna 1111 and the tuner 1112 may be provided as an integrated circuit 151A.

With the above structure, even when the number of PLPs is large, a large bias in the mapping data of the L1-pre signaling data and the L1-post signaling data is randomized, thus avoiding concentration of power in specific samples within the P2 symbols. As a result, the influence of clipping in the receiver 150A can be avoided without requiring an increase in dynamic range, while suppressing an increased calculation load and increased cost of the receiver 150A. Furthermore, the above structure offers the advantage that a conventional receiver can receive a broadcast service in which the number of PLPs does not exceed the predetermined number, since in this case energy dispersion is not performed.

Embodiment 6

Figure 15:
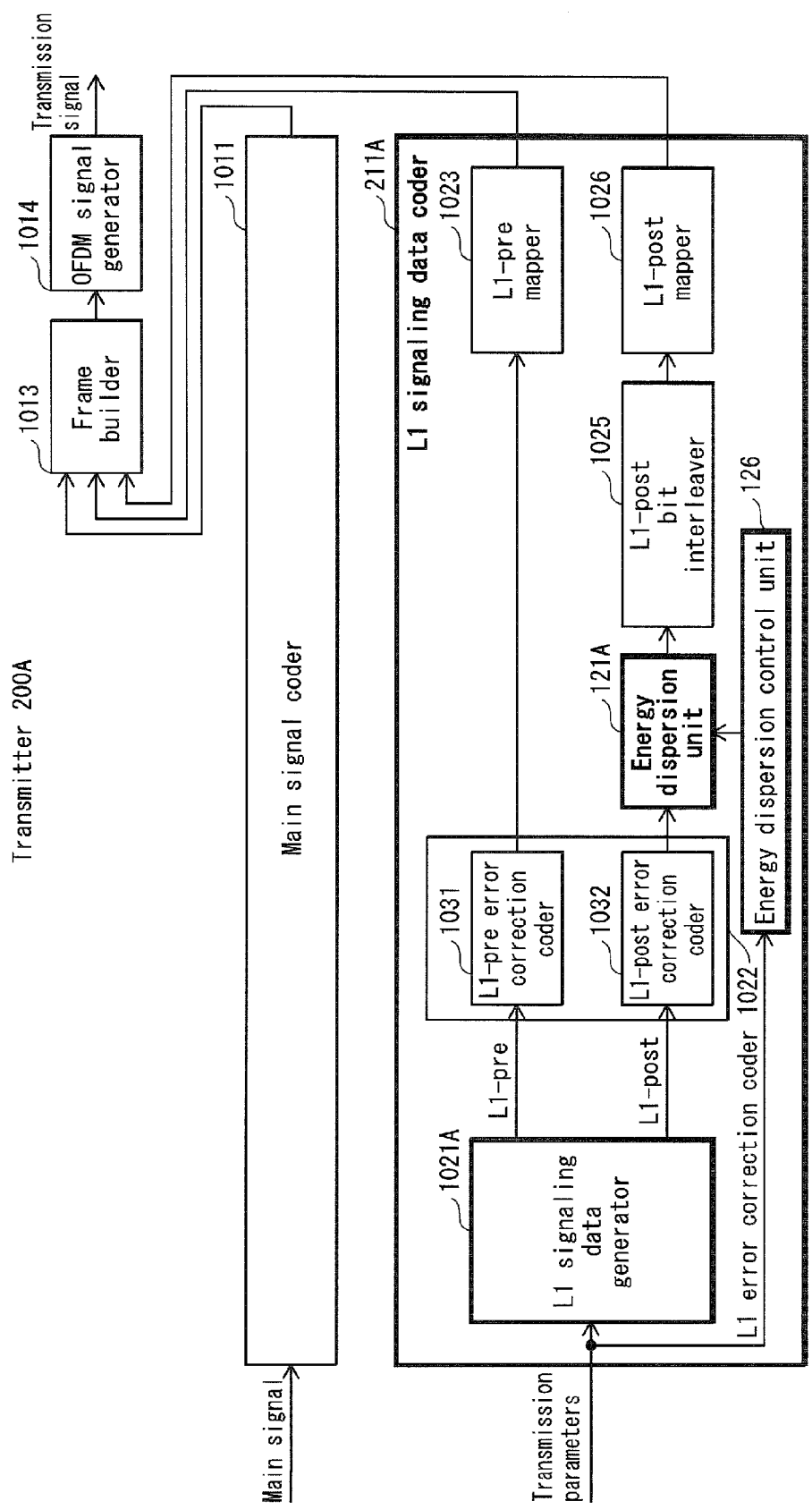
FIG. 15 shows the structure of a transmitter 200A in Embodiment 6.

FIG. 15 shows the structure of a transmitter 200A in Embodiment 6 of the present invention. Structural elements that are the same as a conventional transmitter and as the transmitter of Embodiments 1, 2, and 5 bear the same reference signs, and a description thereof is omitted.

As compared to the transmitter 200 of FIG. 4 in Embodiment 2, the transmitter 200A of FIG. 15 differs in the configuration of an L1 signaling data generator 1021A and an energy dispersion unit 121A in an L1 signaling data generator 111A. Furthermore, an energy dispersion control unit 126 is added. The location in which the energy dispersion unit 121A is added differs, however, between Embodiment 5 and Embodiment 6.

In the transmitter 200A of FIG. 15, when the energy dispersion operations have been turned ON by the energy dispersion control unit 126, the energy dispersion unit 121A performs energy dispersion in order on the error correction coded L1-post signaling data output by the L1-post error correction coder 1032 and outputs the energy-dispersed L1-post signaling data to the L1-post bit interleaver 1025. On the other hand, when the energy dispersion operations have been turned OFF by the energy dispersion control unit 126, the energy dispersion unit 121A outputs error correction coded L1-post signaling data on which energy dispersion has not been performed (identical to the error correction coded L1-post signaling data output by the L1-post error correction coder 1032) to the L1-post bit interleaver 1025. The structure of the energy dispersion unit 121A is as shown in FIG. 13. The source of input and destination of output of information differs between the energy dispersion unit 121A of Embodiment 5 and the energy dispersion unit 121A of Embodiment 6.

The L1-pre mapper 1023 maps the error correction coded L1-pre signaling data, output by the L1-pre error correction coder 1031, to I/Q coordinates, outputting mapping data for the L1-pre signaling data. On the other hand, the L1-post bit interleaver 1025 interleaves, in units of bits, the error correction coded, energy-dispersed L1-post signaling data, or the error correction coded L1-post signaling data on which energy dispersion has not been performed, output by the energy dispersion unit 121A.

Other operations are the same as the conventional transmitter 1000 of FIG. 32.

Figure 16:
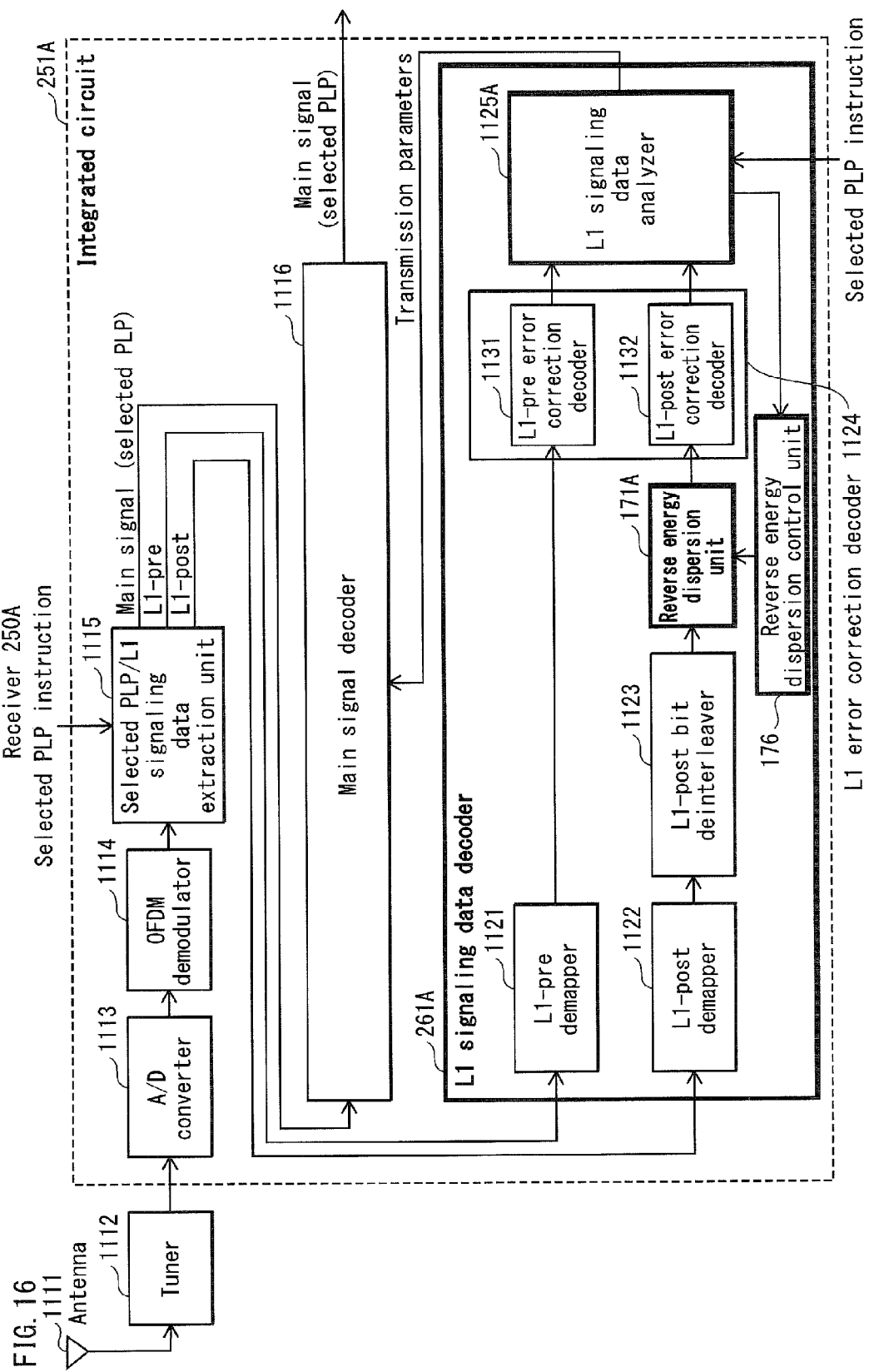
FIG. 16 shows the structure of a receiver 250A in Embodiment 6.

FIG. 16 shows the structure of a receiver 250A in Embodiment 6 of the present invention. Structural elements that are the same as a conventional receiver and the receiver of Embodiments 1, 2, and 5 bear the same reference signs, and a description thereof is omitted.

As compared to the receiver 250 of FIG. 5 in Embodiment 2, the receiver 250A of FIG. 16 differs in the configuration of a reverse energy dispersion unit 171A and an L1 signaling data analyzer 1125A in an L1 signaling data decoder 261A. Furthermore, a reverse energy dispersion control unit 176 is added. The location in which the reverse energy dispersion unit 171A is added differs, however, between Embodiment 5 and Embodiment 6.

In the receiver 250A of FIG. 16, when reverse energy dispersion operations have been turned ON by the reverse energy dispersion control unit 176, the reverse energy dispersion unit 171A performs reverse energy dispersion in order on the L1-post signaling data output by the L1-post bit deinterleaver 1123, thus reversing the energy dispersion performed at the transmitting end by the energy dispersion unit 121A. The reverse energy dispersion unit 171A then outputs the L1-post signaling data on which reverse energy dispersion has been performed to the L1-post error correction decoder 1132. On the other hand, when reverse energy dispersion operations have been turned OFF by the reverse energy dispersion control unit 176, the reverse energy dispersion unit 171A outputs the L1-post signaling data on which reverse energy dispersion has not been performed (identical to the L1-post signaling data output by the L1-post bit deinterleaver 1123) to the L1-post error correction decoder 1132. The structure of the reverse energy dispersion unit 171A is the same as the energy dispersion unit 121A shown in FIG. 13. The source of input and destination of output of information, however, differs between the reverse energy dispersion unit 171A of Embodiment 5 and the reverse energy dispersion unit 171A of Embodiment 6.

The L1-pre error correction decoder 1131 performs error correction decoding of the demapped L1-pre signaling data, output by the L1-pre demapper 1121, based on LDPC decoding and BCH decoding. The L1-post error correction decoder 1132 performs error correction decoding, based on LDPC decoding and BCH decoding, on the L1-post signaling data on which reverse energy dispersion has been performed, or the L1-post signaling data on which reverse energy dispersion has not been performed, output by the reverse energy dispersion unit 171A.

Other operations are the same as the conventional receiver 1100 of FIG. 33.

Note that in the receiver 250A of FIG. 16, structural elements other than the antenna 1111 and the tuner 1112 may be provided as an integrated circuit 251A.

With the above structure, even when the number of PLPs is large, a large bias in the mapping data of the L1-pre signaling data and the L1-post signaling data is randomized, thus avoiding concentration of power in specific samples within the P2 symbols. As a result, the influence of clipping in the receiver 250A can be avoided without requiring an increase in dynamic range, while suppressing an increased calculation load and increased cost of the receiver 250A. Furthermore, the above structure offers the advantage that a conventional receiver is useable without modification for a broadcast service in which the number of PLPs does not exceed the predetermined number, since in this case energy dispersion is not performed.

In Embodiment 5, energy dispersion is only performed on information bits of error correction coding based on BCH coding and LDPC coding. By contrast, in Embodiment 6, energy dispersion is performed on information bits and on parity bits of error correction coding based on BCH coding and LDPC coding. Therefore, as compared to Embodiment 5, Embodiment 6 offers the possibility of further suppressing bias in the mapping data of the L1 signaling data.

Embodiment 7

Figure 17:
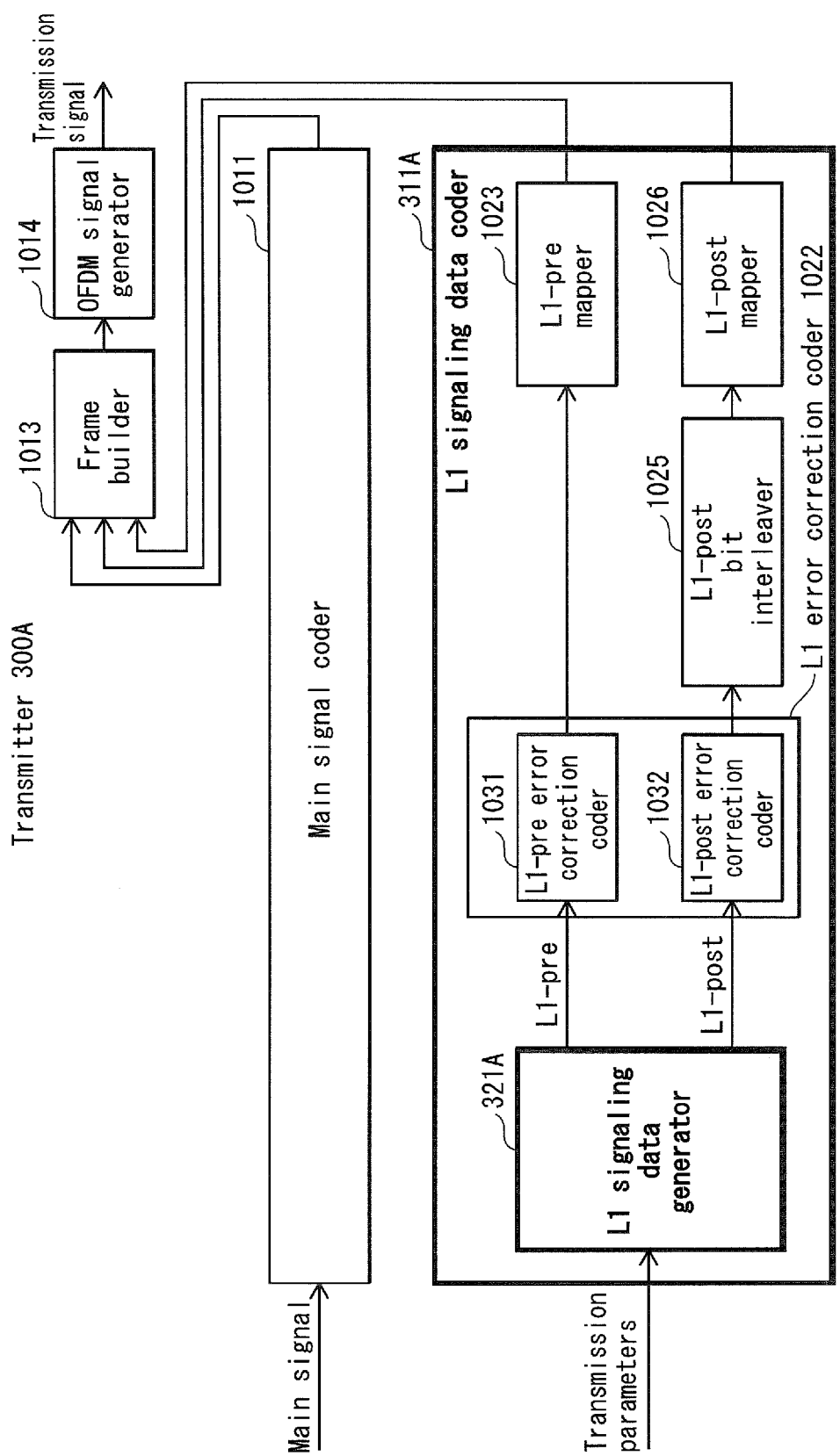
FIG. 17 shows the structure of a transmitter 300A in Embodiment 7.

FIG. 17 shows the structure of a transmitter 300A in Embodiment 7 of the present invention. Structural elements that are the same as a conventional transmitter bear the same reference signs, and a description thereof is omitted.

As compared to the transmitter 300 of FIG. 6 in Embodiment 3, the transmitter 300A of FIG. 17 differs in the configuration of an L1 signaling data generator 321A in an L1 signaling data coder 311A.

In the transmitter 300A of FIG. 17, the L1 signaling data generator 321A generates L1 signaling data from transmission parameters, i.e. transforms transmission parameters into L1 signaling data (L1-pre signaling data and L1-post signaling data) and outputs the L1 signaling data. At this point, the L1 signaling data generator 321A identifies the number of PLPs from the transmission parameters. When the identified number of PLPs does not exceed a predetermined number, the L1 signaling data generator 321A does not invert the bit pattern in the L1-post signaling data of the L1-post signaling data portions pertaining to PLPs with an odd-numbered PLP_ID. On the other hand, when the identified number of PLPs exceeds a predetermined number, the L1 signaling data generator 321A inverts the bit pattern in the L1-post signaling data of the L1-post signaling data portions (excluding the PLP_ID) pertaining to PLPs with an odd-numbered PLP_ID. Note that the L1 signaling data generator 321A does not invert the bit pattern of other portions of the L1-post signaling data.

The L1-pre error correction coder 1031 performs error correction coding, based on BCH coding and LDPC coding, on the L1-pre signaling data output by the L1 signaling data generator 321A. On the other hand, the L1-post error correction coder 1032 performs error correction coding, based on BCH coding and LDPC coding, on the L1-post signaling data (the bit pattern of which either has or has not been inverted) output by the L1 signaling data generator 321A.

Note that instead of inverting the bit pattern in the L1-post signaling data of the L1-post signaling data portions (excluding the PLP_ID) pertaining to PLPs with an odd-numbered PLP_ID, the L1 signaling data generator 321A may invert the bit pattern in the L1-post signaling data of the L1-post signaling data portions (excluding the PLP_ID) pertaining to PLPs with an even-numbered PLP_ID.

Other operations are the same as the conventional transmitter 1000 of FIG. 32.

Figure 18:
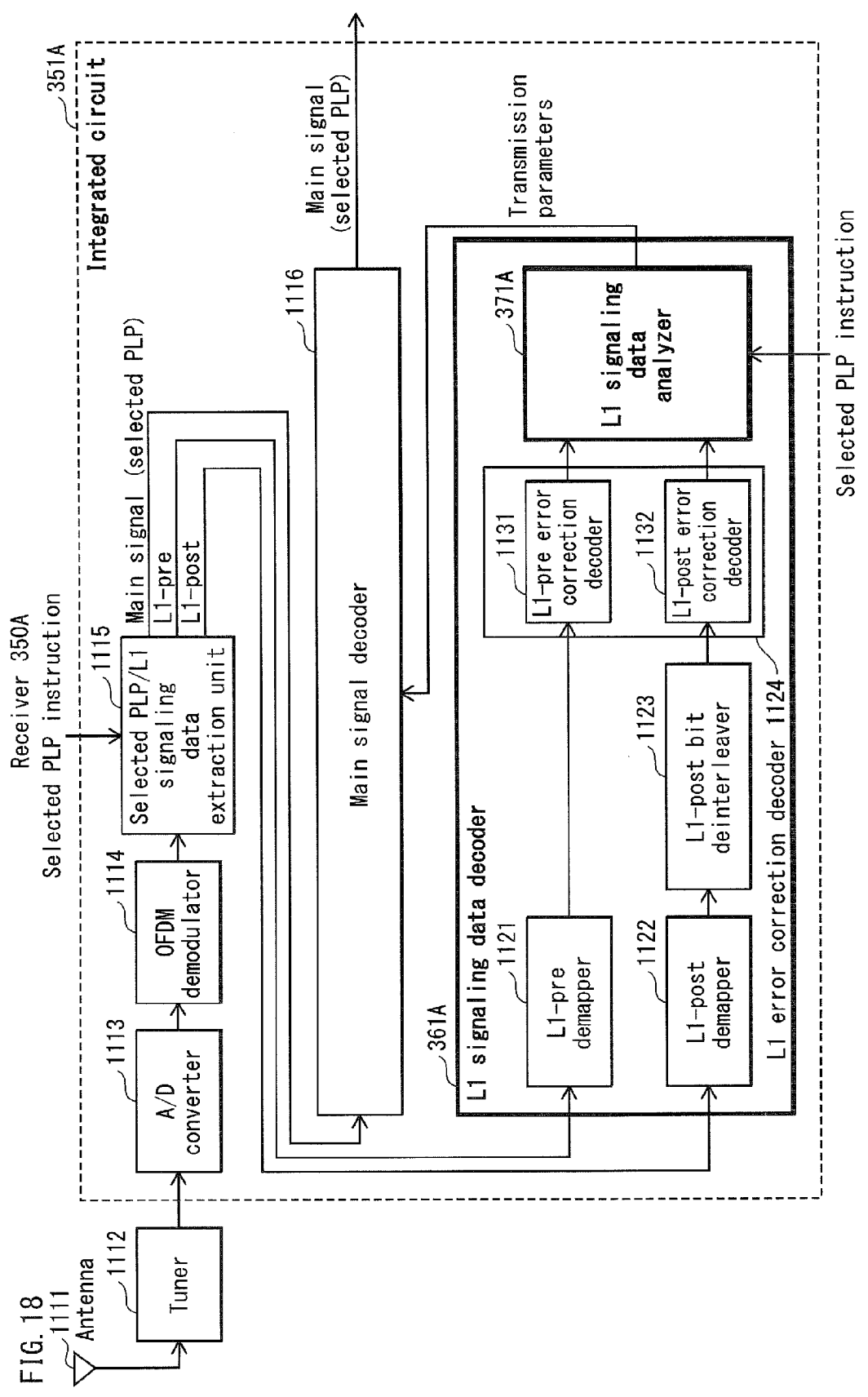

FIG. 18 shows the structure of a receiver 350A in Embodiment 7 of the present invention. Structural elements that are the same as a conventional receiver bear the same reference signs, and a description thereof is omitted.

As compared to the receiver 350 of FIG. 8 in Embodiment 3, the receiver 350A of FIG. 18 differs in the configuration of an L1 signaling data analyzer 371A in an L1 signaling data coder 361A.

In the receiver 350A of FIG. 18, the L1 signaling data analyzer 371A analyzes the decoded L1-pre signaling data and L1-post signaling data, outputting the transmission parameters. Among the L1-post signaling data, the L1 signaling data analyzer 371A follows a selected PLP instruction to extract and analyze the transmission parameters for the PLP selected by the user. At this point, the L1 signaling data analyzer 371A determines, based on the number of PLPs and the PLP_ID, whether the bit pattern has been inverted. If not, the L1 signaling data analyzer 371A analyses the information as is. If, however, the bit pattern has been inverted, the L1 signaling data analyzer 371A first inverts the bit pattern, then performs analysis and outputs the transmission parameters.

Note that in Embodiment 7, since the bit pattern of PLPs whose PLP_ID is an odd number is inverted at the transmitting end, it is determined that the bit pattern has been inverted when the PLP_ID of the PLP selected by the user is odd and the number of PLPs exceeds the predetermined number, and that the bit pattern has not been inverted in any other case.

Note that when the target of inversion at the transmitting end is the bit pattern of PLPs whose PLP_ID is even, it is determined that the bit pattern has been inverted when the PLP_ID of the PLP selected by the user is even and the number of PLPs exceeds the predetermined number, and that the bit pattern has not been inverted in any other case.

Other operations are the same as the conventional receiver 1100 of FIG. 33.

With the above structure, even when the number of PLPs is large, a large bias in the mapping data of the L1-pre signaling data and the L1-post signaling data is randomized, thus avoiding concentration of power in specific samples within the P2 symbols. As a result, the influence of clipping in the receiver 350A can be avoided without requiring an increase in dynamic range, while suppressing an increased calculation load and increased cost of the receiver 350A. Furthermore, the above structure offers the advantage that a conventional receiver is useable without modification for a broadcast service in which the number of PLPs does not exceed the predetermined number, since in this case the bit pattern is not inverted.

Embodiment 8

Figure 19:
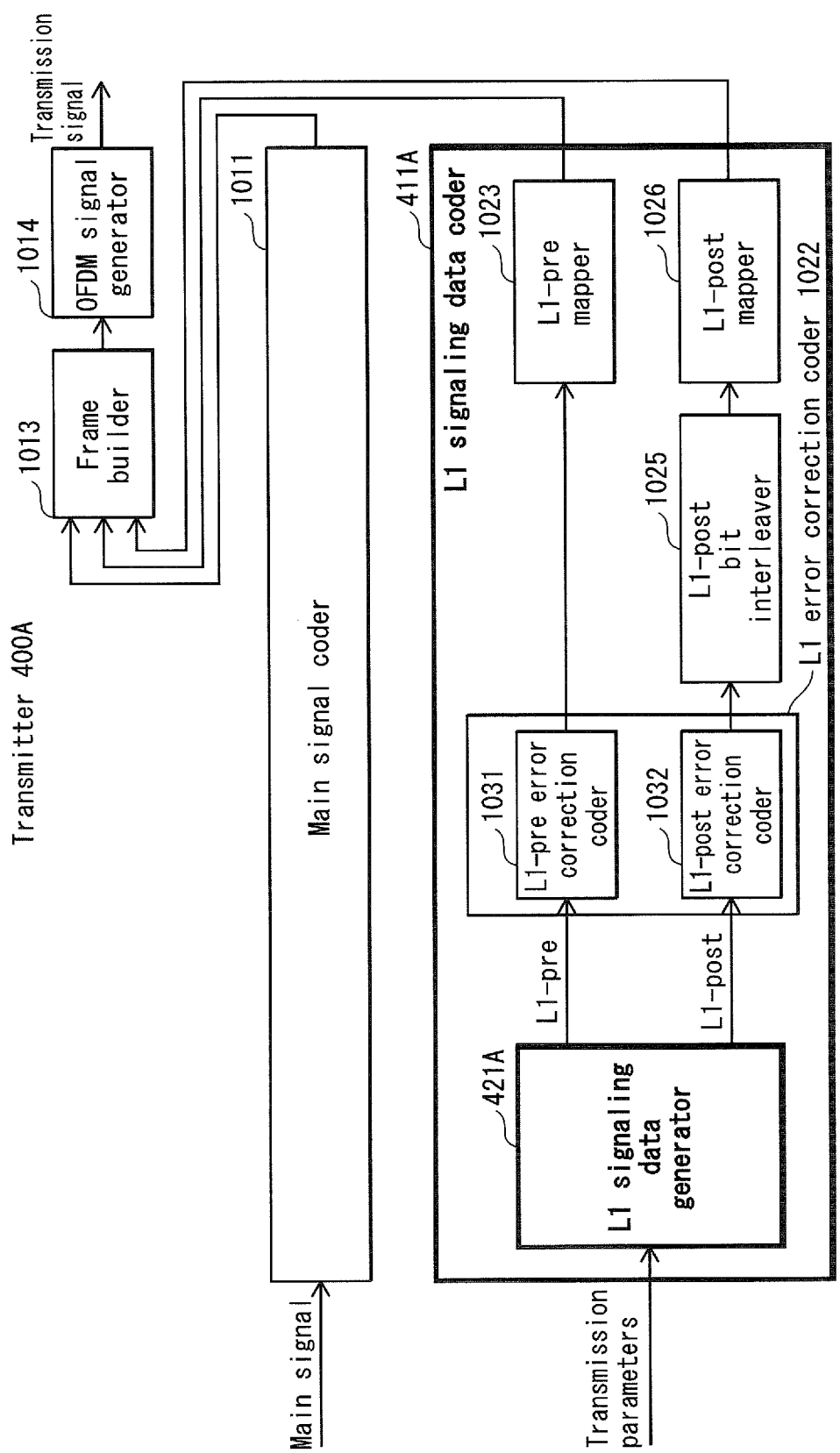
FIG. 19 shows the structure of a transmitter 400A in Embodiment 8.

FIG. 19 shows the structure of a transmitter 400A in Embodiment 8 of the present invention. Structural elements that are the same as a conventional transmitter bear the same reference signs, and a description thereof is omitted.

As compared to the transmitter 400 of FIG. 9 in Embodiment 3, the transmitter 400A of FIG. 19 differs in the configuration of an L1 signaling data generator 421A in an L1 signaling data coder 411A.

In the transmitter 400A of FIG. 19, the L1 signaling data generator 421A generates L1 signaling data from transmission parameters, i.e. transforms transmission parameters into L1 signaling data (L1-pre signaling data and L1-post signaling data) and outputs the L1 signaling data. At this point, the L1 signaling data generator 421A determines the number of PLPs from the transmission parameters. When the number of PLPs does not exceed a predetermined number, the L1 signaling data generator 421A switches off use of the L1-post extension field (the portion surrounded by the dotted line in FIG. 31) in the L1-post signaling data shown in FIG. 31. On the other hand, when the number of PLPs exceeds a predetermined number, the L1 signaling data generator 421A switches on use of the L1-post extension field (the portion surrounded by the dotted line in FIG. 31) in the L1-post signaling data shown in FIG. 31 and fills a predetermined number of bits of the L1-post extension field in the L1-post signaling data with 1's. The predetermined number of bits may be decided on by referring to the number of PLPs, or by counting the number of bits that are 0's and the number of bits that are 1's in the L1-pre signaling data and the L1-post signaling data, as described in Embodiment 4. With the latter approach, the predetermined number of bits may in some cases be filled with 0's.

The L1-pre error correction coder 1031 performs error correction coding, based on BCH coding and LDPC coding, on the L1-pre signaling data output by the L1 signaling data generator 421A. On the other hand, the L1-post error correction coder 1032 performs error correction coding, based on BCH coding and LDPC coding, on the L1-post signaling data (with the predetermined number of bits of the L1-post extension field either having been filled or not having been filled) output by the L1 signaling data generator 421A.

Other operations are the same as the conventional transmitter 1000 of FIG. 32.

As described in Embodiment 4, the L1-post extension field is a field provided for future extension of the L1 signaling data. Since the L1-post extension field may be ignored at the receiving end, a receiver 450A, shown in FIG. 20, that has the same structure as the conventional receiver 1100 of FIG. 33 can decode the DVB-T2 transmission signal.

Figure 20:
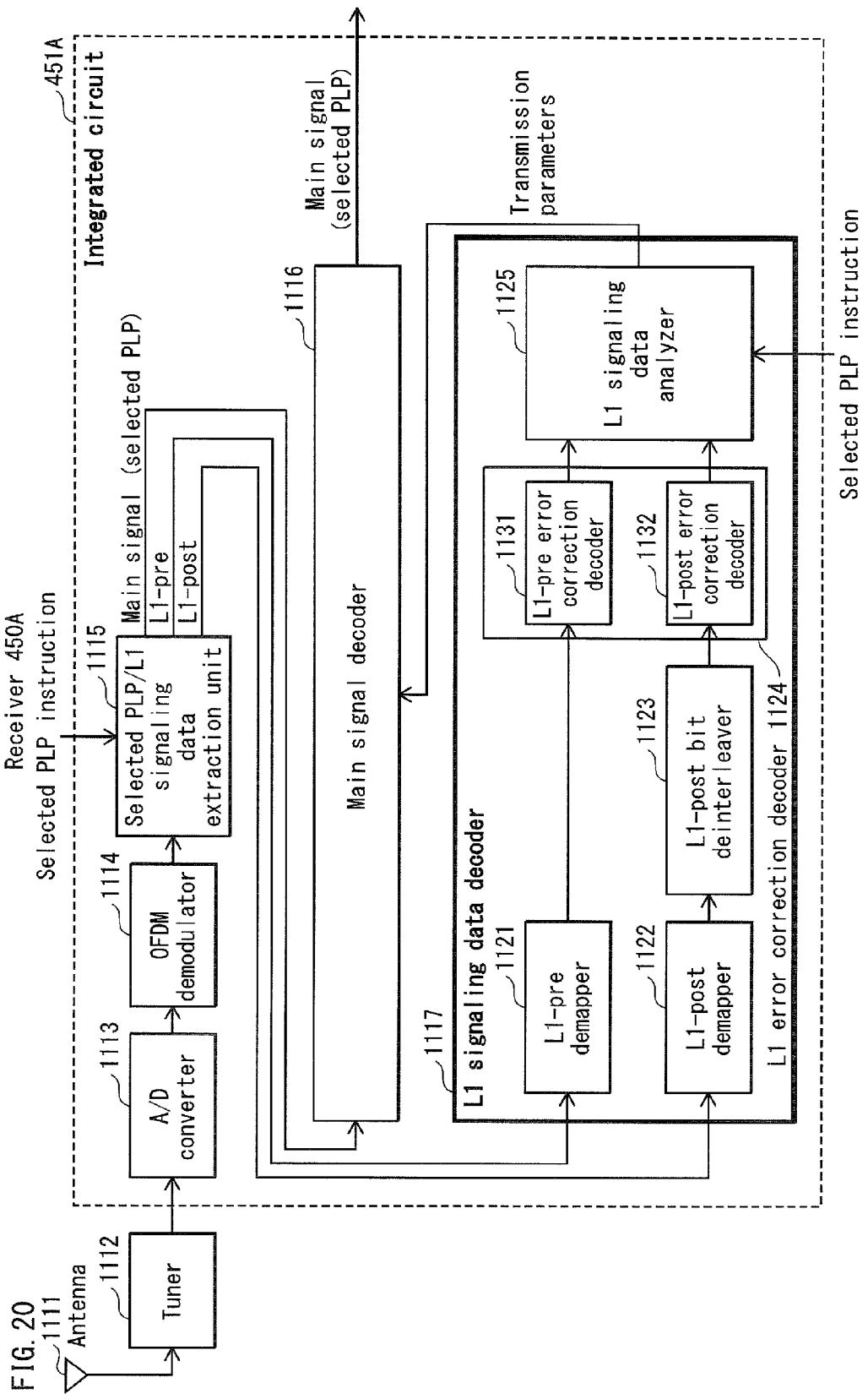
FIG. 20 shows the structure of a receiver 450A in Embodiment 8.

Note that as shown in FIG. 20, in the receiver 450A, structural elements other than the antenna 1111 and the tuner 1112 may be provided as an integrated circuit 451A.

With the above structure, even when the number of PLPs is large, a large bias in the mapping data of the L1-pre signaling data and the L1-post signaling data is prevented, thus avoiding concentration of power in specific samples within the P2 symbols. As a result, the influence of clipping in the receiver 450A can be avoided without requiring an increase in dynamic range, while suppressing an increased calculation load and increased cost of the receiver. Furthermore, the receiver switches off use of the L1-post extension field of the L1-post signaling data when the number of PLPs does not exceed a predetermined number, thereby preventing a decrease in transmission capacity of the main signal. In particular, Embodiment 8 has the advantage that a conventional receiver is useable without modification.

Embodiment 9

The following describes a structural example of an application of the transmission methods and reception methods shown in the above embodiments and a system using the application.

Figure 21:
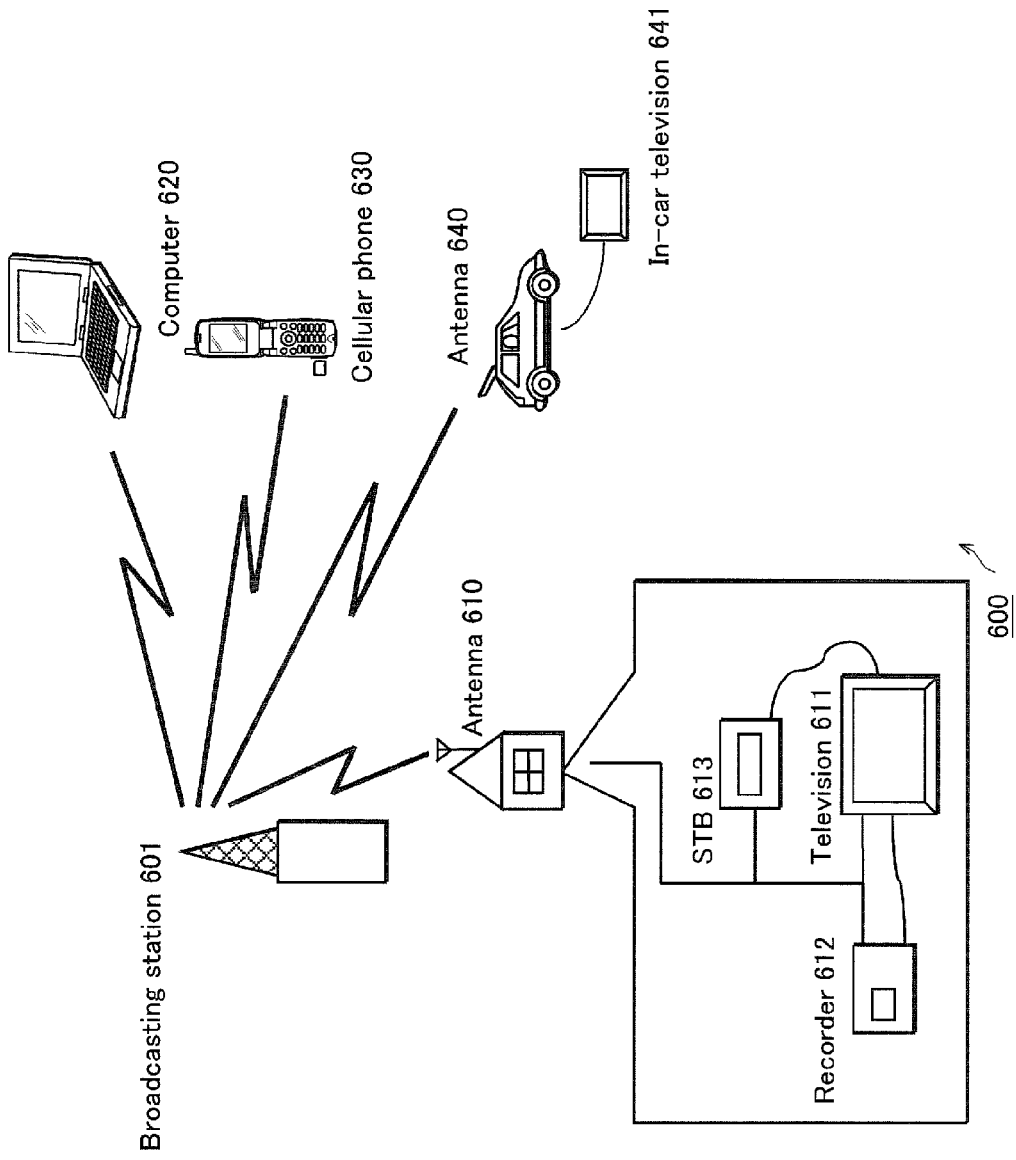
FIG. 21 shows the overall structure of a digital broadcasting system in Embodiment 9.

FIG. 21 shows an example of the structure of a system that includes devices implementing the transmission methods and reception methods described in the above embodiments. The transmission method and reception method described in the above embodiments are implemented in a digital broadcasting system 600, as shown in FIG. 21, that includes a broadcasting station 601 and a variety of receivers such as a television 611, a DVD recorder 612, a Set Top Box (STB) 613, a computer 620, an in-car television 641, and a mobile phone 630.

Specifically, the broadcasting station 601 transmits multiplexed data, in which video data, audio data, and the like are multiplexed, using the transmission methods in the above embodiments over a predetermined broadcasting band.

An antenna (for example, antennas 610 and 640) internal to each receiver, or provided externally and connected to the receiver, receives the signal transmitted from the broadcasting station 601. Each receiver obtains the multiplexed data by using the reception methods in the above embodiments to demodulate the signal received by the antenna. In this way, the digital broadcasting system 600 obtains the advantageous effects of the present invention described in the above embodiments.

The video data included in the multiplexed data has been coded with a moving picture coding method compliant with a standard such as Moving Picture Experts Group (MPEG)2, MPEG4-Advanced Video Coding (AVC), VC-1, or the like. The audio data included in the multiplexed data has been encoded with an audio coding method compliant with a standard such as Dolby Audio Coding (AC)-3, Dolby Digital Plus, Meridian Lossless Packing (MLP), Digital Theater Systems (DTS), DTS-HD, Pulse Coding Modulation (PCM), or the like.

Figure 22:
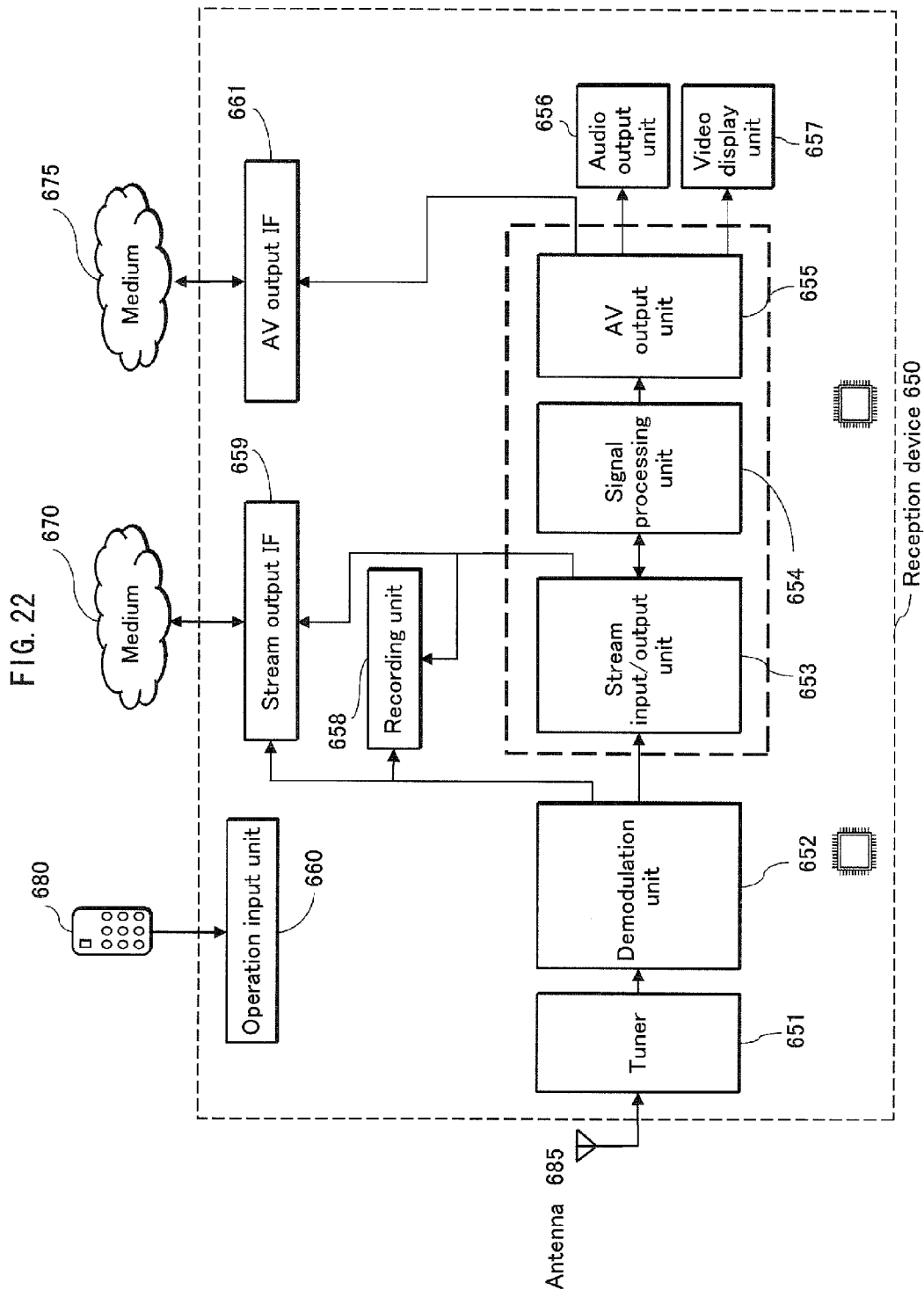
FIG. 22 shows an example of the structure of a receiver.

FIG. 22 is a schematic view illustrating an exemplary structure of a receiver 650 for carrying out the reception methods described in the above embodiments. The receiver 650 shown in FIG. 22 corresponds to a component that is included, for example, in the television 611, the DVD recorder 612, the STB 613, the computer 620, the in-car television 641, the mobile phone 630, or the like illustrated in FIG. 21. The receiver 650 includes a tuner 651, for transforming a high-frequency signal received by an antenna 685 into a baseband signal, and a demodulation unit 652, for demodulating multiplexed data from the baseband signal obtained by frequency conversion. The reception methods described in the above embodiments are implemented in the demodulation unit 652, thus obtaining the advantageous effects of the present invention described in the above embodiments.

The receiver 650 includes a stream input/output unit 653, a signal processing unit 654, an AV output unit 655, an audio output unit 656, and a video display unit 657. The stream input/output unit 653 demultiplexes video and audio data from multiplexed data obtained by the demodulation unit 652. The signal processing unit 654 decodes the demultiplexed video data into a video signal using an appropriate moving picture decoding method and decodes the demultiplexed audio data into an audio signal using an appropriate audio decoding method. The AV output unit 655 outputs the signals output by the signal processing unit 654 to other units. The audio output unit 656, such as a speaker, produces audio output according to the decoded audio signal. The video display unit 657, such as a display monitor, produces video output according to the decoded video signal.

For example, the user may operate the remote control 680 to select a channel (of a TV program or audio broadcast), so that information indicative of the selected channel is transmitted to an operation input unit 660. In response, the receiver 650 demodulates, from among signals received with the antenna 650, a signal carried on the selected channel and applies error correction decoding, so that reception data is extracted. At this time, the receiver 650 receives control symbols included in a signal corresponding to the selected channel and containing information indicating the transmission method (the transmission method, modulation method, error correction method, and the like in the above embodiments) of the signal. With this information, the receiver 650 is enabled to make appropriate settings for the receiving operations, demodulation method, method of error correction decoding, and the like to duly receive data included in data symbols transmitted from a broadcasting station (base station). Although the above description is directed to an example in which the user selects a channel using the remote control 680, the same description applies to an example in which the user selects a channel using a selection key provided on the receiver 650.

With the above structure, the user can view a broadcast program that the receiver 650 receives by the reception methods described in the above embodiments.

The receiver 650 according to this embodiment may additionally include a recording unit (drive) 658 for recording various data onto a recording medium, such as a magnetic disk, optical disc, or a non-volatile semiconductor memory. Examples of data to be recorded by the recording unit 658 include data contained in multiplexed data that is obtained as a result of demodulation and error correction by the demodulation unit 652, data equivalent to such data (for example, data obtained by compressing the data), and data obtained by processing the moving pictures and/or audio. Note that the term "optical disc" used herein refers to a recording medium, such as Digital Versatile Disc (DVD) or BD (Blu-ray Disc), that is readable and writable with the use of a laser beam. Further, the term "magnetic disk" used herein refers to a recording medium, such as a floppy disk (FD, registered trademark) or hard disk, that is writable by magnetizing a magnetic substance with magnetic flux. Still further, the term "non-volatile semiconductor memory" refers to a recording medium, such as flash memory or ferroelectric random access memory, composed of semiconductor element(s). Specific examples of non-volatile semiconductor memory include an SD card using flash memory and a flash Solid State Drive (SSD). It should be naturally appreciated that the specific types of recording media mentioned herein are merely examples, and any other types of recording mediums may be usable.

With the above structure, the user can record a broadcast program that the receiver 650 receives with any of the reception methods described in the above embodiments, and time-shift viewing of the recorded broadcast program is possible anytime after the broadcast.

In the above description of the receiver 650, the recording unit 658 records multiplexed data obtained as a result of demodulation and error correction by the demodulation unit 652. However, the recording unit 658 may record part of data extracted from the data contained in the multiplexed data. For example, the multiplexed data obtained as a result of demodulation and error correction by the demodulation unit 652 may contain contents of data broadcast service, in addition to video data and audio data. In this case, new multiplexed data may be generated by multiplexing the video data and audio data, without the contents of broadcast service, extracted from the multiplexed data demodulated by the demodulation unit 652, and the recording unit 658 may record the newly generated multiplexed data. Alternatively, new multiplexed data may be generated by multiplexing either of the video data and audio data contained in the multiplexed data obtained as a result of demodulation and error correction decoding by the demodulation unit 652, and the recording unit 658 may record the newly generated multiplexed data. The recording unit 658 may also record the contents of data broadcast service included, as described above, in the multiplexed data.

The receiver 650 described in the present invention may be included in a television, a recorder (such as DVD recorder, Blu-ray recorder, HDD recorder, SD card recorder, or the like), or a mobile telephone. In such a case, the multiplexed data obtained as a result of demodulation and error correction decoding by the demodulation unit 652 may contain data for correcting errors (bugs) in software used to operate the television or recorder or in software used to prevent disclosure of personal or confidential information. If such data is contained, the data is installed on the television or recorder to correct the software errors. Further, if data for correcting errors (bugs) in software installed in the receiver 650 is contained, such data is used to correct errors that the receiver 650 may have. This arrangement ensures more stable operation of the TV, recorder, or mobile phone in which the receiver 650 is implemented.

Note that it may be the stream input/output unit 653 that handles extraction of data from the whole data contained in multiplexed data obtained as a result of demodulation and error correction decoding by the demodulation unit 652 and multiplexing of the extracted data. More specifically, under instructions given from a control unit not illustrated in the figures, such as a CPU, the stream input/output unit 653 demultiplexes video data, audio data, contents of data broadcast service etc. from the multiplexed data demodulated by the demodulation unit 652, extracts specific pieces of data from the demultiplexed data, and multiplexes the extracted data pieces to generate new multiplexed data. The data pieces to be extracted from demultiplexed data may be determined by the user or determined in advance for the respective types of recording mediums.

With the above structure, the receiver 650 is enabled to extract and record only data necessary to view a recorded broadcast program, which is effective to reduce the size of data to be recorded.

In the above description, the recording unit 658 records multiplexed data obtained as a result of demodulation and error correction decoding by the demodulation unit 652. Alternatively, however, the recording unit 658 may record new multiplexed data generated by multiplexing video data newly yielded by encoding the original video data contained in the multiplexed data obtained as a result of demodulation and error correction decoding by the demodulation unit 652. Here, the moving picture coding method to be employed may be different from that used to encode the original video data, so that the data size or bit rate of the new video data is smaller than the original video data. Here, the moving picture coding method used to generate new video data may be of a different standard from that used to generate the original video data. Alternatively, the same moving picture coding method may be used but with different parameters. Similarly, the recording unit 658 may record new multiplexed data generated by multiplexing audio data newly obtained by encoding the original audio data contained in the multiplexed data obtained as a result of demodulation and error correction decoding by the demodulation unit 652. Here, the audio coding method to be employed may be different from that used to encode the original audio data, such that the data size or bit rate of the new audio data is smaller than the original audio data.

The process of converting the original video or audio data contained in the multiplexed data obtained as a result of demodulation and error correction decoding by the demodulation unit 652 into the video or audio data of a different data size or bit rate is performed, for example, by the stream input/output unit 653 and the signal processing unit 654. More specifically, under instructions given from the control unit such as the CPU, the stream input/output unit 653 demultiplexes video data, audio data, contents of data broadcast service etc. from the multiplexed data obtained as a result of demodulation and error correction decoding by the demodulation unit 652. Under instructions given from the control unit, the signal processing unit 654 converts the demultiplexed video data and audio data respectively using a motion picture coding method and an audio coding method each different from the method that was used in the conversion applied to obtain the video and audio data. Under instructions given from the control unit, the stream input/output unit 653 multiplexes the newly converted video data and audio data to generate new multiplexed data. Note that the signal processing unit 654 may conduct the conversion of either or both of the video or audio data according to instructions given from the control unit. In addition, the sizes of video data and audio data to be obtained by encoding may be specified by a user or determined in advance for the types of recording mediums.

With the above arrangement, the receiver 650 is enabled to record video and audio data after converting the data to a size recordable on the recording medium or to a size or bit rate that matches the read or write rate of the recording unit 658. This arrangement enables the recoding unit to duly record a program, even if the size recordable on the recording medium is smaller than the data size of the multiplexed data obtained as a result of demodulation and error correction decoding by the demodulation unit 652, or if the rate at which the recording unit records or reads is lower than the bit rate of the multiplexed data. Consequently, time-shift viewing of the recorded program by the user is possible anytime after the broadcast.

Furthermore, the receiver 650 additionally includes a stream output interface (IF) 659 for transmitting multiplexed data demodulated by the demodulation unit 652 to an external device via a transport medium 670. In one example, the stream output IF 659 may be a radio communication device that transmits multiplexed data via a wireless medium (equivalent to the transport medium 670) to an external device by modulating the multiplexed data with in accordance with a wireless communication method compliant with a wireless communication standard such as Wi-Fi (registered trademark, a set of standards including IEEE 802.11a, IEEE 802.11b, IEEE 802.11g, and IEEE 802.11n), WiGiG, Wireless HD, Bluetooth, ZigBee, or the like. The stream output IF 659 may also be a wired communication device that transmits multiplexed data via a transmission line (equivalent to the transport medium 670) physically connected to the stream output IF 659 to an external device, modulating the multiplexed data using a communication method compliant with wired communication standards, such as Ethernet (registered trademark), Universal Serial Bus (USB), Power Line Communication (PLC), or High-Definition Multimedia Interface (HDMI).

With the above structure, the user can use, on an external device, multiplexed data received by the receiver 650 using the reception method described according to the above embodiments. The usage of multiplexed data by the user mentioned herein includes use of the multiplexed data for real-time viewing on an external device, recording of the multiplexed data by a recording unit included in an external device, and transmission of the multiplexed data from an external device to a yet another external device.

In the above description of the receiver 650, the stream output IF 659 outputs multiplexed data obtained as a result of demodulation and error correction decoding by the demodulation unit 652. However, the receiver 650 may output data extracted from data contained in the multiplexed data, rather than the whole data contained in the multiplexed data. For example, the multiplexed data obtained as a result of demodulation and error correction decoding by the demodulation unit 652 may contain contents of data broadcast service, in addition to video data and audio data. In this case, the stream output IF 659 may output multiplexed data newly generated by multiplexing video and audio data extracted from the multiplexed data obtained as a result of demodulation and error correction decoding by the demodulation unit 652. In another example, the stream output IF 659 may output multiplexed data newly generated by multiplexing either of the video data and audio data contained in the multiplexed data obtained as a result of demodulation and error correction decoding by the demodulation unit 652.

Note that it may be the stream input/output unit 653 that handles extraction of data from the whole data contained in multiplexed data obtained as a result of demodulation and error correction decoding by the demodulation unit 652 and multiplexing of the extracted data. More specifically, under instructions given from a control unit not illustrated in the figures, such as a Central Processing Unit (CPU), the stream input/output unit 653 demultiplexes video data, audio data, contents of data broadcast service etc. from the multiplexed data demodulated by the demodulation unit 652, extracts specific pieces of data from the demultiplexed data, and multiplexes the extracted data pieces to generate new multiplexed data. The data pieces to be extracted from demultiplexed data may be determined by the user or determined in advance for the respective types of the stream output IF 659.

With the above structure, the receiver 650 is enabled to extract and output only data necessary for an external device, which is effective to reduce the bandwidth used to output the multiplexed data.

In the above description, the stream output IF 659 outputs multiplexed data obtained as a result of demodulation and error correction decoding by the demodulation unit 652. Alternatively, however, the stream output IF 659 may output new multiplexed data generated by multiplexing video data newly yielded by encoding the original video data contained in the multiplexed data obtained as a result of demodulation and error correction decoding by the demodulation unit 652. The new video data is encoded with a moving picture coding method different from that used to encode the original video data, so that the data size or bit rate of the new video data is smaller than the original video data. Here, the moving picture coding method used to generate new video data may be of a different standard from that used to generate the original video data. Alternatively, the same moving picture coding method may be used but with different parameters. Similarly, the stream output IF 659 may output new multiplexed data generated by multiplexing audio data newly obtained by encoding the original audio data contained in the multiplexed data obtained as a result of demodulation and error correction decoding by the demodulation unit 652. The new audio data is encoded with an audio coding method different from that used to encode the original audio data, such that the data size or bit rate of the new audio data is smaller than the original audio data.

The process of converting the original video or audio data contained in the multiplexed data obtained as a result of demodulation and error correction decoding by the demodulation unit 652 into the video or audio data of a different data size of bit rate is performed, for example, by the stream input/output unit 653 and the signal processing unit 654. More specifically, under instructions given from the control unit, the stream input/output unit 653 demultiplexes video data, audio data, contents of data broadcast service etc. from the multiplexed data obtained as a result of demodulation and error correction decoding by the demodulation unit 652. Under instructions given from the control unit, the signal processing unit 654 converts the demultiplexed video data and audio data respectively using a motion picture coding method and an audio coding method each different from the method that was used in the conversion applied to obtain the video and audio data. Under instructions given from the control unit, the stream input/output unit 653 multiplexes the newly converted video data and audio data to generate new multiplexed data. Note that the signal processing unit 654 may perform the conversion of either or both of the video or audio data according to instructions given from the control unit. In addition, the sizes of video data and audio data to be obtained by conversion may be specified by the user or determined in advance for the types of the stream output IF 659.

With the above structure, the receiver 650 is enabled to output video and audio data after converting the data to a bit rate that matches the transfer rate between the receiver 650 and an external device. This arrangement ensures that even if multiplexed data obtained as a result of demodulation and error correction decoding by the demodulation unit 652 is higher in bit rate than the data transfer rate to an external device, the stream output IF duly outputs new multiplexed data at an appropriate bit rate to the external device. Consequently, the user can use the new multiplexed data on another communication device.

Furthermore, the receiver 650 also includes an audio and visual output interface (hereinafter, AV output IF) 661 that outputs video and audio signals decoded by the signal processing unit 654 to an external device via an external transport medium. In one example, the AV output IF 661 may be a wireless communication device that transmits modulated video and audio signals via a wireless medium to an external device, using a wireless communication method compliant with wireless communication standards, such as Wi-Fi (registered trademark), which is a set of standards including IEEE 802.11a, IEEE 802.11b, IEEE 802.11g, and IEEE 802.11n, WiGiG, Wireless HD, Bluetooth, ZigBee, or the like. In another example, the AV output IF 661 may be a wired communication device that transmits modulated video and audio signals via a transmission line physically connected to the AV output IF 661 to an external device, using a communication method compliant with wired communication standards, such as Ethernet (registered trademark), USB, PLC, HDMI, or the like. In yet another example, the AV output IF 661 may be a terminal for connecting a cable to output the video and audio signals in analog form.

With the above structure, the user is allowed to use, on an external device, the video and audio signals decoded by the signal processing unit 654.

Furthermore, the receiver 650 additionally includes an operation input unit 660 for receiving a user operation. According to control signals indicative of user operations input to the operation input unit 660, the receiver 650 performs various operations, such as switching the power ON or OFF, switching the reception channel, switching the display of subtitle text ON or OFF, switching the display of subtitle text to another language, changing the volume of audio output of the audio output unit 656, and changing the settings of channels that can be received.

Additionally, the receiver 650 may have a function of displaying the antenna level indicating the quality of the signal being received by the receiver 650. Note that the antenna level is an indicator of the reception quality calculated based on, for example, the Received Signal Strength Indication, Received Signal Strength Indicator (RSSI), received field strength, Carrier-to-noise power ratio (C/N), Bit Error Rate (BER), packet error rate, frame error rate, and channel state information of the signal received on the receiver 650. In other words, the antenna level is a signal indicating the level and quality of the received signal. In this case, the demodulation unit 652 also includes a reception quality measuring unit for measuring the received signal characteristics, such as RSSI, received field strength, C/N, BER, packet error rate, frame error rate, and channel state information. In response to a user operation, the receiver 650 displays the antenna level (i.e., signal indicating the level and quality of the received signal) on the video display unit 657 in a manner identifiable by the user. The antenna level (i.e., signal indicating the level and quality of the received signal) may be numerically displayed using a number that represents RSSI, received field strength, C/N, BER, packet error rate, frame error rate, channel state information or the like. Alternatively, the antenna level may be displayed using an image representing RSSI, received field strength, C/N, BER, packet error rate, frame error rate, channel state information or the like. When video data and audio data composing a program are transmitted hierarchically, the receiver 650 may also display the signal level (signal indicating the level and quality of the received signal) for each hierarchical level.

With the above structure, users are able to grasp the antenna level (signal indicating the level and quality of the received signal) numerically or visually during reception with the reception methods shown in the above embodiments.

Although the receiver 650 is described above as having the audio output unit 656, video display unit 657, recording unit 658, stream output IF 659, and AV output IF 7911, it is not necessary for the receiver 650 to have all of these units. As long as the receiver 650 is provided with at least one of the units described above, the user is enabled to use multiplexed data obtained as a result of demodulation and error correction decoding by the demodulation unit 652. The receiver 650 may therefore include any combination of the above-described units depending on its intended use.

Multiplexed Data

The following is a detailed description of an exemplary structure of multiplexed data. The data structure typically used in broadcasting is an MPEG2 transport stream (TS), so therefore the following description is given by way of an example related to MPEG2-TS. It should be naturally appreciated, however, that the data structure of multiplexed data transmitted by the transmission and reception methods described in the above embodiments is not limited to MPEG2-TS and the advantageous effects of the above embodiments are achieved even if any other data structure is employed.

Figure 23:
FIG. 23 shows the structure of multiplexed data.

FIG. 23 is a view illustrating an exemplary multiplexed data structure. As illustrated in FIG. 80, multiplexed data is obtained by multiplexing one or more elementary streams, which are elements constituting a broadcast program (programme or an event which is part of a program) currently provided through respective services. Examples of elementary streams include a video stream, audio stream, presentation graphics (PG) stream, and interactive graphics (IG) stream. In the case where a broadcast program carried by multiplexed data is a movie, the video streams represent main video and sub video of the movie, the audio streams represent main audio of the movie and sub audio to be mixed with the main audio, and the PG stream represents subtitles of the movie. The term "main video" used herein refers to video images normally presented on a screen, whereas "sub video" refers to video images (for example, images of text explaining the outline of the movie) to be presented in a small window inserted within the video images. The IG stream represents an interactive display constituted by presenting GUI components on a screen.

Each stream contained in multiplexed data is identified by an identifier called PID uniquely assigned to the stream. For example, the video stream carrying main video images of a movie is assigned with "0x1011", each audio stream is assigned with a different one of "0x1100" to "0x111F", each PG stream is assigned with a different one of "0x1200" to "0x121F", each IG stream is assigned with a different one of "0x1400" to "0x141F", each video stream carrying sub video images of the movie is assigned with a different one of "0x1B00" to "0x1B1F", each audio stream of sub-audio to be mixed with the main audio is assigned with a different one of "0x1A00" to "0x1A1F".

Figure 24:
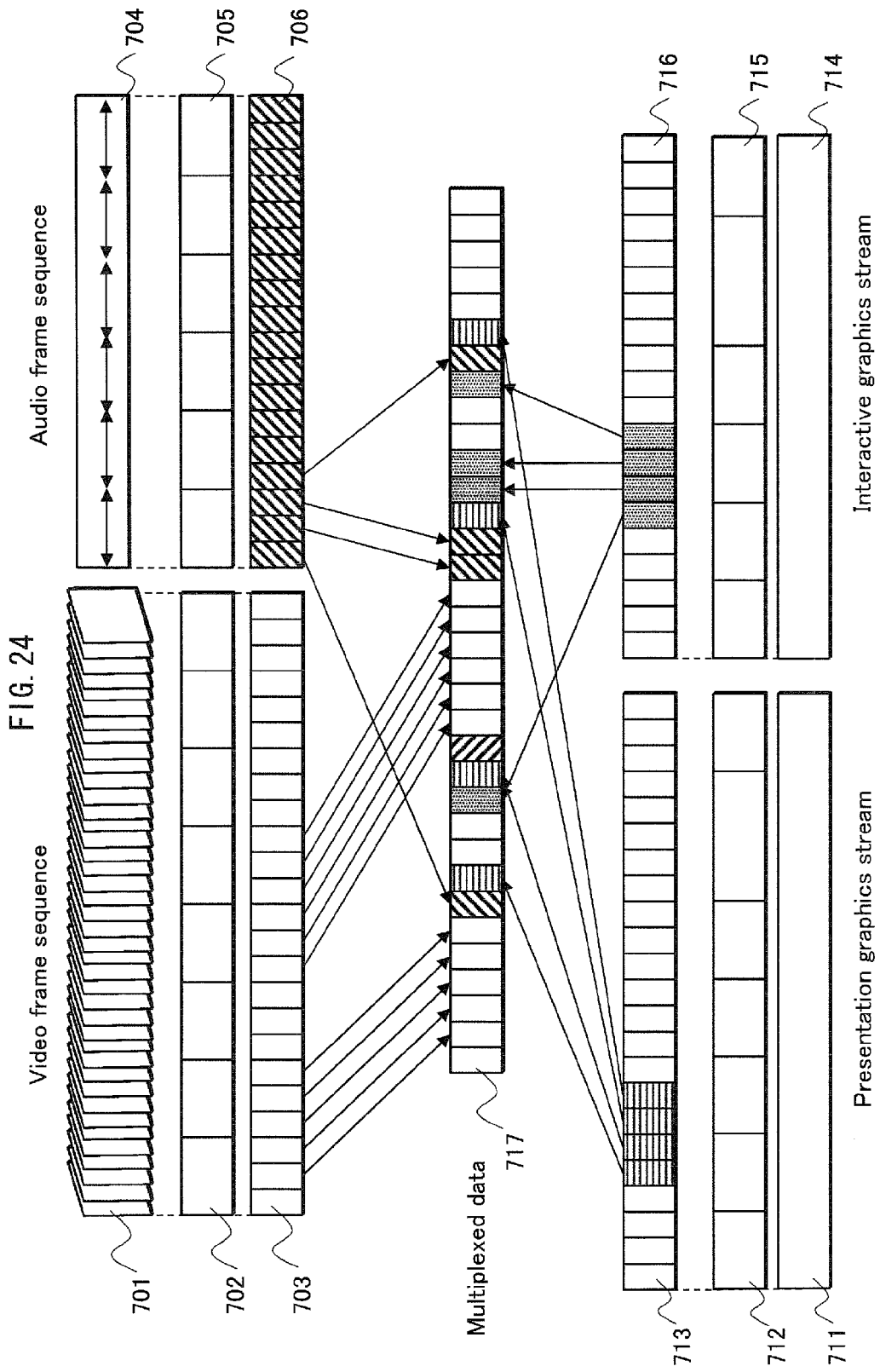
FIG. 24 schematically shows how each stream is multiplexed in the multiplexed data.

FIG. 24 is a schematic view illustrating an example of how the respective streams are multiplexed into multiplexed data. First, a video stream 701 composed of a plurality of video frames is converted into a PES packet sequence 702 and then into a TS packet sequence 703, whereas an audio stream 704 composed of a plurality of audio frames is converted into a PES packet sequence 705 and then into a TS packet sequence 706. Similarly, the PG stream 711 is first converted into a PES packet sequence 712 and then into a TS packet sequence 713, whereas the IG stream 714 is converted into a PES packet sequence 715 and then into a TS packet sequence 716. The multiplexed data 717 is obtained by multiplexing the TS packet sequences (703, 706, 713 and 716) into one stream.

Figure 25:
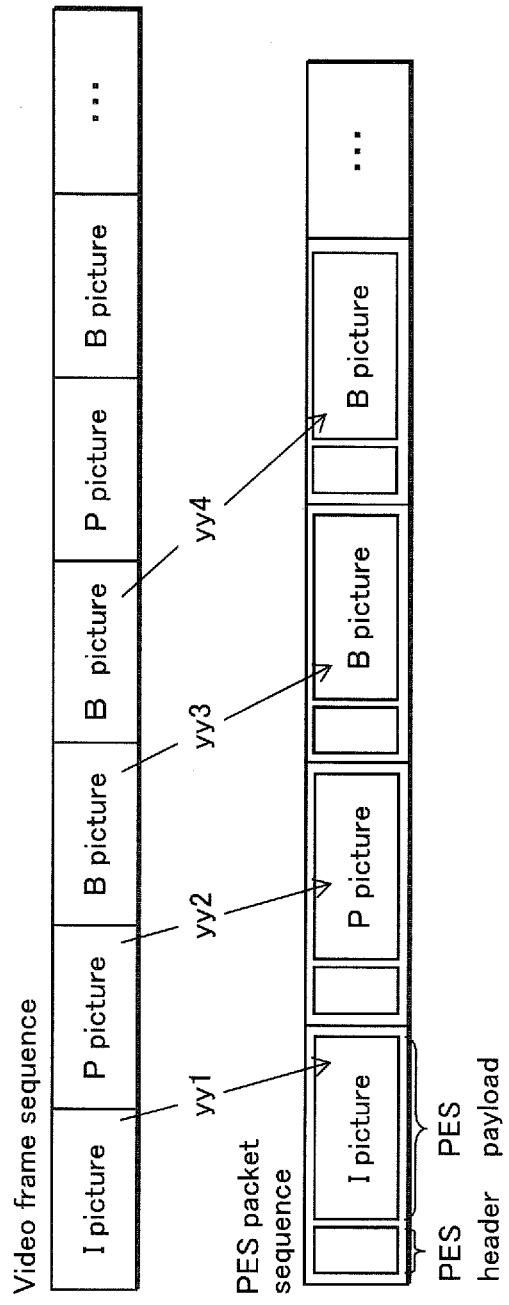
FIG. 25 shows in detail how a video stream is stored in a sequence of PES packets.

FIG. 25 illustrates the details of how a video stream is divided into a sequence of PES packets. In FIG. 25, the first tier shows a sequence of video frames included in a video stream. The second tier shows a sequence of PES packets. As indicated by arrows yy1, yy2, yy3, and yy4 shown in FIG. 25, a plurality of video presentation units, namely I pictures, B pictures, and P pictures, of a video stream are separately stored into the payloads of PES packets on a picture-by-picture basis. Each PES packet has a PES header and the PES header stores a Presentation Time-Stamp (PTS) and Decoding Time-Stamp (DTS) indicating the display time and decoding time of a corresponding picture.

Figure 26:
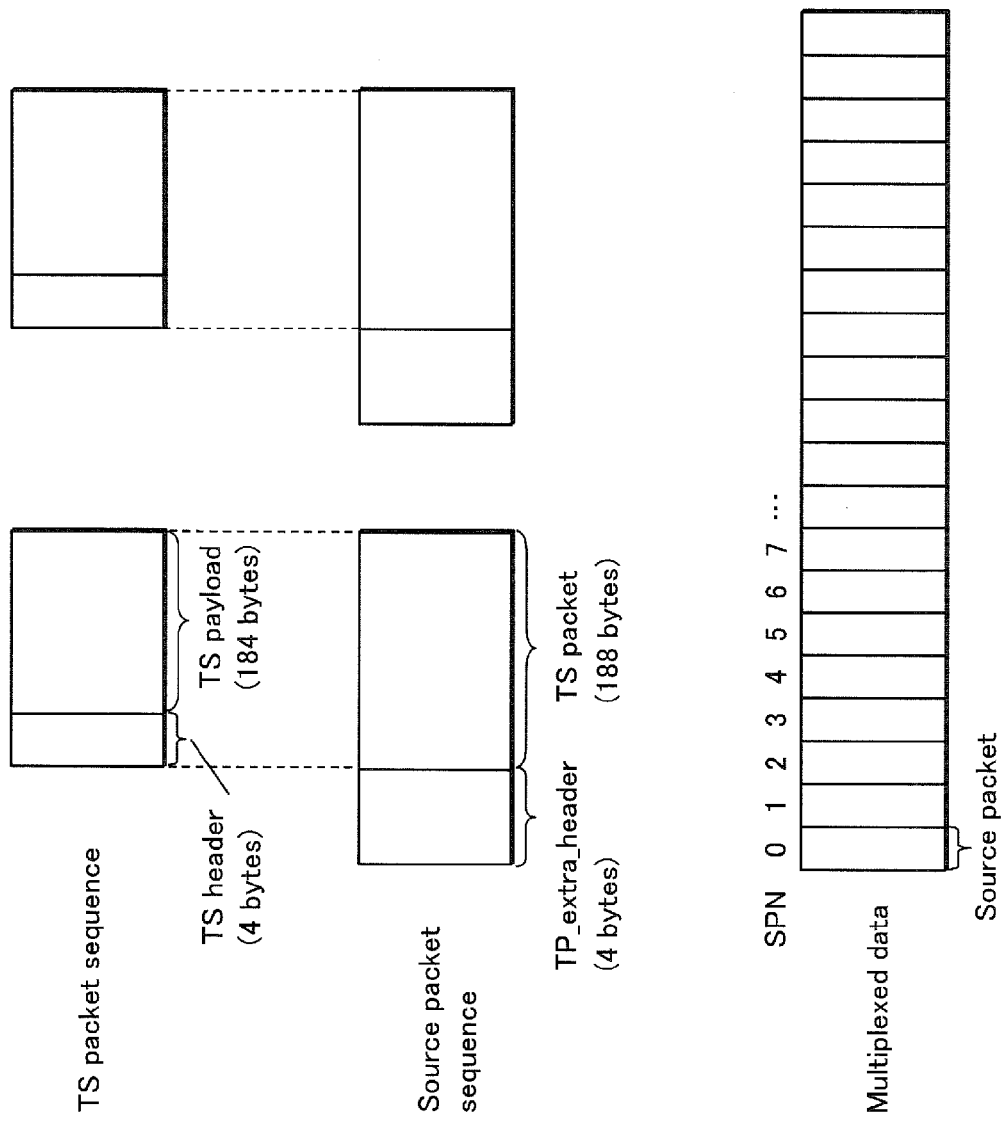
FIG. 26 shows the structure of a TS packet and a source packet in multiplexed data.

FIG. 26 illustrates the format of a TS packet to be eventually written as multiplexed data. The TS packet is a fixed length packet of 188 bytes and has a 4-byte TS header containing such information as PID identifying the stream and a 184-byte TS payload carrying actual data. The PES packets described above are divided to be stored into the TS payloads of TS packets. In the case of BD-ROM, each TS packet is attached with a TP_Extra_Header of 4 bytes to build a 192-byte source packet, which is to be written as multiplexed data. The TP_Extra_Header contains such information as an Arrival_Time_Stamp (ATS). The ATS indicates a time for starring transfer of the TS packet to the PID filter of a decoder. As shown on the lowest tier in FIG. 26, multiplexed data includes a sequence of source packets each bearing a source packet number (SPN), which is a number incrementing sequentially from the start of the multiplexed data.

In addition to the TS packets storing streams such as video, audio, and PG streams, multiplexed data also includes TS packets storing a Program Association Table (PAT), a Program Map Table (PMT), and a Program Clock Reference (PCR). The PAT in multiplexed data indicates the PID of a PMT used in the multiplexed data, and the PID of the PAT is "0". The PMT includes PIDs identifying the respective streams, such as video, audio and subtitles, contained in multiplexed data and attribute information (frame rate, aspect ratio, and the like) of the streams identified by the respective PIDs. In addition, the PMT includes various types of descriptors relating to the multiplexed data. One of such descriptors may be copy control information indicating whether or not copying of the multiplexed data is permitted. The PCR includes information for synchronizing the Arrival Time Clock (ATC), which is the time axis of ATS, with the System Time Clock (STC), which is the time axis of PTS and DTS. More specifically, the PCR packet includes information indicating an STC time corresponding to the ATS at which the PCR packet is to be transferred.

Figure 27:
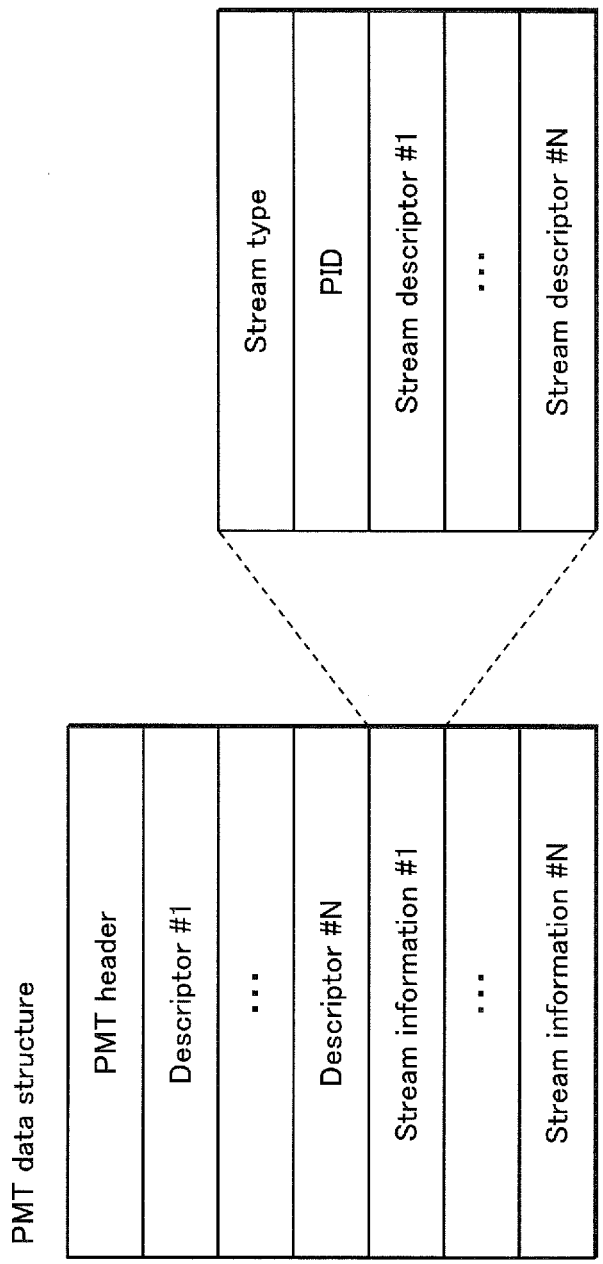
FIG. 27 shows the data structure of a PMT.

FIG. 27 is a view illustrating the data structure of the PMT in detail. The PMT starts with a PMT header indicating the length of data contained in the PMT. Following the PMT header, descriptors relating to the multiplexed data are disposed. One example of a descriptor included in the PMT is copy control information described above. Following the descriptors, pieces of stream information relating to the respective streams included in the multiplexed data are arranged. Each piece of stream information is composed of stream descriptors indicating a stream type identifying a compression codec employed for a corresponding stream, a PID of the stream, and attribute information (frame rate, aspect ratio, and the like) of the stream. The PMT includes as many stream descriptors as the number of streams included in the multiplexed data.

When recorded onto a recoding medium, for example, the multiplexed data is recorded along with a multiplexed data information file.

Figure 28:
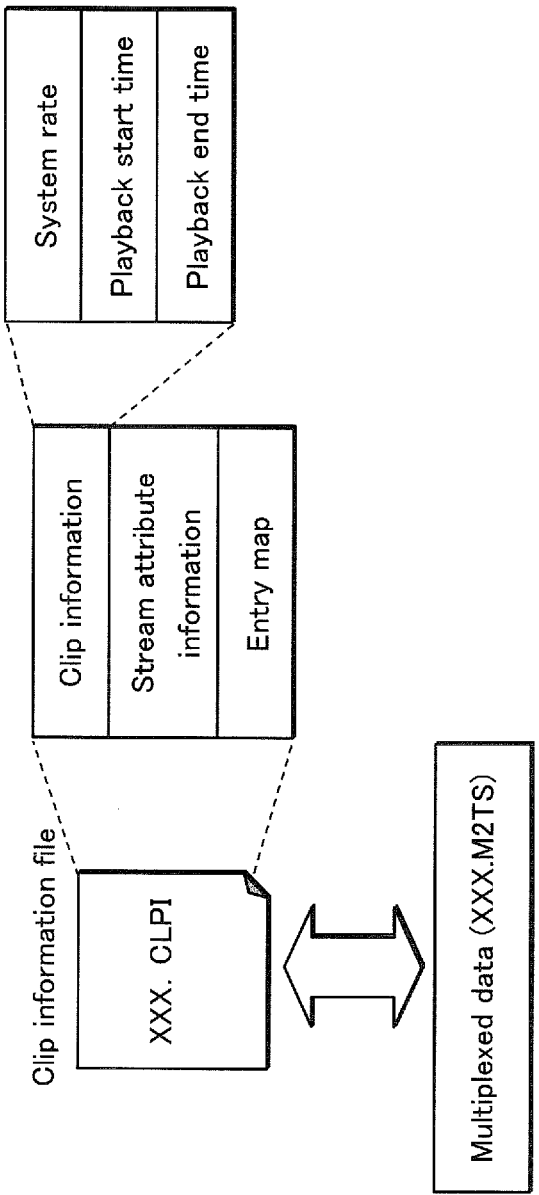
FIG. 28 shows the internal structure of multiplexed data information.

FIG. 28 is a view illustrating the structure of the multiplexed data information file. As illustrated in FIG. 28, the multiplexed data information file is management information of corresponding multiplexed data and is composed of multiplexed data information, stream attribute information, and an entry map. Note that multiplexed data information files and multiplexed data are in a one-to-one relationship.

As illustrated in FIG. 28, the multiplexed data information is composed of a system rate, playback start time, and playback end time. The system rate indicates the maximum transfer rate of the multiplexed data to the PID filter of a system target decoder, which is described later. The multiplexed data includes ATSs at intervals set so as not to exceed the system rate. The playback start time is set to the time specified by the PTS of the first video frame in the multiplexed data, whereas the playback end time is set to the time calculated by adding the playback period of one frame to the PTS of the last video frame in the multiplexed data.

Figure 29:
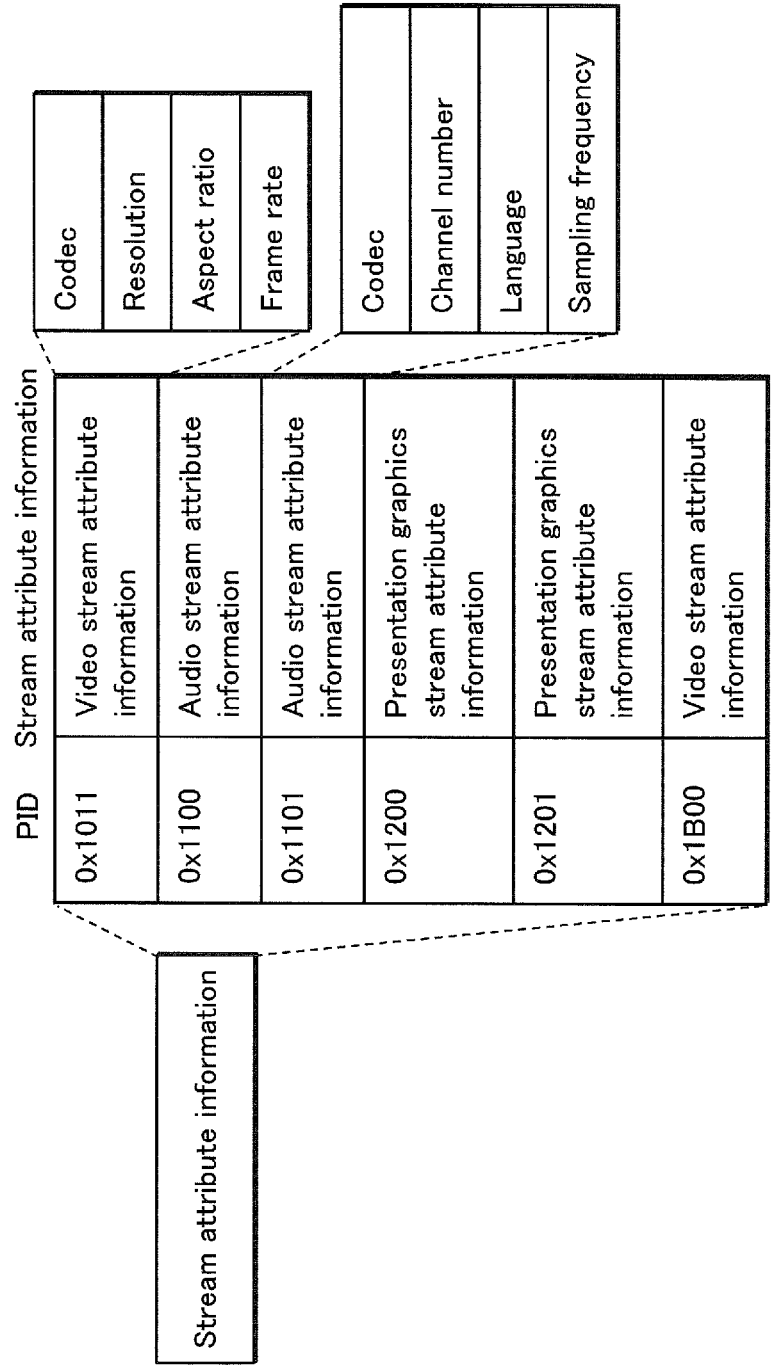
FIG. 29 shows the internal structure of stream attribute information.
Figure 35B:
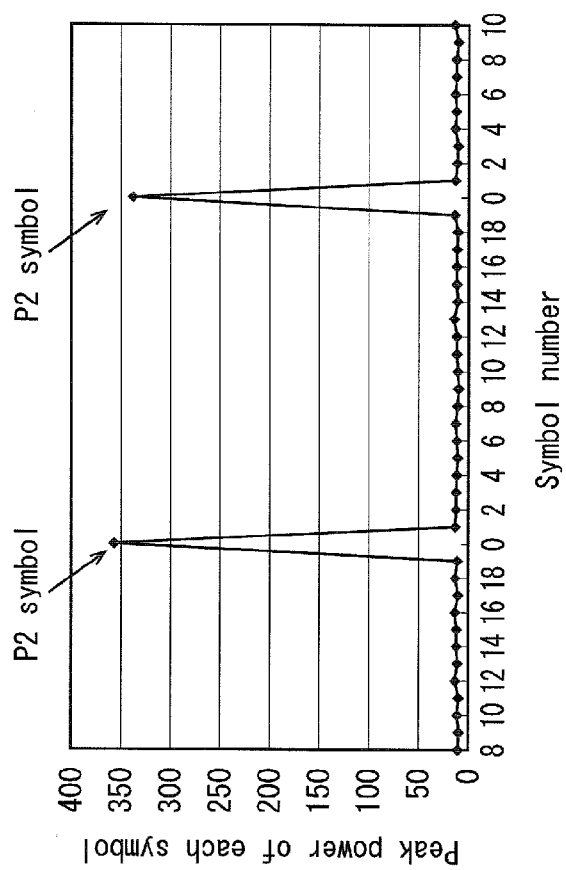
FIGS. 35A and 35B show the results of analysis of the power of P2 symbols and data symbols in a DVB-T2 transmission signal (a signal in the time domain after an IFFT).
Figure 35A:
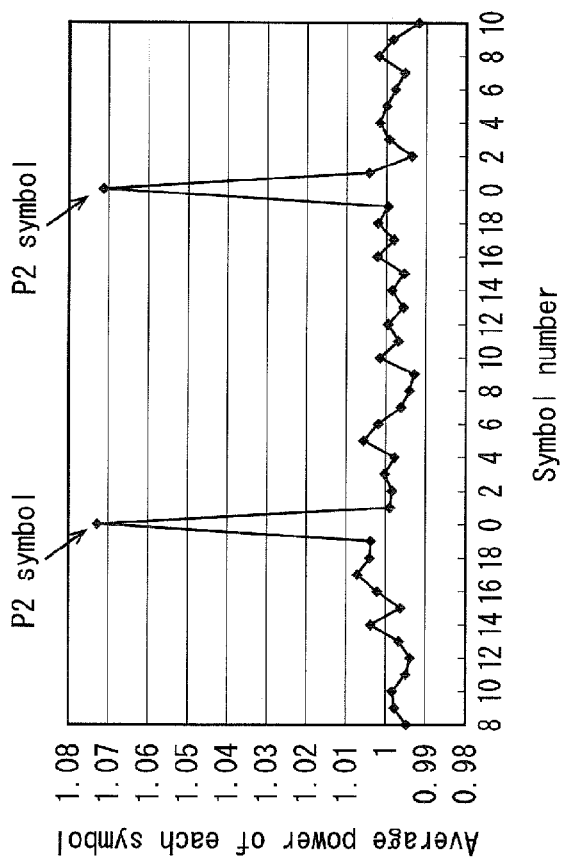
Figure 36:
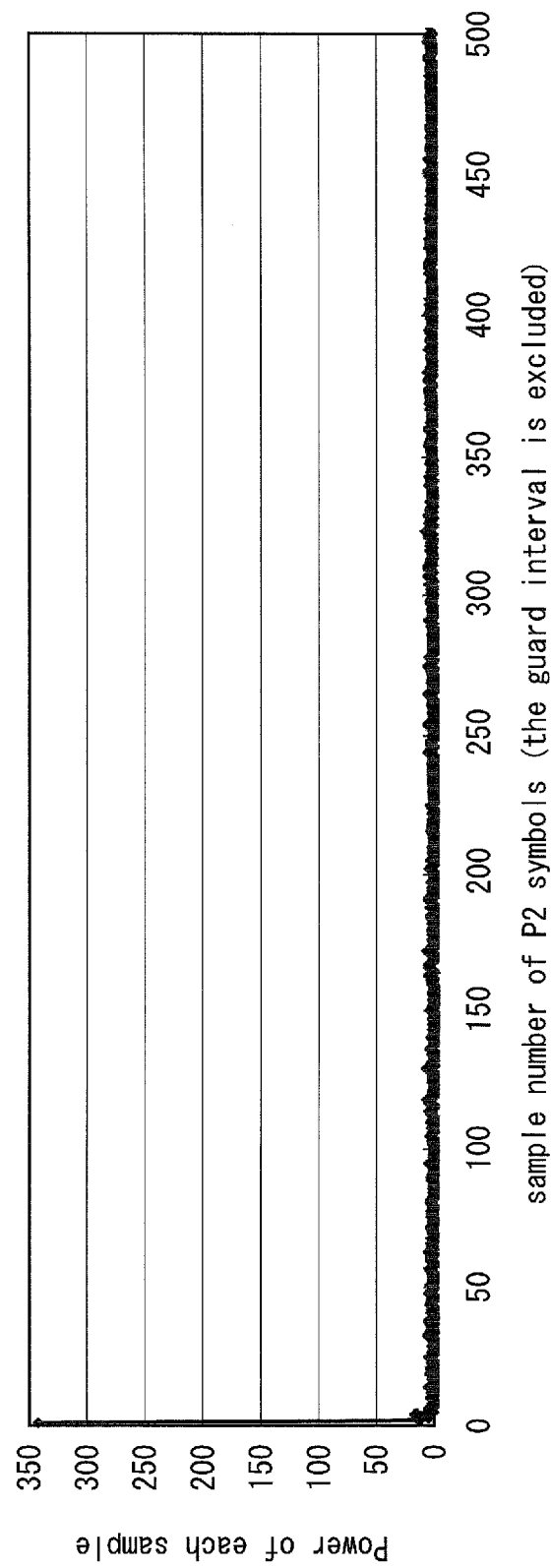
FIG. 36 shows the power for each sample in P2 symbols.

FIG. 29 illustrates the structure of stream attribute information contained in multiplexed data information file. As illustrated in FIG. 29, the stream attribute information includes pieces of attribute information of the respective streams included in multiplexed data, and each piece of attribute information is registered with a corresponding PID. That is, different pieces of attribute information are provided for different streams, namely a video stream, an audio stream, a PG stream and an IG stream. The video stream attribute information indicates the compression codec employed to compress the video stream, the resolutions of individual pictures constituting the video stream, the aspect ratio, the frame rate, and so on. The audio stream attribute information indicates the compression codec employed to compress the audio stream, the number of channels included in the audio stream, the language of the audio stream, the sampling frequency, and so on. These pieces of information are used to initialize a decoder before playback by a player.

In the present embodiment, from among the pieces of information included in the multiplexed data, the stream type included in the PMT is used. In the case where the multiplexed data is recorded on a recording medium, the video stream attribute information included in the multiplexed data information file is used. More specifically, the moving picture coding method and device described in any of the above embodiments may be modified to additionally include a step or unit of setting a specific piece of information in the stream type included in the PMT or in the video stream attribute information. The specific piece of information is for indicating that the video data is generated by the moving picture coding method and device described in the embodiment. With the above structure, video data generated by the moving picture coding method and device described in any of the above embodiments is distinguishable from video data compliant with other standards.

FIG. 30 illustrates an exemplary structure of a video and audio output device 750 that includes a receiver 754 for receiving a modulated signal carrying video and audio data or data for data broadcasting from a broadcasting station (base station). Note that the structure of the receiver 754 corresponds to the receiver 650 illustrated in FIG. 22. The video and audio video output device 750 is installed with an Operating System (OS), for example, and also with a communication device 756 (a device for a wireless Local Area Network (LAN) or Ethernet, for example) for establishing an Internet connection. With this structure, hypertext (World Wide Web (WWW)) 753 provided over the Internet can be displayed on a display area 751 simultaneously with images 752 reproduced on the display area 751 from the video and audio data or data provided by data broadcasting. By operating a remote control (which may be a mobile phone or keyboard) 757, the user can make a selection on the images 752 reproduced from data provided by data broadcasting or the hypertext 753 provided over the Internet to change the operation of the video and audio video output device 750. For example, by operating the remote control to make a selection on the hypertext 753 provided over the Internet, the user can change the WWW site currently displayed to another site. Alternatively, by operating the remote control 757 to make a selection on the images 752 reproduced from the video or audio data or data provided by the data broadcasting, the user can transmit information indicating a selected channel (such as a selected broadcast program or audio broadcasting). In response, an interface (IF) 755 acquires information transmitted from the remote control, so that the receiver 754 operates to obtain reception data by demodulation and error correction of a signal carried on the selected channel. At this time, the receiver 754 receives control symbols included in a signal corresponding to the selected channel and containing information indicating the transmission method of the signal. With this information, the receiver 754 is enabled to make appropriate settings for the receiving operations, demodulation method, method of error correction decoding, and the like to duly receive data included in data symbols transmitted from a broadcasting station (base station). Although the above description is directed to an example in which the user selects a channel using the remote control 757, the same description applies to an example in which the user selects a channel using a selection key provided on the video and audio video output device 750.

In addition, the video and audio video output device 750 may be operated via the Internet. For example, a terminal connected to the Internet may be used to make settings on the video and audio video output device 750 for pre-programmed recording (storing). (The video and audio video output device 750 therefore would have the recording unit 658 as illustrated in FIG. 22.) In this case, before starting the pre-programmed recording, the video and audio video output device 750 selects the channel, so that the receiver 754 operates to obtain reception data by demodulation and error correction decoding of a signal carried on the selected channel. At this time, the receiver 754 receives control symbols included in a signal corresponding to the selected channel and containing information indicating the transmission method (the transmission method, modulation method, error correction method, and the like in the above embodiments) of the signal. With this information, the receiver 754 is enabled to make appropriate settings for the receiving operations, demodulation method, method of error correction decoding, and the like to duly receive data included in data symbols transmitted from a broadcasting station (base station).

Modifications

The present invention is not limited to the above-described embodiments but rather may be implemented in any form in order to achieve the object of the present invention or a related or associated object thereof. For example, the following modifications are possible.

(1) In Embodiments 1 and 2, the energy dispersion at the transmitting end and the reverse energy dispersion at the receiving end are applied to the entire L1 signaling data, but the present invention is not limited in this way. The energy dispersion at the transmitting end and the reverse energy dispersion at the receiving end may be applied to only a portion of the L1 signaling data (such as the L1-post signaling data).

In Embodiments 5 and 6, the energy dispersion at the transmitting end and the reverse energy dispersion at the receiving end are applied to the entire L1-post signaling data in the L1 signaling data, but the present invention is not limited in this way. The energy dispersion at the transmitting end and the reverse energy dispersion at the receiving end may be applied to only a portion of the L1-post signaling data, or may be applied to the entire L1 signaling data if a mechanism is adopted to provide notification to the receiving end, separate from the L1 signaling data, regarding whether energy dispersion has been applied.

(2) The positions for adding a structural element that applies energy dispersion to the L1 signaling data at the transmitting end and a structural element that applies reverse energy dispersion to the L1 signaling data at the receiving end is not limited to the positions described in Embodiments 1, 2, 5, and 6. For example, these structural elements may be added at the following positions.

At the transmitting end, an energy dispersion unit may be added between the L1-pre error correction coder 1031 and the L1-pre mapper 1023, and between the L1-post bit interleaver 1025 and the L1-post mapper 1026. At the receiving end, a reverse energy dispersion unit may be added between the L1-pre demapper 1121 and the L1-pre error correction decoder 1131, and between the L1-post demapper 1122 and the L1-post bit deinterleaver 1123.

At the transmitting end, an energy dispersion unit may be added between the L1-post bit interleaver 1025 and the L1-post mapper 1026, and at the receiving end, a reverse energy dispersion unit may be added between the L1-post demapper 1122 and the L1-post bit deinterleaver 1123.

(3) In Embodiments 1, 2, 5, and 6, the energy dispersion units 121 and 121A, as well as the reverse energy dispersion units 171 and 171A, use a $15^{th}$ order pseudo random binary sequence, but the present invention is not limited in this way. The pseudo random binary sequence may have a different number of orders. For example, a $19^{th}$ order pseudo random binary sequence or a $23^{rd}$ order pseudo random binary sequence may be used.

Furthermore, the initial value of the 15-bit shift register 132 is not limited to being "100101010000000" as above. The initial value may be a different value, such as "111111111111111" or "101010101010101".

In Embodiments 1 and 2, the initial value is assigned to the shift register 132 at the first bit of the L1-pre signaling data, but assignment is not limited in this way. For example, the initial value may also be assigned to the shift register 132 at the first bit of the L1-post signaling data, or the initial value may be assigned to the shift register 132 at the first bit of each BCH/LDPC code block in the L1-post signaling data. In Embodiments 5 and 6, the initial value is assigned to the shift register 132 at the first bit of the L1-post signaling data, but assignment is not limited in this way. For example, the initial value may also be assigned at the first bit of each BCH/LDPC code block in the L1-post signaling data.

In Embodiments 1 and 2, energy dispersion at the transmitting end and reverse energy dispersion at the receiving end are performed with one structural element, but the present invention is not limited in this way. For example, energy dispersion at the transmitting end and reverse energy dispersion at the receiving end may be divided up between L1-pre signaling data and L1-post signaling data and performed by different structural elements. In this case, in the structural element that performs energy dispersion and the structural element that performs reverse energy dispersion on the L1-pre signaling data, the initial value is for example assigned to the shift register at the first bit of the L1-pre signaling data. In the structural element that performs energy dispersion and the structural element that performs reverse energy dispersion on the L1-post signaling data, the initial value is for example assigned to the shift register at the first bit of the L1-post signaling data, and may also be assigned to the shift register at the first bit of each BCH/LDPC code block in the L1-post signaling data.

(4) In Embodiments 3 and 7, the L1 signaling data generators 321 and 321A invert the bit pattern in the L1-post signaling data of the L1-post signaling data portions (excluding the PLP_ID) pertaining to PLPs with either an even-numbered or an odd-numbered PLP_ID. Alternatively, a method may be adopted to invert the bit pattern of a portion of the L1 signaling data that allows for prevention of a large bias in the mapping data of the L1-pre signaling data and the L1-post signaling data, such as inversion of the bit pattern of L1-post signaling data portions (excluding the PLP_ID) pertaining to a portion of PLPs. In this case, the L1 signaling data analyzers 371 and 371A in the receivers 350 and 350A make determinations in accordance with the bit pattern inversion by the L1 signaling data generators 321 and 321A. Note that the portion of PLPs may be the PLPs whose PLP_ID is in the earlier half of the PLP_IDs or whose PLP_ID is in the later half. Furthermore, the number of the portion of PLPs need not be half the total number of PLPs.

(5) In Embodiments 4 and 8, the L1 signaling data generators 421 and 421A switch on use of the L1-post extension field and fill a predetermined number of bits with 1's or with 0's, but the present invention is not limited in this way. A large bias in the mapping data of the L1-pre signaling data and the L1-post signaling data may be prevented by filling a predetermined number of bits with 1's and a predetermined number of bits with 0's.

(6) Either a portion or the entirety of each of the integrated circuits 151, 151A, 251, 251A, 351, 351A, 451, and 451A in Embodiments 1 through 8 may be integrated into one chip.

All or a portion of the structural elements of the transmitters 100, 100A, 200, 200A, 300, 300A, 400, and 400A in Embodiments 1 through 8 may be formed as an integrated circuit. In this case, either a portion or the entirety of the integrated circuit may be integrated into one chip.

In Embodiments 1 through 8, the integrated circuits 151, 151A, 251, 251A, 351, 351A, 451, and 451A include the structural elements other than the antenna 1111 and the tuner 1112 of the receivers 150, 150A, 250, 250A, 350, 350A, 450, and 450A respectively, but the integrated circuits are not limited in this way. The integrated circuits may include the structural elements other than the antenna 1111, or a portion of the structural elements other than the antenna 1111 and the tuner 1112. In this case, either a portion or the entirety of the integrated circuit may be integrated into one chip. Furthermore, the receivers 150, 150A, 250, 250A, 350, 350A, 450, and 450A need not be made into integrated circuits.

The above integrated circuits are, for example, implemented as an LSI. Although referred to here as an LSI, depending on the degree of integration, the terms IC, system LSI, super LSI, or ultra LSI are also used. In addition, the method for assembling integrated circuits is not limited to LSI, and a dedicated communication circuit or a general-purpose processor may be used. An FPGA, which is programmable after the LSI is manufactured, or a reconfigurable processor, which allows reconfiguration of the connection and setting of circuit cells inside the LSI, may be used. Furthermore, if technology for forming integrated circuits that replace LSIs emerges, owing to advances in semiconductor technology or to another derivative technology, the integration of functional blocks may naturally be accomplished using such technology. The application of biotechnology or the like is possible.

(8) Embodiments 1 through 8 describe transmitters and receivers based on the DVB-T2 standard, but the present invention is not limited in this way. A transmitter and a receiver that apply the present invention to a future transmission format, such as DVB-NGH, may be provided.

(9) Since Embodiments 1 through 8 describe transmitters and receivers based on the DVB-T2 standard, error correction coding based on BCH coding and LDPC coding is performed at the transmitting end, and error correction decoding based on BCH decoding and LDPC decoding is performed at the receiving end. The present invention is not, however, limited in this way. Different codes may be used, such as a Reed Solomon code and a convolutional code. Furthermore, it is not necessary to use two codes. The number of codes used may be one, or may be three or greater.

(10) Since Embodiments 4 and 8 describe transmitters and receivers based on the DVB-T2 standard, the extension field that is used is the L1-post extension field of the L1-post signaling data. The present invention is not, however, limited in this way. For example, if Embodiments 4 and 8 are applied to a different format, the extension field specified by that format would be used.

(11) A program listing steps for a transmission method and a reception method according to Embodiments 1 through 8 may be stored in a program memory. A CPU may read the program from the program memory and execute the read program.

(12) Embodiments 1 through 8 and modifications thereto may be combined as needed.

INDUSTRIAL APPLICABILITY

The transmitter, transmission method, receiver, reception method, integrated circuit, and program according to the present invention are particularly useful with the DVB standard.

REFERENCE SIGNS LIST

100, 200, 300, 400, 1000 transmitter
100A, 200A, 300A, 400A, 1000A transmitter
111, 211, 311, 411 L1 signaling data coder
111A, 211A, 311A, 411A L1 signaling data coder
121, 121A energy dispersion unit
126 energy dispersion control unit
131 combination unit
132 shift register
133, 134 EXOR circuit
135 distribution unit
136 selector
150, 250, 350, 450, 1100 receiver
150A, 250A, 350A, 450A receiver
151, 251, 351, 451 integrated circuit
151A, 251A, 351A, 451A integrated circuit
161, 261, 361, 1117 L1 signaling data decoder
161A, 261A, 361A L1 signaling data decoder
171, 171A reverse energy dispersion unit
176 reverse energy dispersion control unit
321, 421, 1021 L1 signaling data generator
321A, 421A, 1021A L1 signaling data generator
371, 371A, 1125, 1125A L1 signaling data analyzer
600 digital broadcast system
601 broadcasting station
610, 640, 685 antenna
611 television
612 recorder
613 STB
620 computer
630 mobile phone
641 in-car television
650 receiver
651 tuner
652 demodulation unit
653 stream input/output unit
654 signal processing unit
655 AV output unit
656 audio output unit
657 video display unit
658 recording unit
659 stream output interface
660 operation input unit
661 AV output IF
670, 675 medium
680 remote control
701 video stream
702, 705, 712, 715 PES packet sequence
703, 706, 713, 716 TS packet
704 audio stream
711 presentation graphics stream
714 interactive graphics
717 multiplexed data 750 video and audio output device
751 area for displaying video
752 video images
753 hypertext
754 receiver
756 communication device
757 remote control
1011 main signal coder
1013 frame builder
1014 OFDM signal generator
1022 L1 error correction coder
1023 L1-pre mapper
1025 L1-post bit interleaver
1026 L1-post mapper
1031 L1-pre error correction coder
1032 L1-post error correction coder
1111 antenna
1112 tuner
1113 A/D converter
1114 OFDM demodulator
1115 selected PLP/L1 signaling data extraction unit
1116 main signal decoder
1121 L1-pre demapper
1122 L1-post demapper
1123 L1-post bit deinterleaver
1124 L1 error correction decoder
1131 L1-pre error correction decoder
1132 L1-post error correction decoder

The invention claimed is:

1. A transmitter comprising:
an L1 (Layer-1) signaling data generator configured to generate, from transmission parameters of a main signal, L1 signaling data storing the transmission parameters and including L1-pre signaling data and L1-post signaling data;
an error correction coding unit configured to perform error correction coding on the L1-pre signaling data;
an energy dispersion and error correction coding unit configured to perform energy dispersion and error correction coding on the L1-post signaling data; and
a mapper configured to perform mapping on the error correction coded L1-pre signaling data and the energy-dispersed and error correction coded L1-post signaling data, wherein
the L1-pre signaling data is provided to the mapper without being energy-dispersed,
the energy dispersion and error correction coding unit performs the energy dispersion on the L1-post signaling data when the L1 signaling data generator stores, in the L1-pre signaling data, energy dispersion information indicating that energy dispersion has been performed, and
the energy dispersion and error correction coding unit does not perform the energy dispersion on the L1-post signaling data when the L1 signaling data generator stores, in the L1-pre signaling data, energy dispersion information indicating that energy dispersion has not been performed.

2. A receiver for receiving L1 (Layer-1) signaling data storing transmission parameters of a main signal and including L1-pre signaling data and L1-post signaling data,
in a transmitter, (i) error correction coding having been performed on the L1-pre signaling data, (ii) energy dispersion having not been performed on the L1-pre signaling data, (iii) error correction coding having been performed on the L1-post signaling data, and (iv) energy dispersion having been performed on the L1-post signaling data,
the receiver comprising:
an error correction decoding unit configured to perform error correction decoding on the L1-pre signaling data;
an error correction decoding and reverse energy dispersion unit configured to perform error correction decoding and reverse energy dispersion on the L1-post signaling data; and
an L1 signaling data analyzer configured to analyze the error correction decoded L1-pre signaling data and the error correction decoded and reverse energy-dispersed L1-post signaling data, and to output transmission parameters, wherein
energy dispersion information indicating whether energy dispersion has been performed is stored in the L1-pre signaling data, and
the error correction decoding and reverse energy dispersion unit performs the reverse energy dispersion on the L1-post signaling data when the energy dispersion information indicates that the energy dispersion has been performed, and does not perform the reverse energy dispersion on the L1-post signaling data when the energy dispersion information indicates that the energy dispersion has not been performed.

3. A transmission method comprising the steps of:
(a) generating, from transmission parameters of a main signal, L1 (Layer-1) signaling data storing the transmission parameters and including L1-pre signaling data and L1-post signaling data;
(b) performing error correction coding on the L1-pre signaling data;
(c) performing energy dispersion and error correction coding on the L1-post signaling data; and
(d) performing mapping on the error correction coded L1-pre signaling data and the energy-dispersed and error correction coded L1-post signaling data, wherein
the L1-pre signaling data is provided to step (d) without being energy dispersed,
in step (c), the energy dispersion is performed on the L1-post signaling data when, in step (a), energy dispersion information indicating that energy dispersion has been performed is stored in the L1-pre signaling data, and
in step (c) the energy dispersion is not performed on the L1-post signaling data when, in step (a), energy dispersion information indicating that energy dispersion has not been performed is stored in the L1-pre signaling data.

4. A reception method for receiving L1 (Layer-1) signaling data storing transmission parameters of a main signal and including L1-pre signaling data and L1-post signaling data,
in a transmitting method, (i) error correction coding having been performed on the L1-pre signaling data, (ii) energy dispersion having not been performed on the L1-pre signaling data, (iii) error correction coding having been performed on the L1-post signaling data, and (iv) energy dispersion having been performed on the L1-post signaling data,
the reception method comprising the steps of:
(a) performing error correction decoding on the L1-pre signaling data;
(b) performing error correction decoding and reverse energy dispersion on the L1-post signaling data; and
(c) analyzing the error correction decoded L1-pre signaling data and the error correction decoded and reverse energy-dispersed L1-post signaling data, and outputting transmission parameters, wherein energy dispersion information indicating whether energy dispersion has been performed is stored in the L1-pre signaling data, and in step (b), the reverse energy dispersion is performed on the L1-post signaling data when the energy dispersion information indicates that the energy dispersion has been performed, and is not performed on the L1-post signaling data when the energy dispersion information indicates that the energy dispersion has not been performed.

* * * * *